United States Patent [19]

Nakamura et al.

[11] Patent Number: 5,706,407
[45] Date of Patent: Jan. 6, 1998

[54] SYSTEM FOR REALLOCATION OF MEMORY BANKS IN MEMORY SIZED ORDER

[75] Inventors: Nobutaka Nakamura; Koichi Senuma, both of Tokyo, Japan

[73] Assignee: Kabushiki Kaisha Toshiba, Kanagawa-ken, Japan

[21] Appl. No.: 364,720

[22] Filed: Dec. 27, 1994

[30] Foreign Application Priority Data

Dec. 28, 1993 [JP] Japan ..................... 5-351165
Sep. 30, 1994 [JP] Japan ..................... 6-235794
Sep. 30, 1994 [JP] Japan ..................... 6-238121

[51] Int. Cl.$^6$ ..................................... G11C 12/02
[52] U.S. Cl. ............... 395/86; 395/402; 395/497.03
[58] Field of Search ........................ 395/402, 405, 395/497.01, 497.03, 497.04, 442; 365/230.03

[56] References Cited

U.S. PATENT DOCUMENTS

| | | | |
|---|---|---|---|
| 4,980,850 | 12/1990 | Morgan | 395/497.03 |
| 5,012,408 | 4/1991 | Conroy | 395/497.03 |
| 5,040,153 | 8/1991 | Fung et al. | 395/497.03 |
| 5,056,009 | 10/1991 | Mizuta | 395/490 |
| 5,129,069 | 7/1992 | Helm et al. | 395/497.03 |
| 5,269,010 | 12/1993 | MacDonald | 395/402 |
| 5,359,719 | 10/1994 | Chang et al. | 395/405 |
| 5,513,331 | 4/1996 | Pawlowski et al. | 395/401 |
| 5,522,062 | 5/1996 | Yamaki | 395/497.03 |
| 5,535,368 | 7/1996 | Ho et al. | 395/497.01 |
| 5,566,309 | 10/1996 | Tamura | 395/405 |
| 5,572,692 | 11/1996 | Murdoch et al. | 395/405 |

OTHER PUBLICATIONS

Nikkei Electronics, 1993.7.5 (No. 585), pp. 171–178.

SL Enhanced Intel 486TM Microprocessor Family (Intel Corporation) 1993.

*Primary Examiner*—Jack A. Lane
*Attorney, Agent, or Firm*—Limbach & Limbach, LLP

[57] ABSTRACT

A global standby System Management Interrupt ("SMI") is supplied to a CPU when all hardware interrupt requests (except a timer interrupt) are not generated for four seconds. The SMI routine sets the CPU to a stop grant state whereby the CPU goes to a sleep mode. Thus, the same sleep mode function is provided regardless of the operating system environment. Memory banks are reallocated in the DRAM logical address space in memory-size order such that a smaller address range is allocated to a bank with a larger memory size. For any address range allocated to any DRAM bank, there is a sequence of bits having a common value associated with all the memory address values belonging to the address range. Each sequence of bits is used as a decoding condition for the associated address strobe line. The memory address space of the CPU is separated into a plurality of memory address areas. Each memory address area has attribute information indicating the type of memory device to be allocated set in an attribute register file. When a bus cycle for a memory access is executed by the CPU, the attribute information in the memory address area corresponding to the value of the memory address from the CPU is read from the attribute register file and the type of the memory device to be accessed is determined by this attribute information.

21 Claims, 38 Drawing Sheets

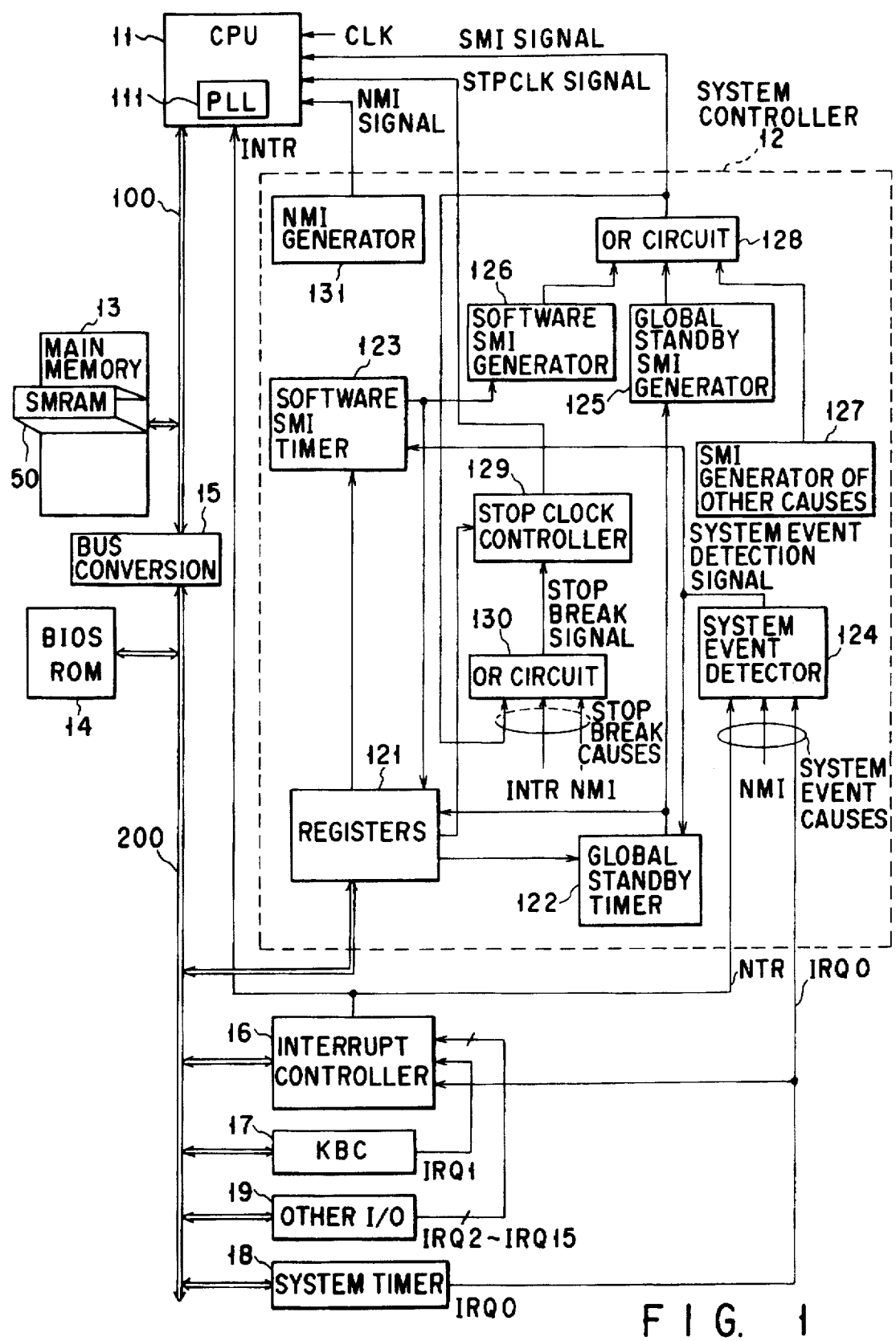
F I G. 1

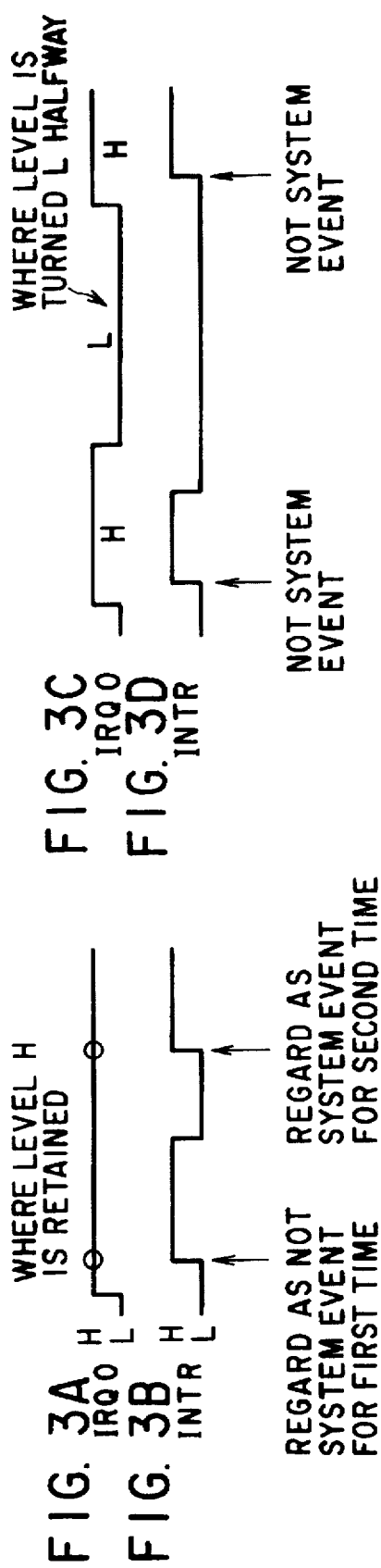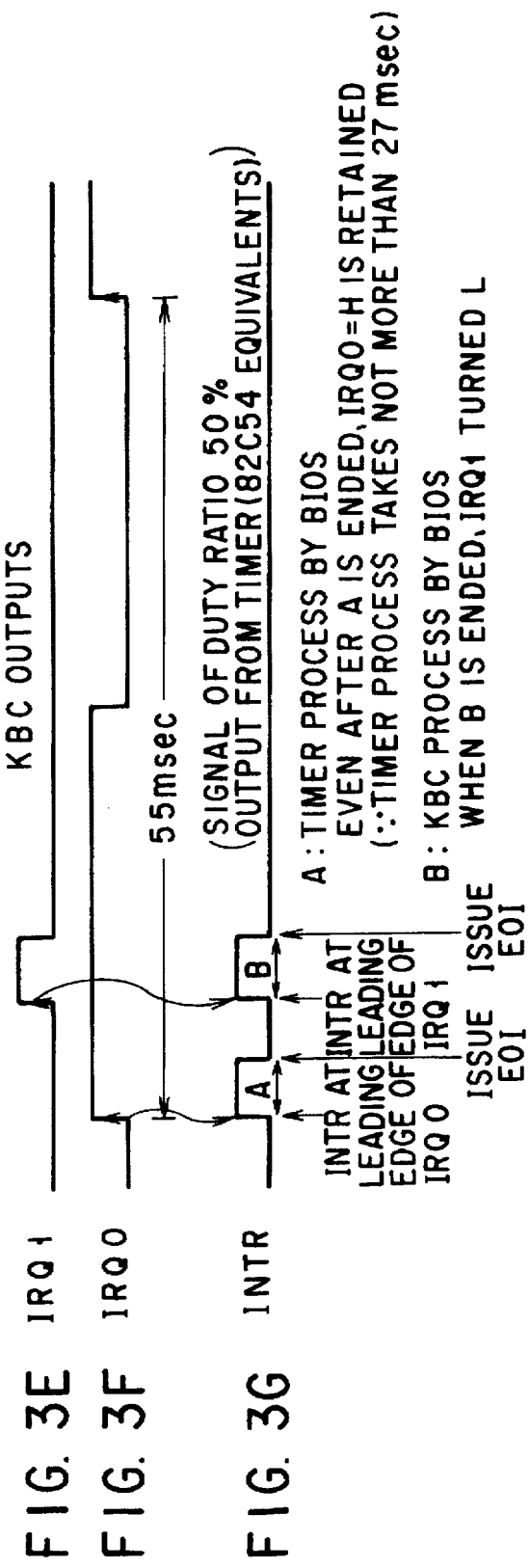

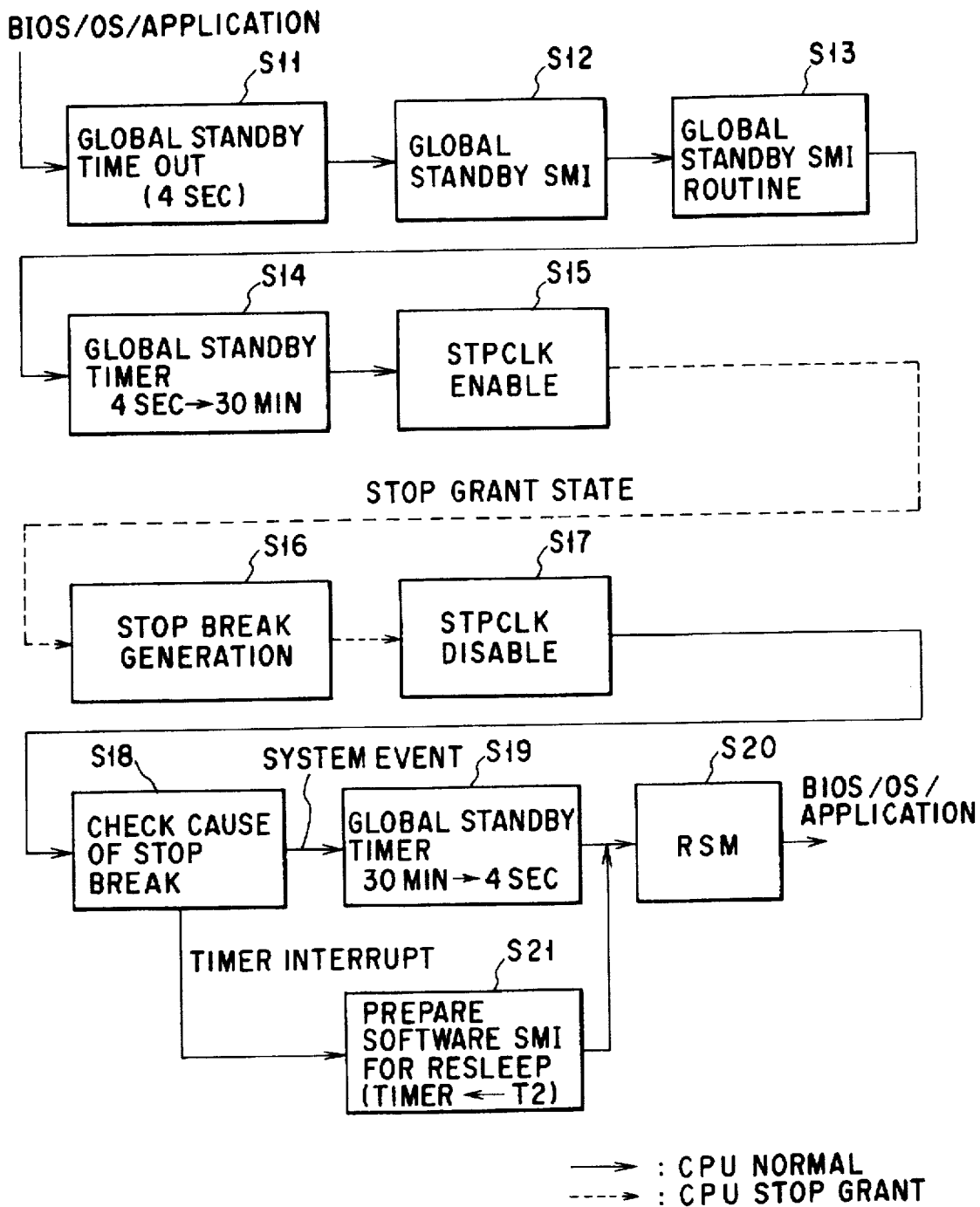
F I G. 6

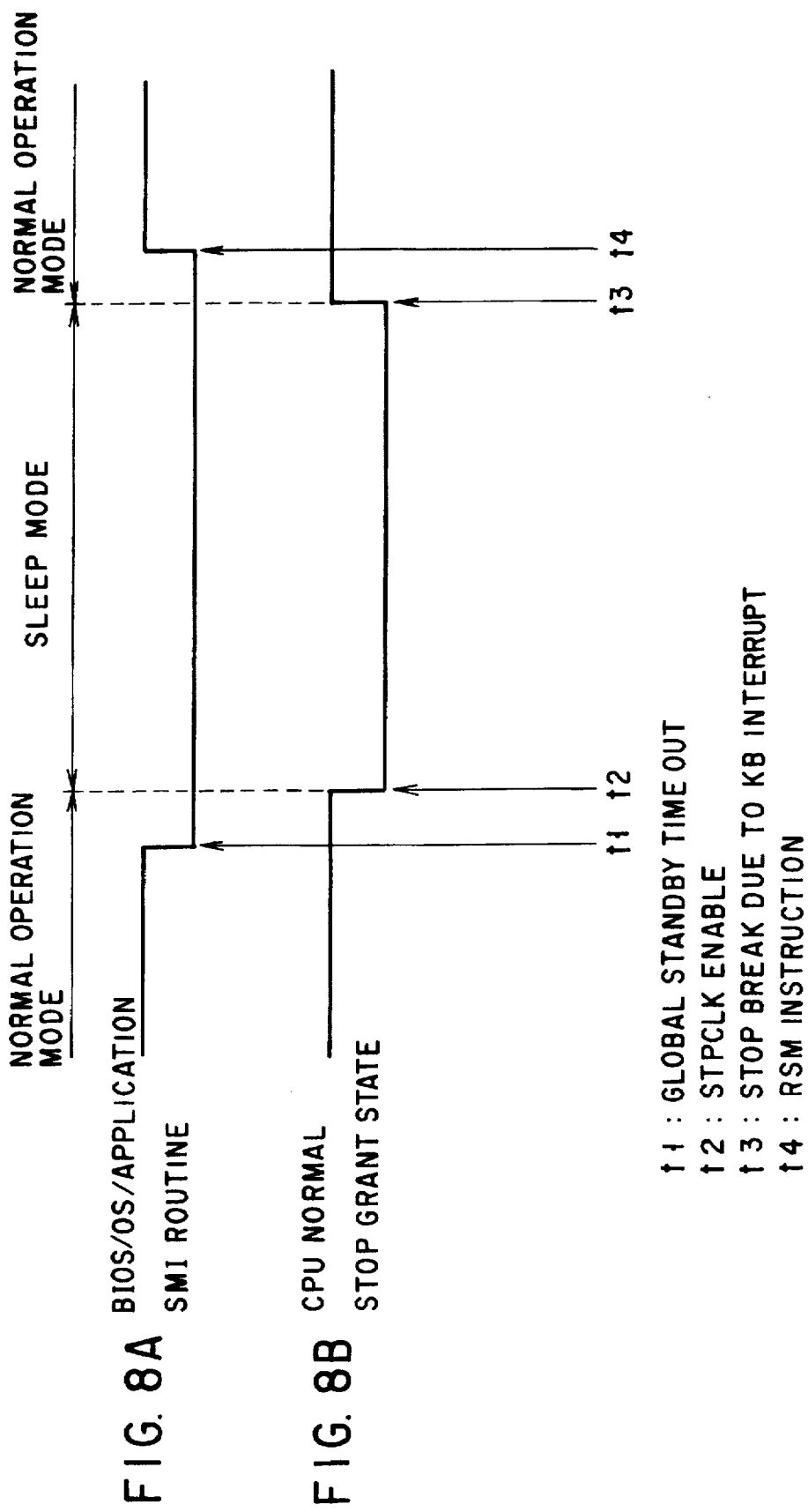

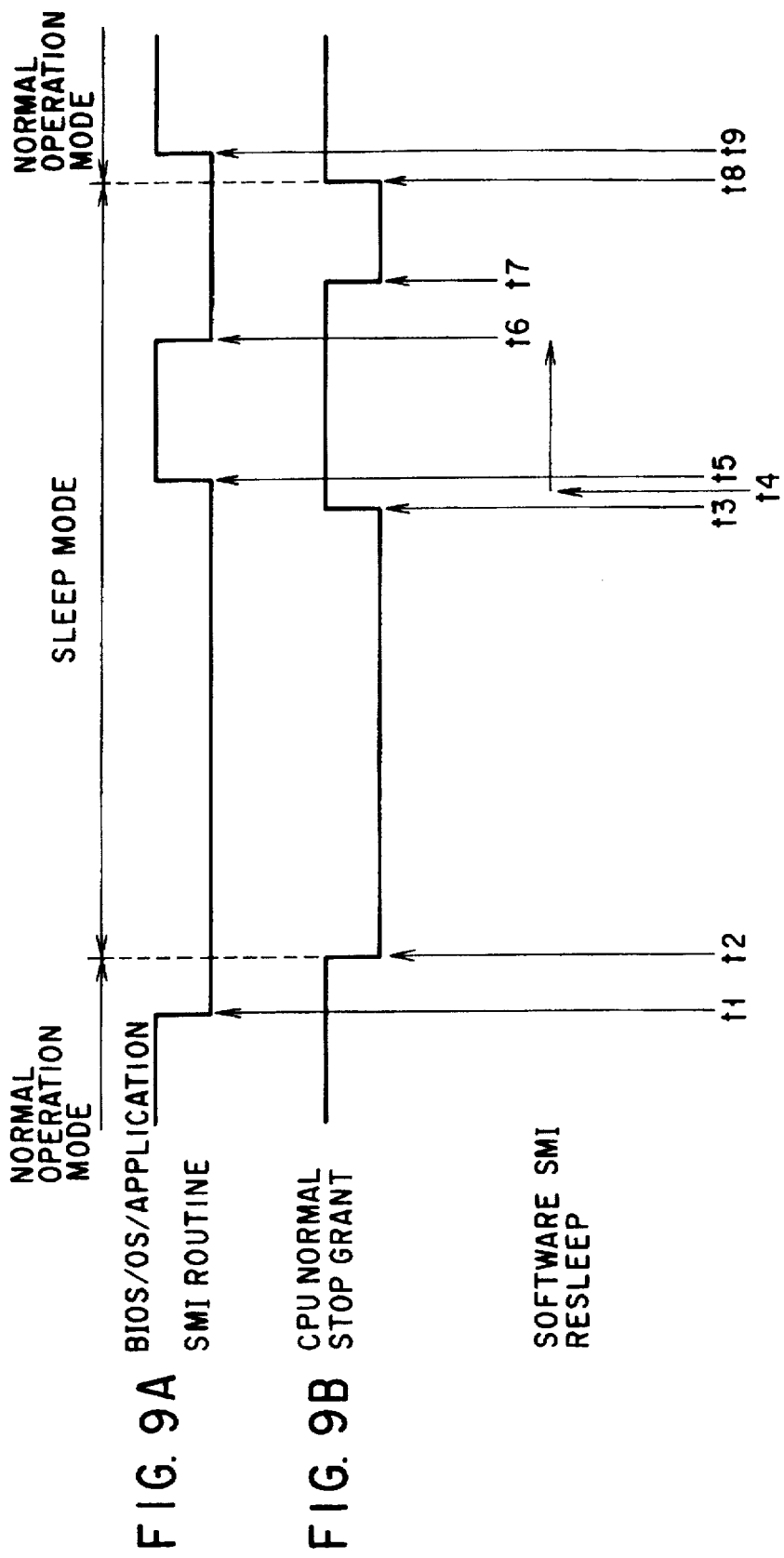

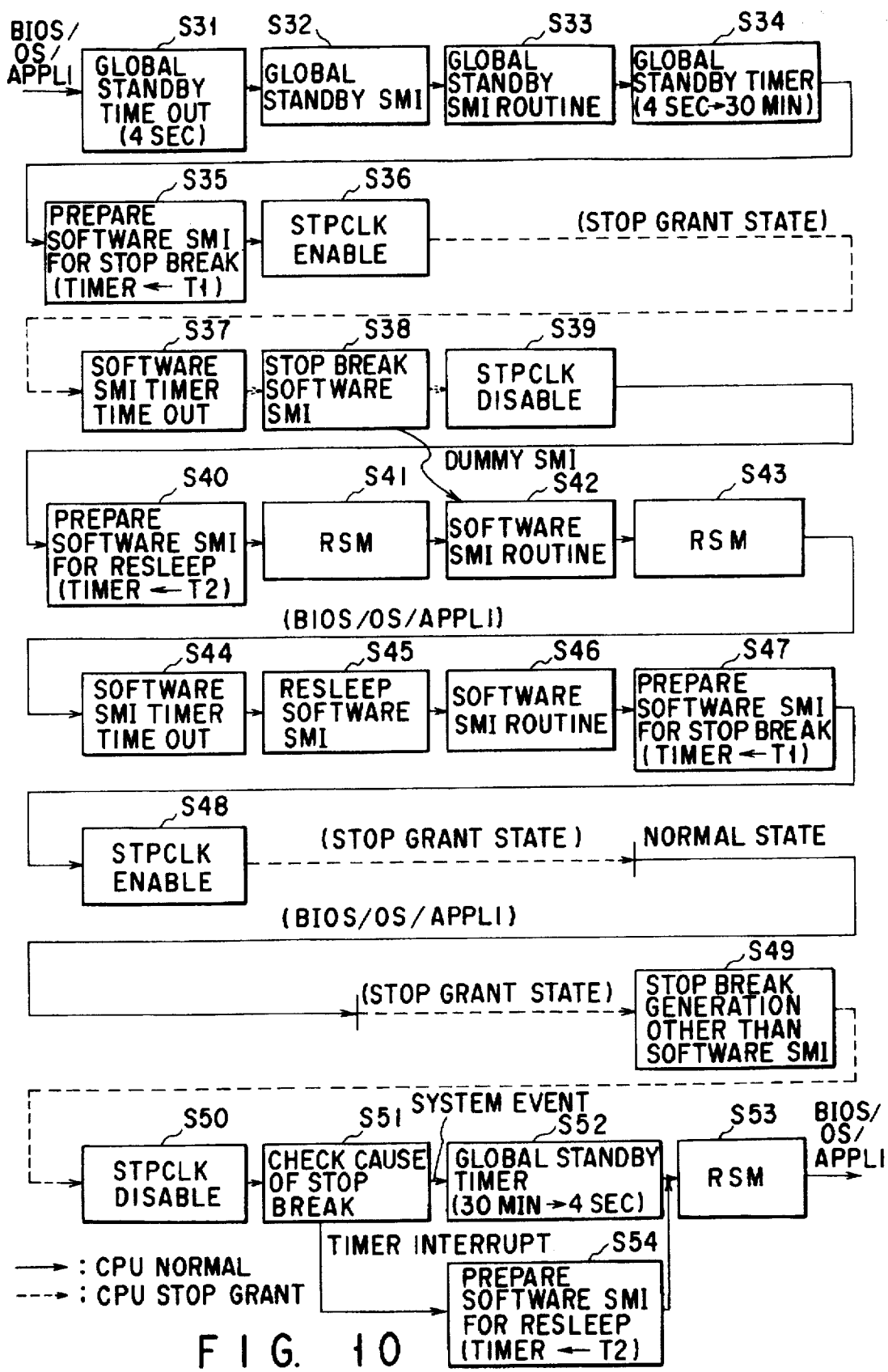
F I G. 10

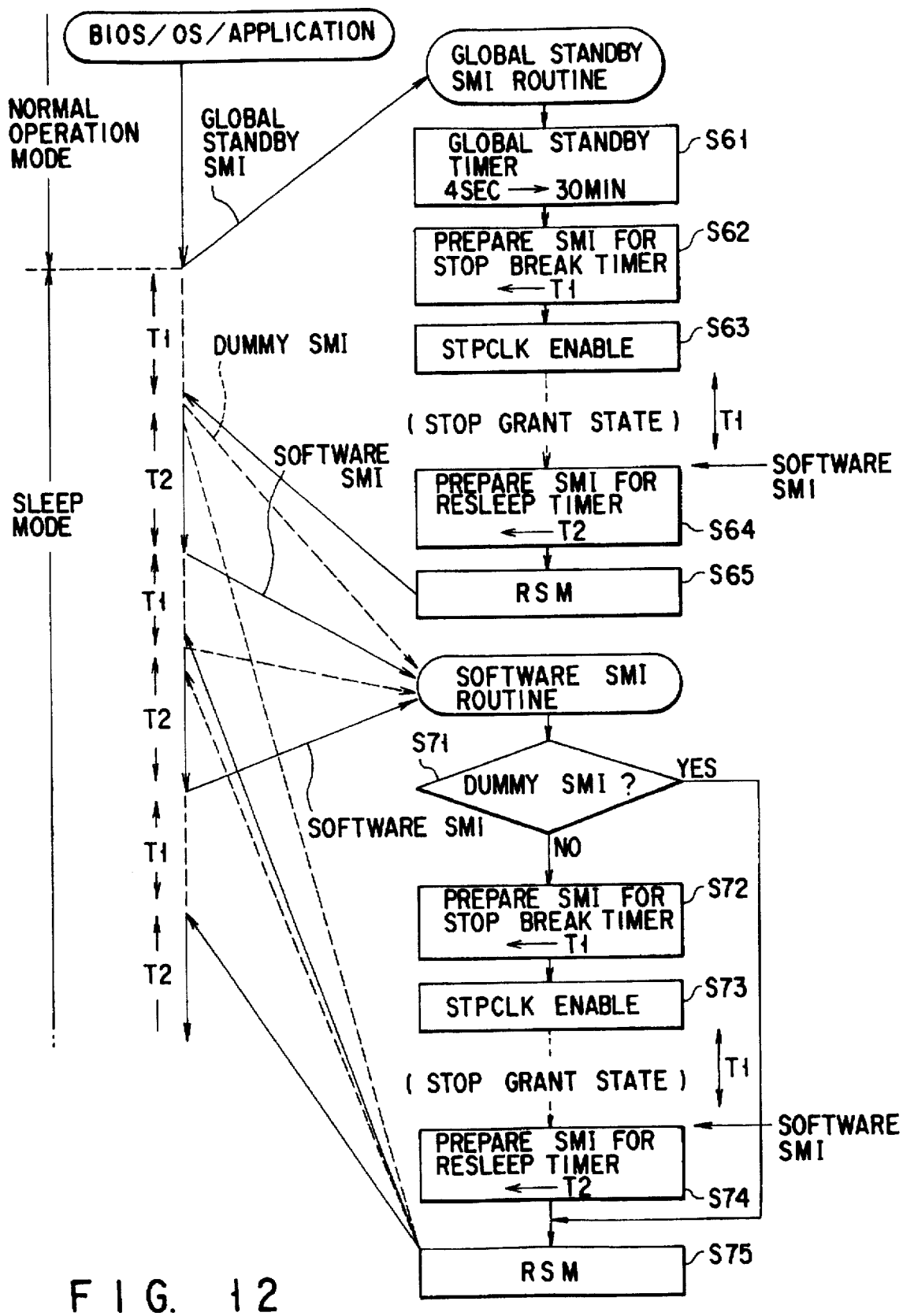
F I G. 12

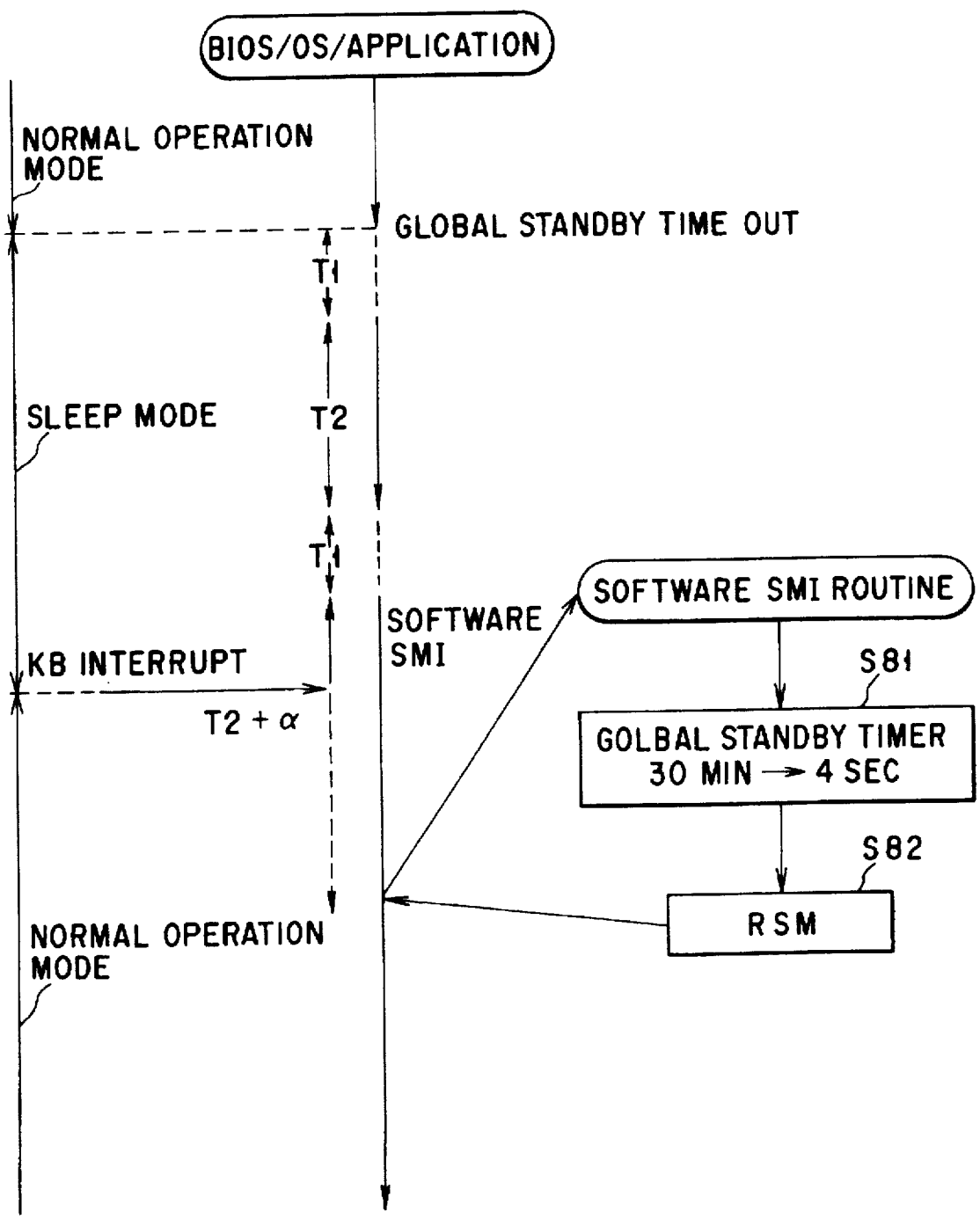
F I G. 13

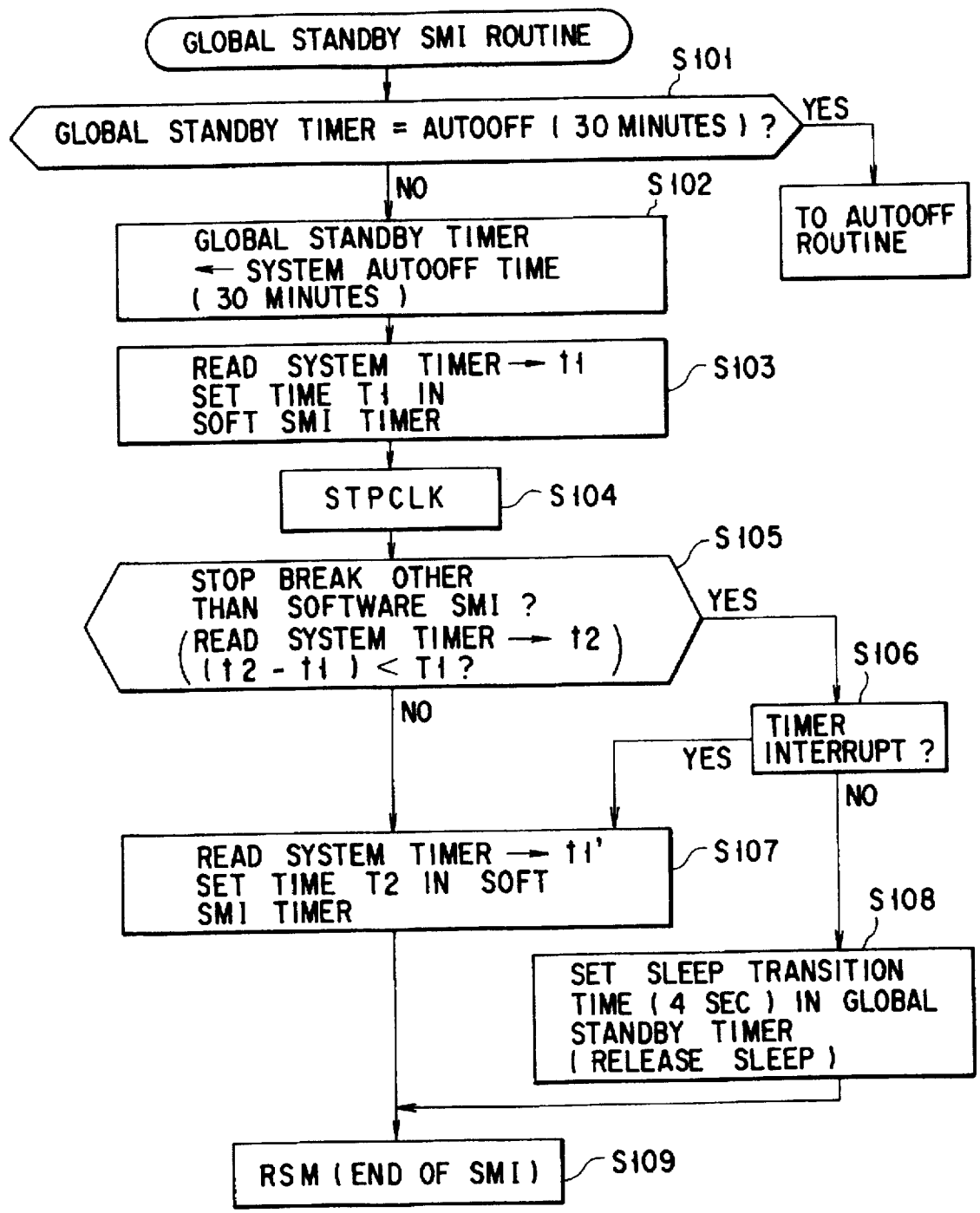
F I G. 15

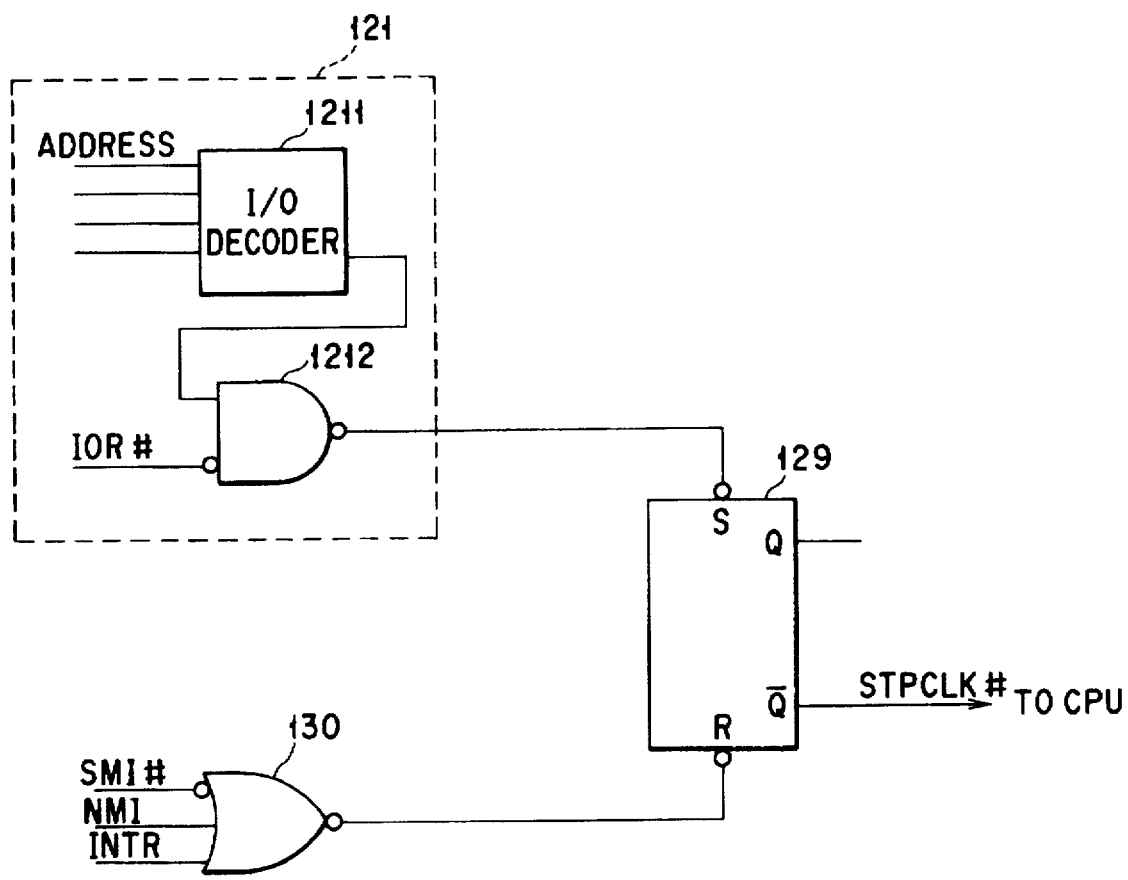
F I G. 17

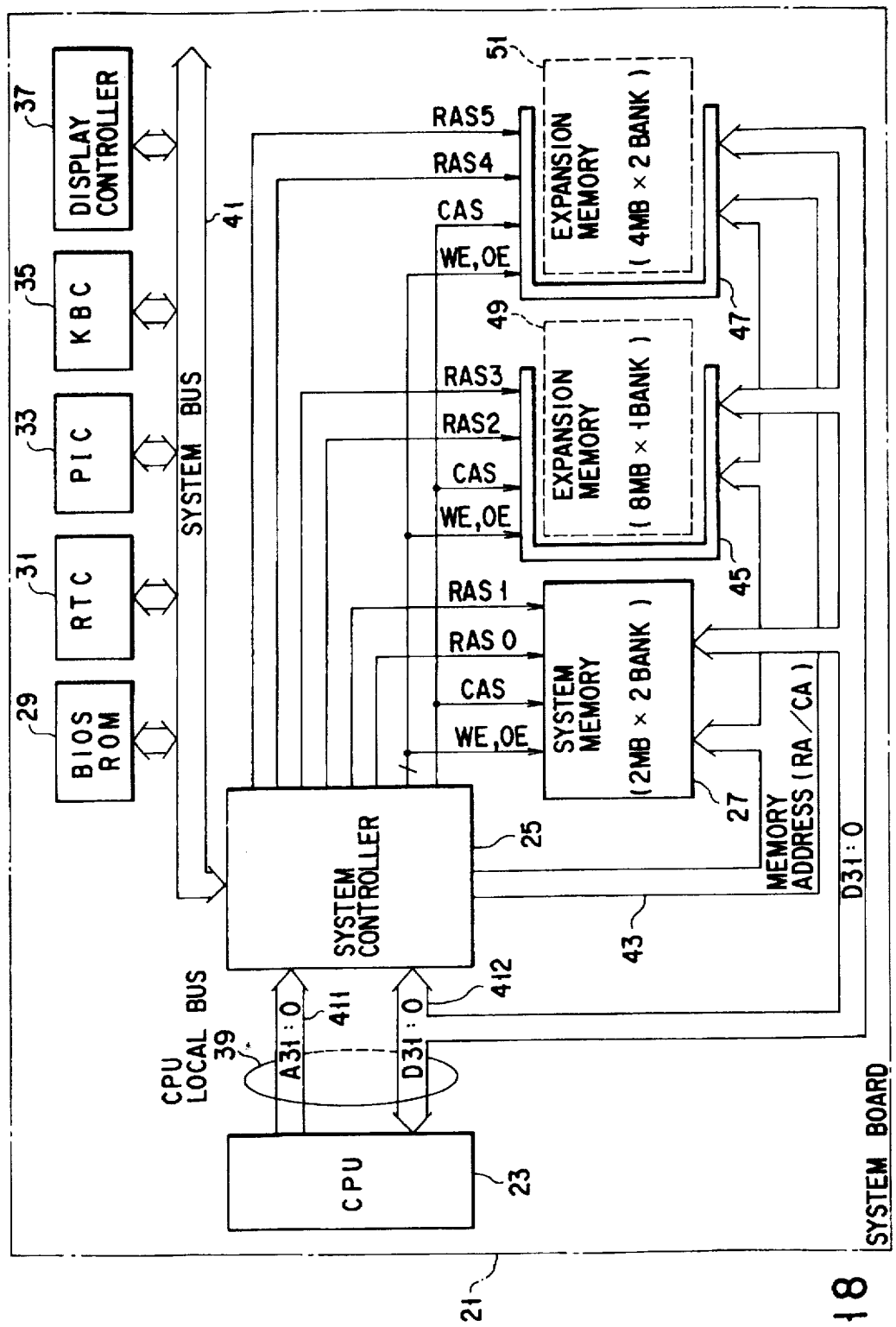
F I G. 18

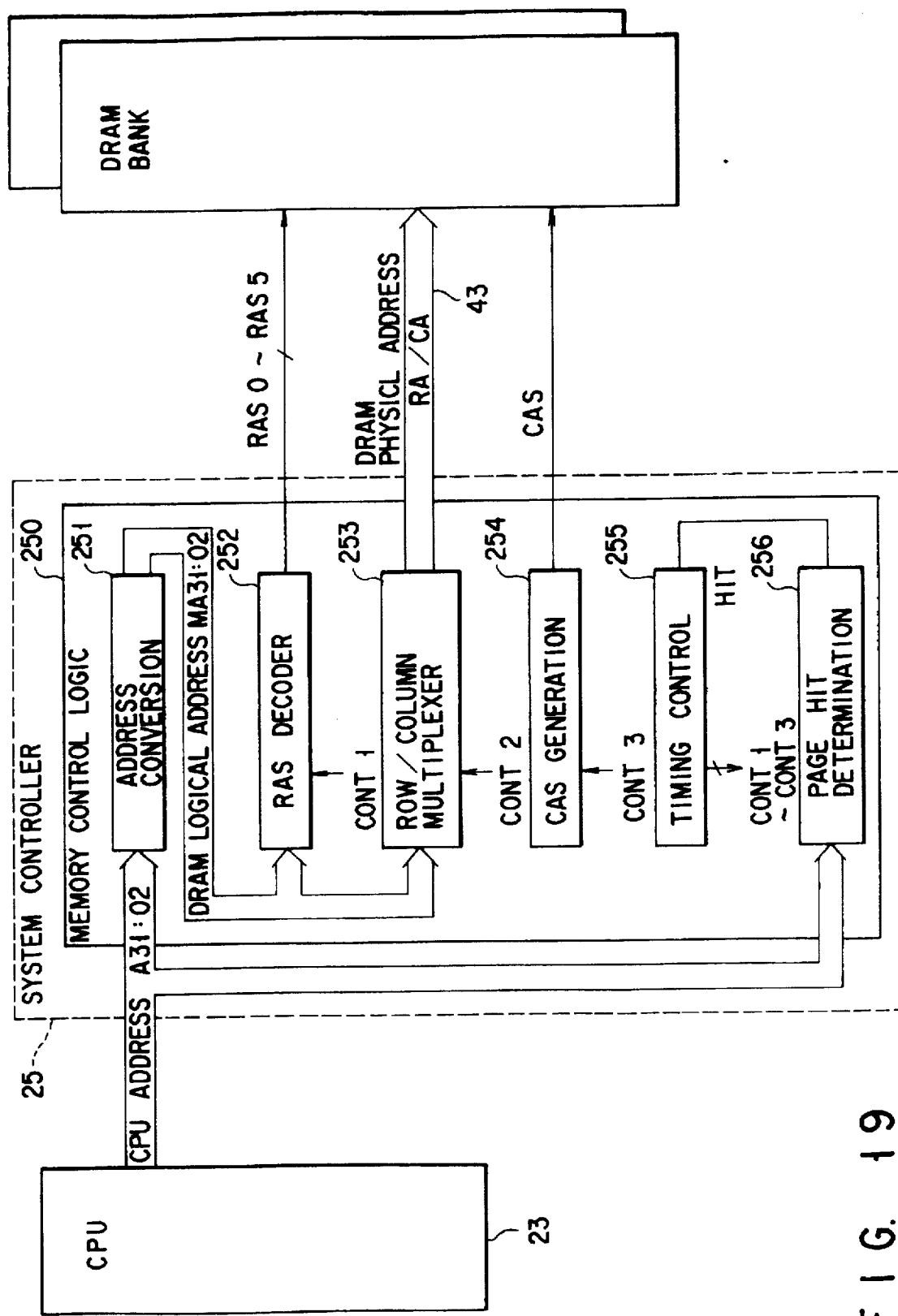
F I G. 19

```
       MA31 · · · · · · · · · · · · · · · · · · · · · · · · · · · · · · · · · · · 2 PAGE SIZE
RAS3   ---- ---- ---- ---- ---- ---- ---- --
RAS2   0000 0000 0XXX XXXX XXXX XXXX XXXX XX   4K BYTES
RAS4   0000 0000 10XX XXXX XXXX XXXX XXXX XX   4K BYTES
RAS5   0000 0000 11XX XXXX XXXX XXXX XXXX XX   4K BYTES
RAS0   0000 0001 000X XXXX XXXX XXXX XXXX XX   2K BYTES
RAS1   0000 0001 001X XXXX XXXX XXXX XXXX XX   2K BYTES
```

X : Don't care
- : NO DECODING
— : ROW ADDRESS
~ : COLUMN ADDRESS

F I G. 22

```
              MA31 · · · · · · · · · · · · · · · · · · · · · · · · · · · · · · 2 PAGE SIZE
       RAS3   ---- ---- ---- ---- ---- ---- ---- --
       ┌RAS2  0000 0000 XXXX XXXX XXX0 XXXX XXXX XX   4K BYTES
GROUP1 │RAS4  0000 0000 XXXX XXXX XX01 XXXX XXXX XX   4K BYTES
(8M+4M │
 +4M)  └RAS5  0000 0000 XXXX XXXX XX11 XXXX XXXX XX   4K BYTES
GROUP2 ┌RAS0  0000 0001 00XX XXXX XXXX 0XXX XXXX XX   2K BYTES
(2M+2M)└RAS1  0000 0001 00XX XXXX XXXX 1XXX XXXX XX   2K BYTES
                            └─────┘        └───┘
                            MA26 MA21      MA13,12,11
```

X : Don't care
- : NO DECODING
— : ROW ADDRESS
~ : COLUMN ADDRESS

F I G. 23

| BANK TYPE | BANK ARRANGEMENT | CAPACITY | ROW ADDRESS | COLUMN ADDRESS |
|---|---|---|---|---|
| (1) | 4 4M-BIT DRAMS EACH CONSISTING OF 512K×8 BITS | 2M BYTES | 10 | 9 |
| (2) | 8 4M-BIT DRAMS EACH CONSISTING OF 1M×4 BITS | 4M BYTES | 10 | 10 |
| (3) | 4 16M-BIT DRAMS EACH CONSISTING OF 2M×8 BITS | 8M BYTES | 11 | 10 |
| (4) | 8 16M-BIT DRAMS EACH CONSISTING OF 4M×4 BITS | 16M BYTES | 11 | 11 |

F I G. 25

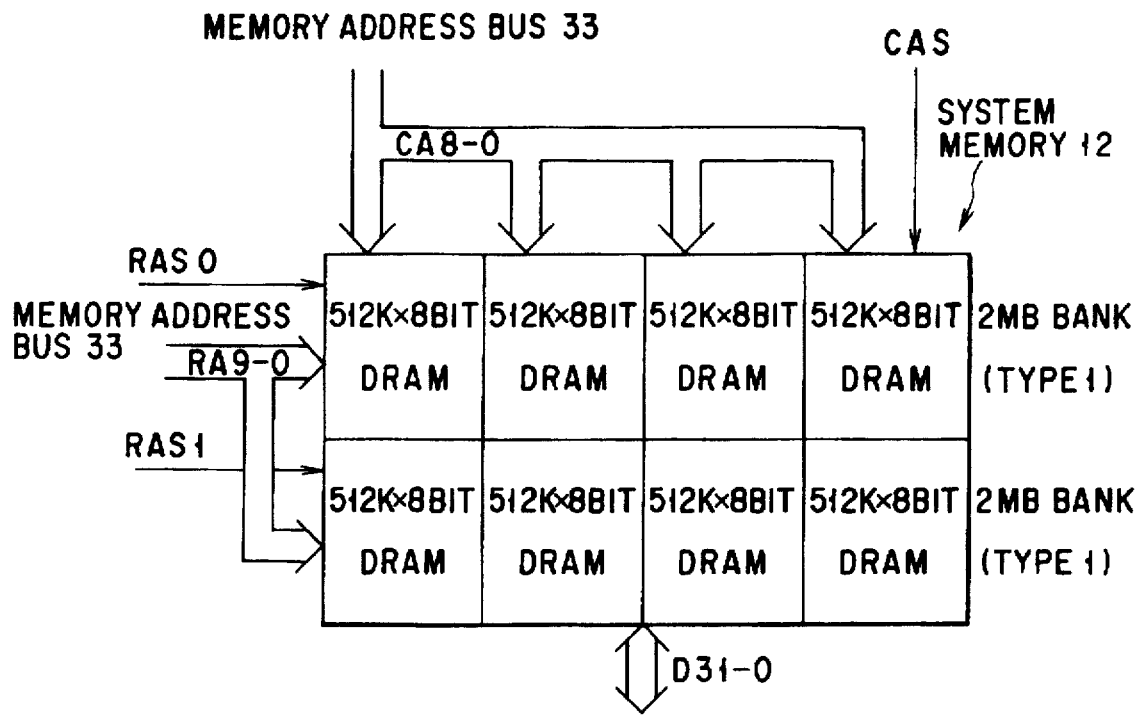
F I G. 26
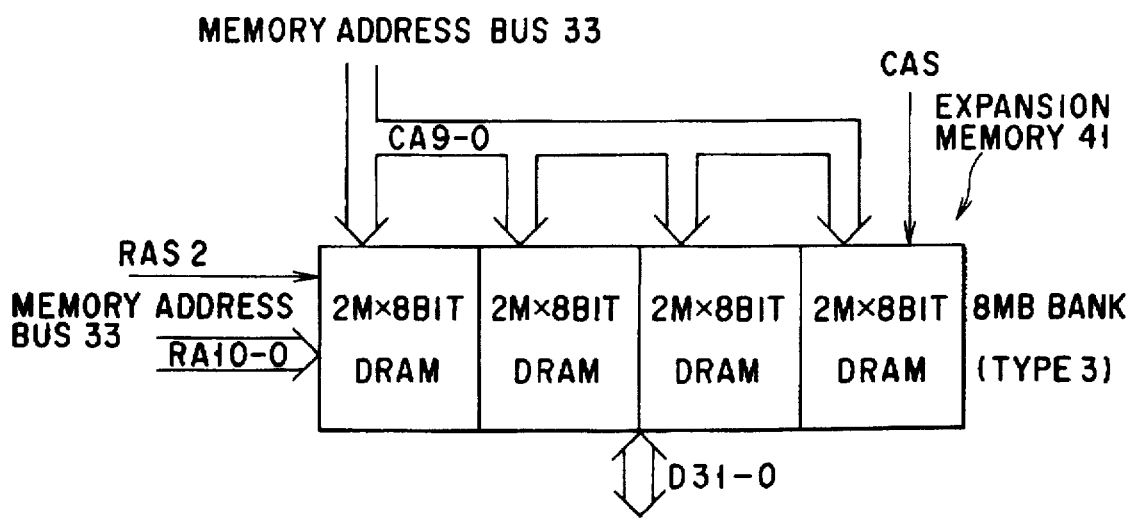
F I G. 27

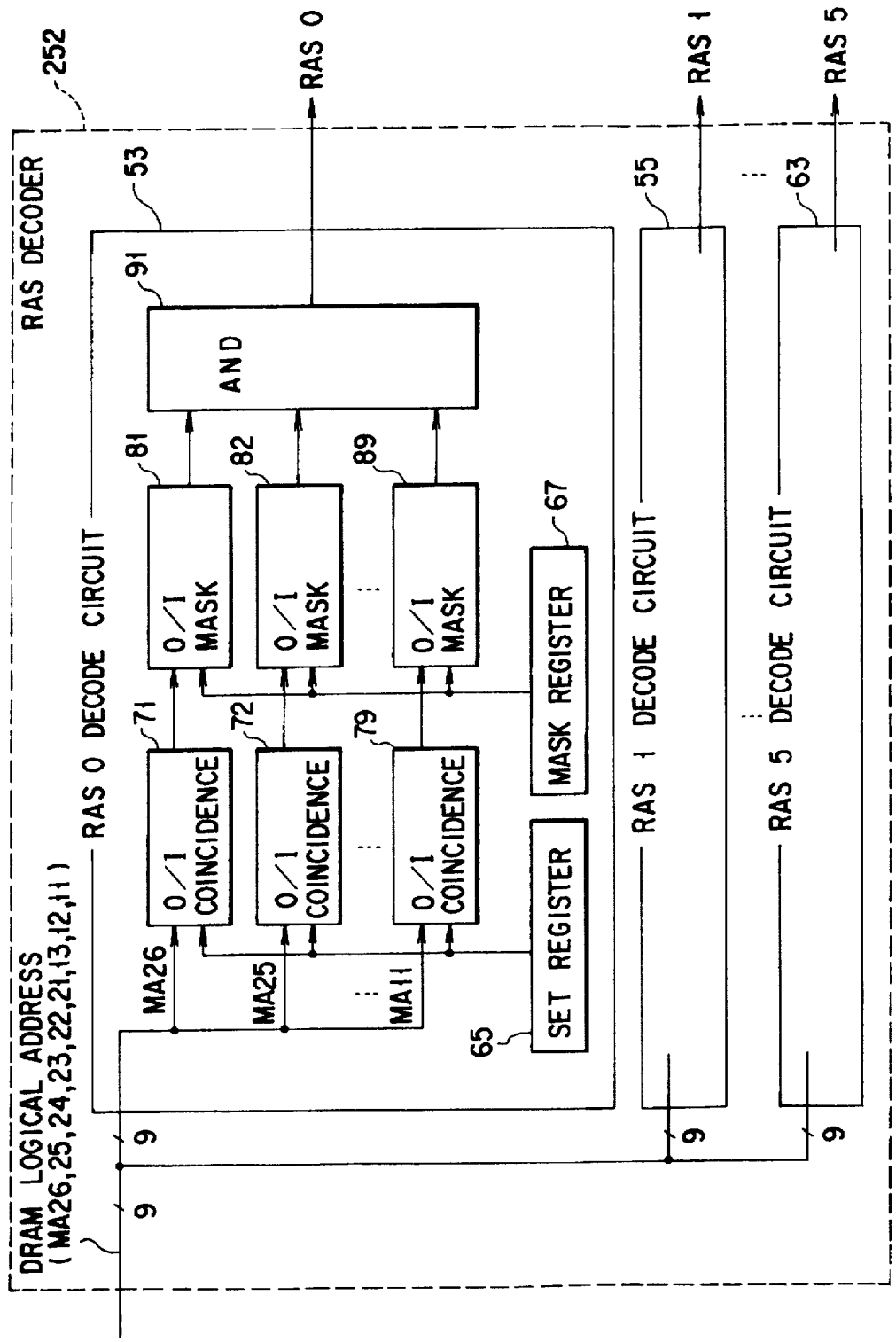
F I G. 30

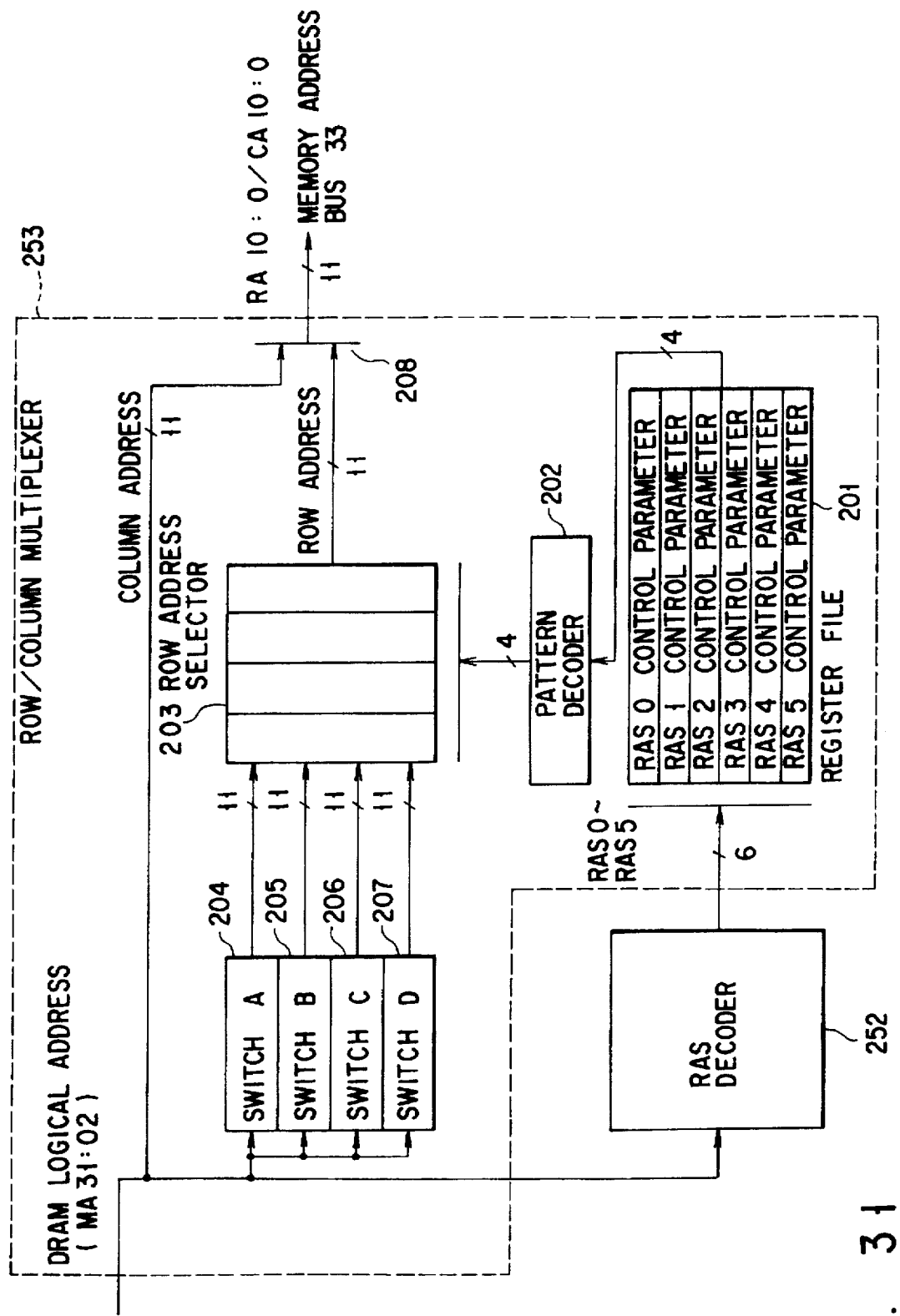
F I G. 31

| ROW ADDRESS | DRAM LOGICAL ADDRESS (START OF ROW ADDRESS) | | | | COLUMN ADDRESS | DRAM LOGICAL ADDRESS |
| --- | --- | --- | --- | --- | --- | --- |
| | 11 | 12 | 13 | 14 | | |
| RA0 | MA11 | MA20 | MA20 | MA20 | CA0 | MA2 (PRESENCE OF BURST) |
| RA1 | MA12 | MA12 | MA21 | MA21 | CA1 | MA3 (PRESENCE OF BURST) |
| RA2 | MA13 | MA13 | MA13 | MA22 | CA2 | |
| RA3 | MA14 | MA14 | MA14 | MA14 | CA3 | |
| RA4 | MA15 | MA15 | MA15 | MA15 | CA4 | |
| RA5 | MA16 | MA16 | MA16 | MA16 | CA5 | |
| RA6 | MA17 | MA17 | MA17 | MA17 | CA6 | |
| RA7 | MA18 | MA18 | MA18 | MA18 | CA7 | |
| RA8 | MA19 | MA19 | MA19 | MA19 | CA8 | |
| RA9 | MA20 | MA21 | MA22 | MA23 | CA9 | |
| RA10 | MA21 | MA22 | MA23 | MA24 | CA10 | |

FIG. 32

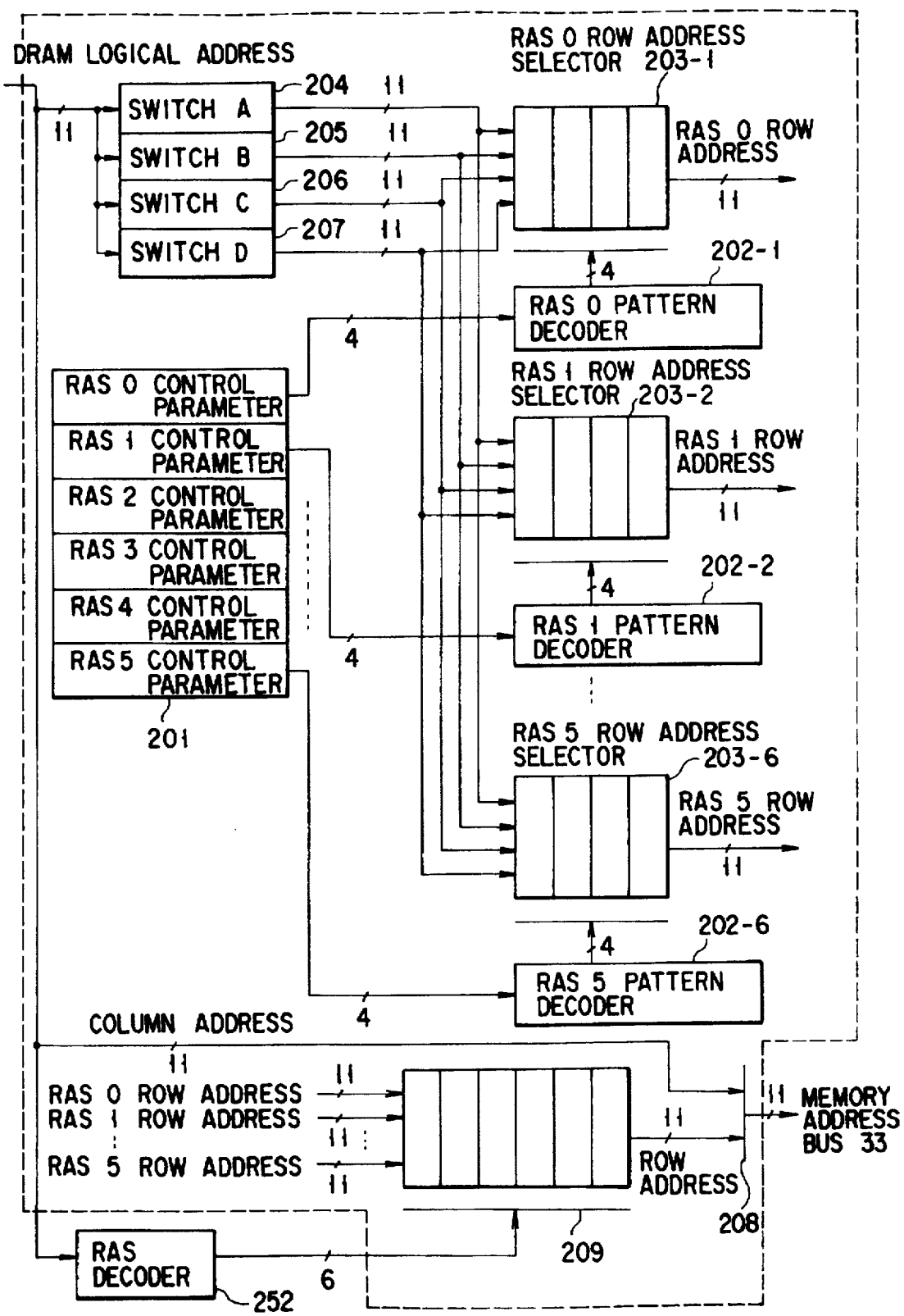
F I G. 33

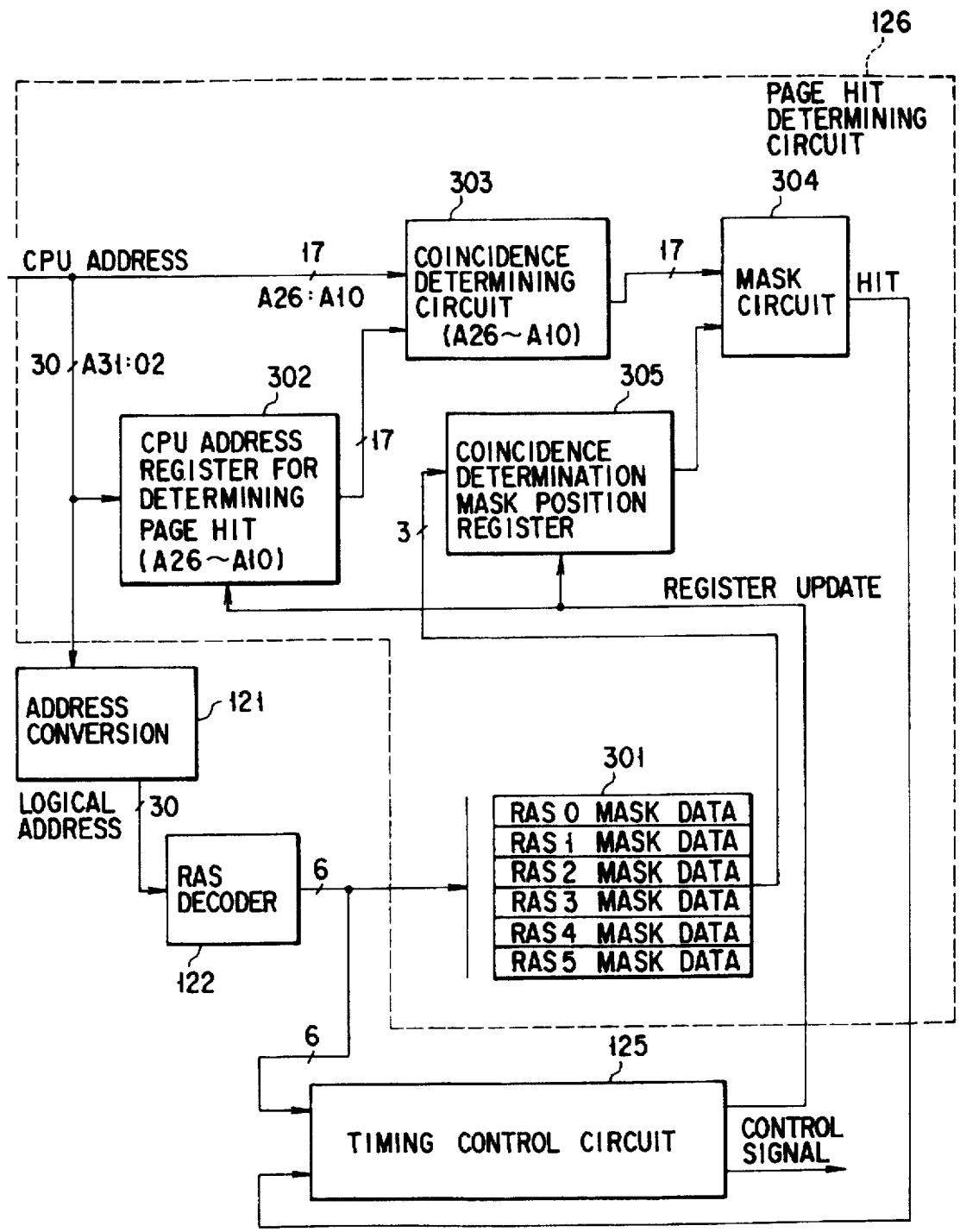
F I G. 34

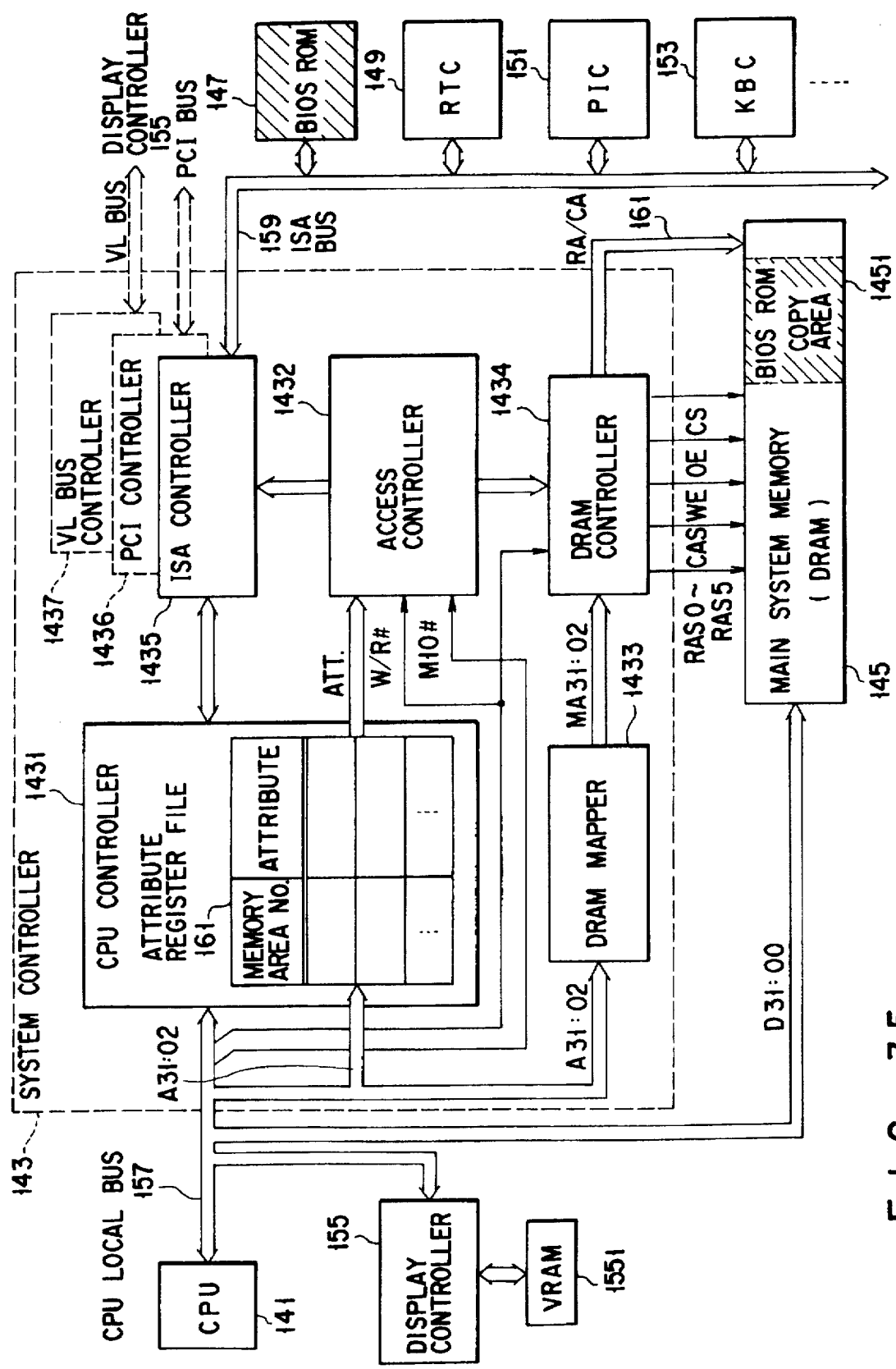
F I G. 35

CPU ADDRESS/DRAM LOGICAL ADDRESS CONVERSION

|  | BIT 7 | BIT 6 | BIT 5 | BIT 4 | BIT 3 | BIT 2 | BIT 1 | BIT 0 |
|---|---|---|---|---|---|---|---|---|
| AREA 40~63 ATTRIBUTE REGISTER | READ ATTRIBUTE | | WRITE ATTRIBUTE | | WP | | CASH | NOT USED |

F I G. 38

| READ ATTRIBUTE | | CONTENT |
|---|---|---|
| BIT 7 | BIT 6 | |
| H | H | DRAM |
| H | L | VL |
| L | H | PCI |
| L | L | ISA |

F I G. 39

| WRITE ATTRIBUTE | | CONTENT |
|---|---|---|
| BIT 5 | BIT 4 | |
| H | H | DRAM |
| H | L | VL |
| L | H | PCI |
| L | L | ISA |

F I G. 40

| DRAM WP | CONTENT |
|---|---|
| BIT 3 | |
| H | WRITE PROTECT |
| L | NOT WRITE PROTECT |

FIG. 41

| CASH | | CONTENT |
|---|---|---|
| BIT 2 | BIT 1 | |
| H | H | WRITEBACK CACHE ENABLE |
| H | L | WRITETHROUGH CACHE ENABLE |
| L | H | RESERVED |
| L | L | CACHE DISABLE |

FIG. 42

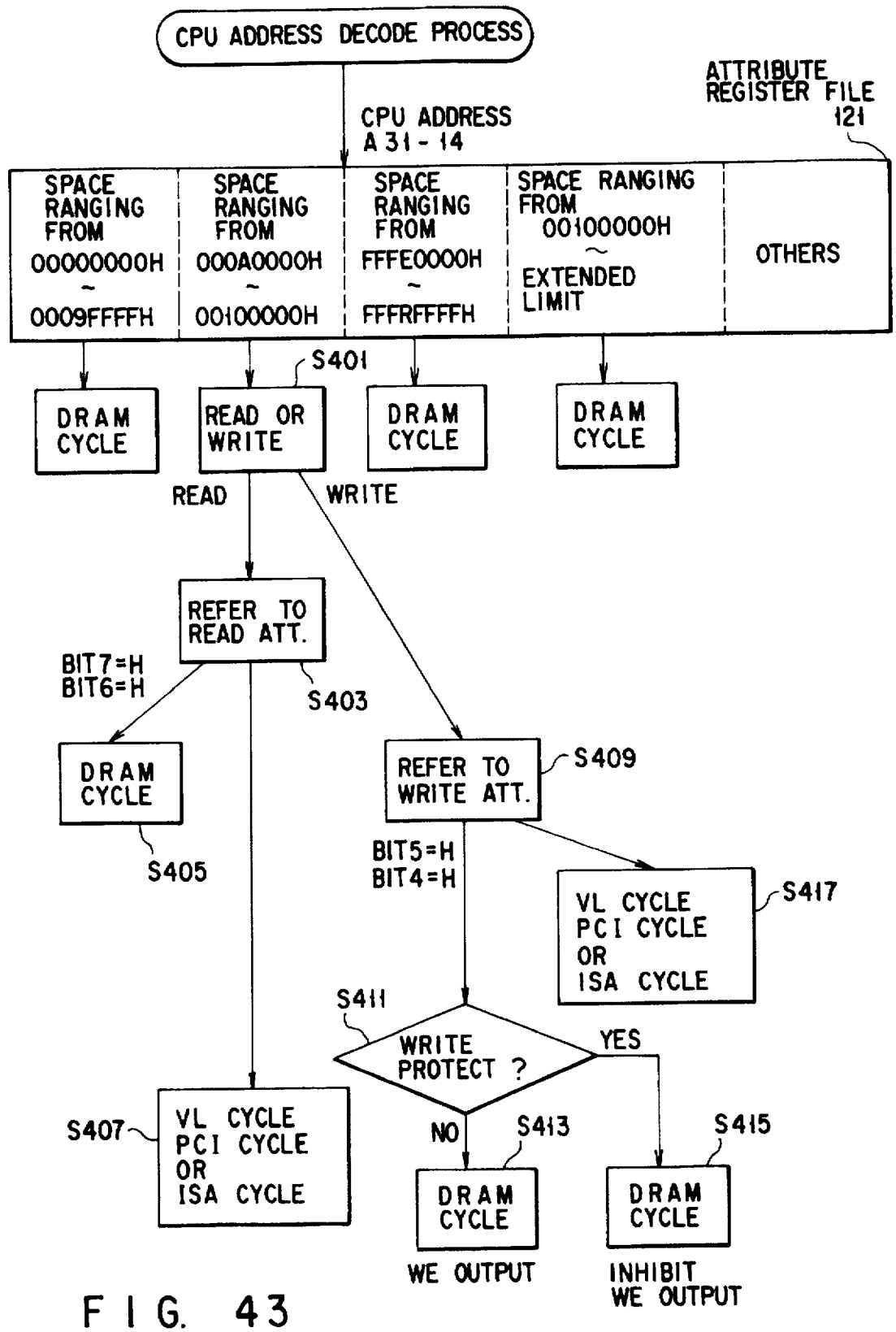
F I G. 43

SYSTEM FOR REALLOCATION OF MEMORY BANKS IN MEMORY SIZED ORDER

BACKGROUND OF THE INVENTION

1. Field of the Invention

The present invention relates generally to a laptop type or notebook type portable personal computer system, and, more particularly, a computer system capable of controlling the operation speed of a CPU to reduce consumed power.

2. Description of the Related Art

Recently, various laptop or notebook type personal portable computers have been developed which are easily portable and operable on battery power. To reduce wasteful consumed power, such a type of portable computer is equipped with a so-called CPU sleep mode function to automatically disable the CPU under a predetermined condition.

A conventional CPU sleep mode function is executed under the condition that no keyboard operation is performed by an operator for more than a given period of time.

More specifically, when an application program waits for a key input, INT16H of BIOS (Basic I/O System) is called and a keyboard control routine is executed. The BIOS's keyboard control routine causes the CPU to run a HALT command to stop executing a program when there is no keyboard input within a given period of time. When the system hardware detects the HALT cycle of the CPU, the system hardware lowers the clock frequency or completely disables the clock, and sets the CPU in the sleep mode, in order to reduce the CPU's consumed power. With the CPU in sleep mode, no program is executed at all by the CPU regardless of whether the clock frequency is reduced or the clock is completely disabled.

An idle state of the CPU which is detectable by the conventional sleep mode function is just the CPU idle when an application program becomes ready for a keyboard input. When an application program waits for the completion of the operation of an I/O device other than the keyboard, therefore, the CPU cannot be set in the sleep mode even if the CPU is in the idle state.

In this case, the CPU power is wasted for the time needed for that I/O device to complete the operation. In particular, when an application program waits to be informed of the completion of the operation from a slow I/O device or from a high-intelligent I/O device such as a bus master, the CPU cannot be set in the sleep mode even if the CPU is in the idle state for a relatively long time. This increases the wasteful CPU power consumed.

As apparent from the above, the conventional sleep mode function cannot accomplish sufficient power saving due to few triggers to set the CPU in the sleep mode.

The BIOS can control the system hardware only under a specific operating system (OS) which is associated with that BIOS. Whether or not the sleep mode function works properly therefore depends on the OS environment greatly, and the sleep mode function may not work at all depending on the OS in use.

Further, the conventional sleep mode function takes time to wake up the CPU from the sleep mode.

When some system event occurs while the CPU is in a sleep mode, the system hardware restarts supplying a clock to the CPU or increases the clock frequency. Even if the clock is set back to the normal state, the CPU cannot start operating immediately. Particularly, the recent high-performance microprocessors equipped with a PLL (Phase Locked Loop), such as Intel 486 series microprocessors that have been developed, manufactured and sold by Intel Corporation holds the start of the CPU operation for a given period (e.g., about 1 ms) after switching the clock for the following reason.

This type of microprocessor has an internal oscillator including the PLL, which generates a fast clock synchronous with an externally supplied clock, and uses this fast clock to accomplish its fast operation. For the microprocessor to operate properly thus requires that the external supplied clock have a stable phase. Otherwise the synchronous operation of the PLL becomes unreliable. If the conventional sleep mode function that switches the CPU clock is employed in a system which uses a PLL-incorporated microprocessor as a CPU, therefore, it takes time to return from the sleep mode, thus deteriorating the system performance.

There is a demand for a faster operation for this type of personal computers, so that high-performance microprocessors having a large cache have recently become popular.

With a cache-incorporated microprocessor used as a CPU, the number of accesses to the main memory can be reduced, contributing to improving the system performance to some degrees.

Even if the CPU has a cache, access to the main memory still occurs: when a cache miss occurs, the CPU should execute a memory read/write cycle to the main memory. To improve the system performance, actually, it is essential that the speed of the CPU's execution of the memory read/write cycle be increased.

A dynamic RAM (DRAM) is normally used as the main memory of a personal computer. While DRAMs are cheaper than static RAMs (SRAMs), the access speed is slower. To overcome this problem, recently, the semiconductor technology has been improved, such as the improvement on DRAM chips, and the improvement on the memory architecture by employing the interleave control has been sought as well.

The memory architecture in personal computers should be designed in consideration of the control of various kinds of expansion memories which are to be installed as desired by users, as well as the control of the internal memory which are mounted on the system board of each personal computer.

The conventional memory control logic provided in personal computers therefore needed a very complicated hardware structure. In particular, the complication of the hardware logic that controls the memory addresses is the direct cause of reducing the memory access speed.

A description will now be given of the principle of the DRAM address control using the conventional memory control logic.

A personal computer is normally provided with a plurality of expansion memory connectors that permit the installation of an expansion memory such as a DRAM card. An expansion memory like a DRAM card has one or more DRAM banks. All the DRAM banks in the internal memory and expansion memory are respectively connected to different row address strobe signal lines (RAS lines). In the memory access control, one of the RAM lines is enabled to select the DRAM bank connected to that RAS line as an access target.

The activation control of the RAS lines is executed by an address decoder in the memory control logic. The address decoder enables one of the RAS lines which has a decoding condition matching with the memory address value from the CPU. The decoding conditions for the individual RAS lines are determined as follows.

All the DRAM banks in the internal memory and expansion memory are arranged in the order of their physical installation positions, i.e., in the order from the system board, expansion memory connector 1, expansion memory connector 2 and so forth, from the one occupying a smaller memory address space in the CPU. The address ranges to be allocated to those DRAM banks are specified in accordance with the memory arrangement, and the decoding conditions for the individual RAS lines are determined in accordance with the address ranges.

To permit any DRAM bank, whatever memory size it has, to be connected to whichever RAM line, the head address indicating the upper limit of the address range allocated to each DRAM bank and the end address indicating the lower limit are both used as the decoding condition for the associated RAS line.

To detect which RAS line has the decoding condition that matches with the memory address from the CPU, therefore, the address decoder should have two comparators for each RAM line. One comparator compares the memory address value from the CPU with the value of the head address of the address range allocated to the associated RAS line, while the other comparator compares the memory address value from the CPU with the value of the end address of the address range allocated to that RAS line. If the memory address value is equal to or greater than the head address value and is smaller than the end address value, the associated RAS line is enabled.

As the conventional memory control logic requires many comparators in the address decoder, a relatively large delay occurs inside the address decoder. This delay lengthens the time for each RAS line to be enabled and causes the reduction in memory access speed.

Such a delay associated with the activation of the RAS lines restricts the memory access performance using the interleave architecture.

Interleave is the technique that switches the RAS lines to be enabled page by page to thereby sequentially access different DRAM banks. To access the same DRAM bank successively, it is necessary to hold the execution of the next memory cycle after the completion of the previous memory cycle for the time in which recharging of the memory cells in that DRAM bank is completed (precharge delay). The use of the interleave can allow one DRAM bank to be accessed while recharging another DRAM bank, thereby eliminating the time loss by the precharge delay that is needed to access the same bank successively.

Since the aforementioned delay associated with the enabling of the RAS lines delays the very speed of switching the RAS lines, the fast accessing performance by the interleave cannot be sufficiently achieved. To accomplish the interleave, actually, an exclusive hardware logic for switching the RAS lines page by page should be provided in addition to the address decoder, and the delay originating from this additional hardware logic deteriorates the fast accessing performance further.

To effectively use the interleave, it is desirable that contiguous address ranges be allocated to memory banks having relatively the same memory size in order to facilitate the grouping of the interleavable memory banks. This scheme can reduce the number of DRAM banks which is not adapted to the interleavable groups, and execute the interleave control on a greater number of DRAM banks.

Since the memory arrangement of the DRAM banks in the system is conventionally determined only by the physical installation position of those DRAM banks as mentioned above, the DRAM banks are allocated in the address spaces quite regardless of the memory sizes. This arrangement restricts the combinations of the interleavable DRAM banks, thus increasing the number of DRAM banks which is not adapted to the interleavable groups.

This conventional arrangement of the DRAM banks in the system into the memory address spaces complicates the hardware structure of the address decoder, thus increasing the delay in the address decoder.

This conventional memory arrangement of the DRAM banks further restricts the combinations of interleavable DRAM banks, which obstructs effectively using the interleave-oriented fast memory access.

This type of personal computers use various kinds of memory devices to provide high performance at a low cost.

Those memory devices are allocated at different memory address spaces. The memory address space where each memory device is allocated is determined by the content of the decoding condition set in the address decoder associated with that memory device.

To determine the memory address map of the overall system, therefore, a complex operation of setting the decoding conditions in all the address decoders individually, decoder by decoder, is needed.

To enhance the system performance, recent personal computers employ the memory architecture that accomplishes a so-called "fast ROM." The "fast ROM" function allows the contents of a slow ROM to be read from a RAM device accessible at a high speed. This function is accomplished by copying the contents of a ROM device to a RAM device and reallocating this RAM device to the same memory address space as the ROM device.

The use of the "fast ROM" function permits a RAM device to be accessed instead of a ROM device. It is therefore possible to fetch BIOS command codes or the like from the RAM device, so that the speed of the execution of an application program that frequently uses a BIOS routine can be improved.

If a ROM device and a RAM device are allocated in the same memory address space, one of two address decoders associated with those two memory devices should be enabled while disabling the other in order to prevent simultaneous read access or simultaneous write access to both memory devices.

Conventionally, such enabling/disabling of the address decoders has been carried out by using I/O control registers provided for the respective address decoders.

When an enable flag is set to an I/O control register, the address decoder associated with that I/O control register is enabled so that an access to the memory device associated with that address decoder is permitted. When a disable flag is set to an I/O control register, the address decoder associated with that I/O control register is disabled, thus inhibiting an access to the memory device associated with that address decoder.

If a ROM device and a RAM device in which the contents of the former device are copied are allocated in the same memory address space as mentioned above, a disable flag should be set to the I/O control register associated with the address decoder of the ROM device, and an enable flag to another I/O control register associated with the address decoder of the RAM device. Such manipulation of the I/O control registers can permit an access only to the RAM device while inhibiting an access to the ROM device.

If the I/O control registers are manipulated erroneously somehow, however, a simultaneous access to a plurality of memory devices may be permitted. In this case, when read accesses or write accesses to two memory devices are simultaneously executed, a critical error occurs, such as a malfunction due to collision of read data or destruction of the memory contents due to erroneous writing of write data.

What can be set by manipulating the I/O control registers is simply enabling or disabling the address decoders, and the enabling and disabling of each address decoder cannot be set separately for the write cycle and the read cycle.

To accomplish the aforementioned "fast ROM" function, therefore, it is necessary to execute the following three processes 1 to 3 upon power on, undesirably requiring much time for the system setup.

Process 1: Open a window to access a RAM device in a memory address space different from the address of the BIOS of the BIOS ROM (F0000H-FFFFH), and copy the contents of the BIOS ROM to the RAM area corresponding to that window.

Process 2: Alter the address decoding condition of the RAM area and reallocate the RAM area in the memory address space F0000H to FFFFH, the same memory address space as that of the BIOS ROM.

Process 3: Disable the address decoder of the BIOS ROM to inhibit an access to the BIOS ROM by manipulating the associated I/O control register. Conventionally, a plurality of address decoders are used to determine the memory allocation for each memory device, so that the determination of the memory address map of the whole system requires a complicated manipulation of setting the decoding conditions in all the address decoders individually, decoder by decoder.

SUMMARY OF THE INVENTION

Accordingly, it is an object of the present invention to provide a computer system which can always ensure the same sleep mode regardless of the OS environment and can sufficiently reduce the CPU's power consumption.

It is another object of this invention to provide a computer system capable of quickly returning a high-performance CPU incorporating a PLL from a sleep mode.

It is a further object of this invention to provide a computer system in which DRAM banks in the system can be optimally arranged in the memory address spaces in accordance with the memory sizes to simplify the decoding conditions in address decoders and effectively use the interleave architecture, thereby improving the memory access speed.

It is a still further object of this invention to provide a computer system in which the types of memory devices to be allocated in different memory address areas can be specified area by area so that the memory address map of the entire system can easily be determined without individually setting the decoding conditions to a plurality of address decoders.

It is a yet still further object of this invention to provide a computer system in which a memory device for permitting a write access and a memory device for permitting a read access can be set separately for each memory address area, so that the read access and write access to the same address can permit the ROM-to-RAM copying to accomplish the "fast ROM" function.

The first feature of the present invention lies in that a computer system embodying this invention comprises a main memory for storing various programs to be executed; an overlay memory for storing a command to call a system management program, the overlay memory being mapped in a part of an address space of the main memory; a CPU having a program execution mode for running a program in the main memory and a system management mode for executing a command in the overlay memory, the CPU being switchable from the program execution mode to the system management mode in response to an interrupt signal supplied to a predetermined interrupt input terminal; CPU sleep means for executing a sleep control routine included in the system management program called by the CPU to switch an operational state of the CPU from a first state to a second state needing less power consumption than the first state; system idle detecting means for monitoring various hardware interrupt request signals to the CPU generated in the computer system and detecting a system idle when all of the hardware interrupt request signals are not generated for a predetermined first time-out time; and means for supplying an interrupt signal indicating a system idle to the predetermined interrupt input terminal of the CPU in response to detection of the system idle by the system idle detecting means, thereby causing the CPU sleep means to switch the operational state of the CPU.

In this computer system, various hardware interrupt request signals in the system are monitored, and a system idle is detected when all the interrupt request signals are not generated for a predetermined period of time, thus setting the CPU to the sleep mode. The number of triggers for setting the CPU to the sleep mode therefore increases, and the CPU can enter the sleep mode when an application program waits for the completion of the operation of an I/O device other than the keyboard as well as at the time CPU idles when the application program stands by for a keyboard input. It is therefore possible to prevent the CPU from being kept in the operational state even when the CPU is idling, thereby sufficiently reducing the power consumption.

The hardware interrupt request signals are used to detect a system idle. Those hardware interrupt request signals are physical signals generated from various I/O devices in the system, and the detection of those signals does not involve the BIOS at all. Further, the process of the CPU sleep means can be invoked only by the supply of an interrupt signal to the CPU, and the activation of this process does not involve the OS and BIOS at all. It is thus possible to detect a system idle at the hardware level and execute the CPU sleep control, thus always ensuring the same sleep mode function regardless of the OS environments.

The second feature of the computer system embodying this invention lies in the use of the CPU, which incorporates a PLL for generating an internal clock in accordance with an external clock and has operation states including a normal state in which a command is executed, a stop clock state in which execution of a command and the external clock are stopped, and a stop grant state which lies between the normal state and the stop clock state and in which execution of a command is stopped and the external clock can be enabled, whereby the CPU is set to the stop grant state from the normal state in response to generation of a stop clock signal indicating clock stop grant and is set back to the normal state from the stop grant state in response to disabling of the stop clock signal, and that the CPU sleep means sets the CPU in the clock stop grant state.

This computer system uses the stop grant state of the CPU for sleeping the CPU. In this state, any command execution is stopped, so that the consumed power of the CPU can be reduced without stopping an external clock. It is therefore possible to return the CPU from the sleep mode without dynamically switching the external clock, ensuring fast returning of the PLL-incorporated and high-performance CPU from the sleep mode.

The third feature of this invention lies in that a computer system embodying this invention comprises a CPU incorporating a PLL for generating an internal clock in accordance with an external clock and having operation states including a normal state in which a command is executed, a stop clock state in which execution of a command and the external clock are stopped, and a stop grant state which lies between the normal state and the stop clock state and in which execution of a command is stopped and the external clock can be enabled, whereby the CPU is set to the stop grant state from the normal state in response to generation of a stop clock signal indicating clock stop grant and is set back to the normal state from the stop grant state in response to disabling of the stop clock signal; stop clock signal generating means for generating the stop clock signal; a main memory for storing various programs to be executed by the CPU; an overlay memory for storing a command to call a system management program, the overlay memory being mapped in a part of an address space of the main memory, the command being executed by the CPU when an interrupt signal is supplied to a predetermined interrupt input terminal of the CPU; CPU sleep means for executing a sleep control routine included in the system management program called by the CPU to instruct the stop clock signal generating means to generate the stop clock signal; system idle detecting means for monitoring various hardware interrupt request signals to the CPU generated in the computer system and detecting a system idle when all of the hardware interrupt request signals are not generated for a predetermined time; means for supplying an interrupt signal indicating a system idle to the predetermined interrupt input terminal of the CPU in response to detection of the system idle by the system idle detecting means, thereby causing the CPU sleep means to execute a process of issuing an instruction to generate the stop clock signal; system event detecting means for monitoring the various hardware interrupt request signals and detecting occurrence of a system event when one of the hardware interrupt request signals is generated; and means for causing the stop clock signal generating means to stop generating the stop clock signal in response to detection of occurrence of a system event by the system event detecting means, thereby returning the CPU to the normal state from the stop grant state, the CPU sleep means including means for permitting the stop clock signal generating means to intermittently generating the stop clock signal so that the CPU alternately repeats the stop grant state and the normal state in a period from generation of the interrupt signal indicating a system idle to detection of occurrence of a system event by the system event detecting means.

In this computer system, the CPU in sleep mode alternately repeats the stop grant state and the normal state for a given period of time. Although any command execution by the CPU is stopped in the stop grant state, a command execution can restart in the normal state. Accordingly, during the sleep mode, i.e., during the period from the detection of a system idle to the detection of the occurrence of a system event, the execution of a program by the CPU is not stopped completely and the CPU can intermittently execute a program. Even if the CPU is set to the sleep mode due to erroneous detection of an idling state while the CPU is executing a program which performs an operation without using I/O devices, such as a benchmark test for memory, therefore, it is possible to prevent the execution of the program from being suddenly stopped, disabling the subsequent process. As the average operational speed of the CPU in sleep mode can be slowed down, the power consumption of the CPU can be reduced sufficiently on average in this sleep control system.

A computer system according to another aspect of this invention comprises a plurality of memory banks to which a plurality of access control signals are respectively assigned and which are independently accessible; an address decoder for detecting matching or mismatching of a plurality of decoding conditions, corresponding to the plurality of access control signals and set in the address decoder, with a memory address from a CPU, and enabling an access control signal line corresponding to a matched decoding condition to thereby select a memory bank; means for detecting memory sizes of the plurality of memory banks; memory reallocation means for reallocating the plurality of memory banks in memory address spaces of the CPU in a memory-size order in such a way that a memory bank with a larger memory size is allocated in a smaller memory address space and determining memory address ranges to be respectively allocated to the plurality of memory banks in accordance with that memory arrangement; and means for detecting a sequence of bits commonly present only in binary data indicating all memory address values belonging to a memory address range corresponding to each of the memory banks, and setting the common sequence of bits in the address decoder as a decoding condition of each of the access control signal lines.

In this computer system, the memory sizes of a plurality of memory banks are detected and the order of the allocation of the memory banks in the memory address space is determined by the memory sizes, not by the physical installing positions of the memory banks. In this case, a plurality of memory banks are allocated in the memory address space of the CPU in such a way that a memory bank with a larger memory size is allocated in a smaller memory address space.

In this memory arrangement, the address ranges allocated to the respective memory banks smoothly match with the address boundaries defined by the memory address values that are expressed by binary data. Accordingly, all the memory address values belonging to any address range should have a sequence of bits common only in that address range. This common sequence of bits is used as a decoding condition to enable the access control signal associated with a memory bank to which the address range corresponding to this bit sequence is allocated.

It is therefore unnecessary to use both the value of the head address of each address range and the value of the end address thereof as a decoding condition, thus simplifying the decoding condition for each access control signal. With this feature, the address decoder simply needs to detect the matching/mismatching of the value of the memory address from the CPU with the decoding condition for each access control signal. This can significantly simplify the hardware structure of the address decoder as compared with the convention one, thus reducing a delay in the address decoder and improving the memory access speed.

Since this memory allocation allocates contiguous address ranges to memory banks having relatively equal memory sizes, it becomes easier to group the memory banks to make combinations of interleavable banks. This can reduce the number of memory banks which is not adapted to the interleavable groups, ensuring the interleave control of a greater number of memory banks. It is therefore possible to make the best use of the interleave, thus increasing the memory access speed.

Further, the structure of the address decoder to detect the matching/mismatching of the value of the memory address from the CPU with the decoding condition for each access control signal is suitable for accomplishing the page interleave architecture which access different banks page by page.

To use the page interleave, access control signals to be enabled should be switched page by page. This switching can be accomplished simply by changing the decoding condition set in the address decoder. It is thus possible to realize the page interleave architecture without adding an exclusive hardware logic to accomplish the page-by-page switching of access control signals.

A computer system according to a further aspect of this invention comprises a CPU; plural types of memory devices; a plurality of memory controllers, respectively coupled to the plural types of memory devices, for controlling access to the memory devices; a register file including a plurality of I/O control registers provided in association with a plurality of memory address areas constituting memory address space addressable by the CPU, each register being set with attribute information designating a type of a memory device to be allocated in an associated memory address area; and decoding means, coupled to the register file, for determining a memory device to be accessed in accordance with the attribute information of a memory address area corresponding to a value of a memory address from the CPU and instructing one of the memory controllers which is associated with the memory device to be accessed to execute a memory access, when the CPU executes a bus cycle for a memory access.

In this computer system, the memory address space of the CPU is separated into a plurality of memory address areas which are controlled area by area, and attribute information indicating the type of a memory device to be allocated in each memory address area is defined in that area.

When the CPU has executed a bus cycle for a memory access, the decoding means refers to the attribute information of the memory address area corresponding to the value of the memory address from the CPU, and the memory device to be accessed is determined in accordance with the attribute information. The memory address map of the entire system can easily be determined merely by the contents of the attribute information in the register file, without individually setting the decoding conditions in a plurality of address decoders. Further, single attribute information only gives permission for access to a single memory device, so that memory devices to be allocated in the individual memory address areas can be defined specifically. It is thus possible to surely prevent two different memory devices from being erroneously allocated in the same memory address space.

Another feature of this computer system lies in that two attribute information (read attribute information and write attribute information) for the read cycle and write cycle are defined for each memory address area and the decoding means performs a decoding operation in accordance with the read attribute information in the read cycle and performs a decoding operation in accordance with the write attribute information in the write cycle.

In this computer system, the memory address map for the read cycle and the memory address map for the write cycle are determined by the read attribute information and the write attribute information. If accesses to a ROM device and a RAM device are permitted by the read attribute information and write attribute information associated with the same memory area, therefore, the read access and write access to the same address can achieve the ROM-to-RAM copying to accomplish the "fast ROM" function. This feature eliminates the need for an operation to open a window for accessing the RAM device on a memory address space different from that for the ROM device.

Further, single read attribute information gives permission only for a read access to a single memory device and single write attribute information also gives permission only for a write access to a single memory device. It is therefore possible to surely prevent a simultaneous read access or a simultaneous write access to two different memory devices.

BRIEF DESCRIPTION OF THE DRAWINGS

FIG. 1 is a block diagram showing the structure of a computer system according to one embodiment of the present invention;

FIGS. 3A to 3G are diagrams for explaining the operational principle of a system event detector provided in the system of this embodiment;

FIG. 6 is a diagram for explaining the first CPU sleep control operation to keep the CPU in a stop grant state during a sleep mode in the system of this embodiment;

FIG. 7 is a diagram for explaining a resleep process when a stop break occurs due to a timer interrupt in the CPU sleep control operation in FIG. 6;

FIGS. 8A and 8B are diagrams for explaining an operation during a period from the point where the CPU has entered the sleep mode to the point where the CPU returns to the normal operation mode in the CPU sleep control operation in FIG. 6;

FIGS. 9A and 9B are diagrams for explaining a resleep process which is executed in response to the occurrence of a stop break caused by a timer interrupt in the CPU sleep control operation in FIG. 6;

FIG. 10 is a diagram for explaining the first CPU sleep control operation to alternately switch the CPU between the stop grant state and the normal state during the sleep mode in the system of this embodiment;

FIG. 12 is a flowchart illustrating sequences of processes for a global standby SMI routine and a software SMI routine needed to accomplish the CPU sleep control operation in FIG. 10;

FIG. 13 is a flowchart illustrating a sequence of processes that the software SMI routine in FIG. 12 executes when a system event occurs;

FIG. 15 is a flowchart illustrating the detailed sequence of processes for the global standby SMI routine needed to accomplish the CPU sleep control operation in FIG. 10;

FIG. 17 is a detailed circuit diagram of a stop clock controller 129 shown in FIG. 1;

FIG. 18 is a block diagram showing the structure of a computer system according to a second embodiment of the present invention;

FIG. 19 is a block diagram showing a memory control logic in a system controller provided in the system of the second embodiment;

FIG. 22 is a diagram showing decoding conditions for RAS lines respectively connected to the DRAM banks provided in the system of the second embodiment;

FIG. 23 is a diagram showing decoding conditions for RAS lines which are used to accomplish the page interleave architecture in the system of the second embodiment;

FIG. 24 is a flowchart illustrating a sequence of initialization processes for a memory control logic which is executed by an IRT routine when the system of the second embodiment is powered on;

FIG. 25 is a diagram exemplifying the types of DRAM banks which are supported by the system of the second embodiment;

FIG. 26 is a diagram showing one example of the memory structure of a system memory which is mounted on the system board of the system of the second embodiment;

FIG. 27 is a diagram showing one example of the memory structure of an expansion memory which is installed in an expansion memory slot provided in the system of the second embodiment;

FIG. 30 is a circuit diagram exemplifying a specific structure of an RAS decoder included in the memory control logic in FIG. 19;

FIG. 31 is a circuit diagram exemplifying the specific structure of a row address/column address multiplexer included in the memory control logic in FIG. 19;

FIG. 32 is a diagram for explaining the row address switching operation of the row address/column address multiplexer in FIG. 31;

FIG. 33 is a circuit diagram showing another example of the specific structure of a row address/column address multiplexer included in the memory control logic in FIG. 19;

FIG. 34 is a circuit diagram exemplifying the specific structure of a page hit determining circuit included in the memory control logic in FIG. 19;

FIG. 35 is a block diagram showing the structure of a computer system according to a third embodiment of the present invention;

FIG. 38 is a diagram showing the format of attribute information set in the attribute register file provided in the system in FIG. 35;

FIG. 39 is a diagram showing the contents of read attribute information included in the attribute information in FIG. 38;

FIG. 40 is a diagram showing the contents of write attribute information included in the attribute information in FIG. 38;

FIG. 41 is a diagram showing the contents of DRAM write protect information included in the attribute information in FIG. 38;

FIG. 42 is a diagram showing the contents of caching control information included in the attribute information in FIG. 38;

FIG. 43 is a flowchart illustrating a sequence of processes for decoding a CPU address in the system of the second embodiment.

DETAILED DESCRIPTION OF THE PREFERRED EMBODIMENTS

Figure 2:
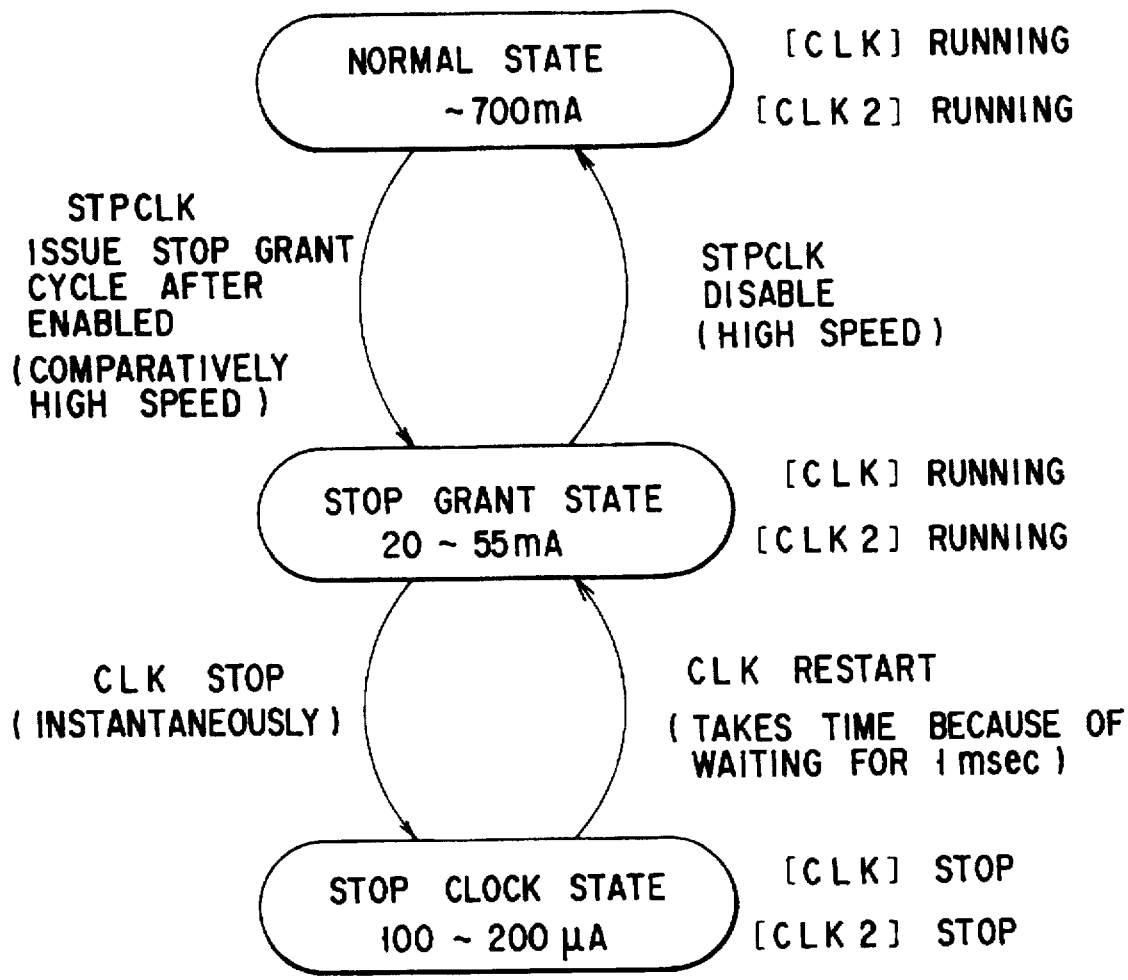
FIG. 2 is a diagram for explaining three operational states of a CPU provided in the system of this embodiment.

Preferred embodiments of the present invention will now be described referring to the accompanying drawings.

FIG. 1 illustrates the structure of a computer system according to one embodiment of the present invention. This computer system is a laptop or notebook type personal computer system which comprises a CPU 11, a system controller 12, a main memory 13, a BIOS ROM 14 and a bus converter 15.

The CPU 11 and the main memory 13 are connected to a CPU bus 100 including a 32-bit data bus. The CPU bus 100 is connected via the bus converter 15 to a system bus 200 with the ISA specification. The system bus 200 includes a 16-bit data bus.

This system further comprises an interrupt controller 16, a keyboard controller 17, a system timer 18 and other various I/O devices 19, which are all connected to the system bus 200.

The CPU 11 in use is, for example, a microprocessor SL Enhanced Intel486, manufactured and sold by Intel Corporation (United States). The SL Enhanced Intel486 series is classified into four types of clock models: 1x clock model, 1/2x clock model, 1/3x clock model and 2x clock model. The 1x clock model, 1/2x clock model and 1/3x clock model are PLL-incorporated models, while the 2x clock model has no PLL. This computer system uses a PLL-incorporated, high-performance SL Enhanced Intel486 of the 1x clock model, 1/2x clock model or 1/3x clock model.

The following description will be given of the case where an SL Enhanced Intel486 of the 1x clock model is used.

The CPU 11 incorporates a PLL circuit 111, which, based on an external clock CLK, generates an internal clock CLK2 which is the same as or faster than the external clock CLK. This CPU 11 has three operation states of different power consumptions, normal state, stop grant state and stop clock state, as shown in FIG. 2.

The normal state is the normal operation state of the CPU 11, where commands are executed. This normal state consumes the power most: the consumption current is about 700 mA.

The stop clock state uses the lowest power consumption with a consumption current of about 100 to 200 μA.

The stop grant state comes between the normal state and the stop clock state, and its consumption current is relatively as low as 20 to 50 mA. No commands are executed in this stop grant state. While the external clock CLK and internal clock CLK2 are both running, the supply of the internal clock CLK2 to the internal logic of the CPU 11 is stopped. In the stop grant state, the external clock CLK is stoppable and the stop of the external clock CLK shifts the CPU 11 to the stop clock state from the stop grant state.

The transition between the normal state and the stop grant state can be accomplished quickly by a stop clock (STPCLK) signal.

When the STPCLK signal, which is supplied to the CPU 11 in the normal state, is enabled or set to the active state, the CPU 11 empties all the internal pipelines after completing a command currently under execution, without executing the next command, and executes the stop grant cycle to shift from the normal state to the stop grant state. When the STPCLK signal is disabled or set to the inactive state, the CPU 11 shifts from the stop grant state to the normal state and restarts the execution of the next command.

The transition from the stop grant state to the stop clock state is performed spontaneously by stopping the external clock CLK. When the supply of the external clock CLK to the CPU 11 restarts in the stop clock state, the CPU 11 goes to the stop grant state 1 ms later. The return from the stop clock state to the stop grant state apparently takes time.

It is apparent from the above that the stop grant state is characterized by its very low power as compared with the normal state and its capability to promptly return to the normal state or the command executable state by the STPCLK signal. In this respect, the stop grant state, not the stop clock state, is used as the CPU sleep mode.

The CPU 11 in FIG. 1 further has the following system management function.

The CPU 11 has an operation mode, called a system management mode (SMM), for running a system management program specially designed for the system management or power management in addition to a real mode for running a program such as an application program or OS, a protect mode, and a virtual 86 mode.

In real mode, the memory space of as large as 1 Mbytes can be accessed, and a physical address is determined by an offset value from the base address represented by the content of a segment register. In protect mode, the memory space of as large as 4 Gbytes can be accessed per task, and a linear address is determined by using an address mapping table called a descriptor table. This linear address is finally converted to a physical address by paging. The virtual 86 mode allows a program designed operable in real mode to run in protect mode, and in this virtual 86 mode, a real-mode program is treated as one task in protect mode.

The system management mode (SMM) is a pseudo real mode in which no descriptor table is referred nor no paging is executed. When a system management interrupt (SMI) is issued to the CPU 11, the operation mode of the CPU 11 is switched to the SMM from the real mode, the protect mode or the virtual 86 mode. In the SMM, a system management program specially designed for the system management or power saving control is executed.

The SMI is one kind of a nonmaskable interrupt (NMI), but has the highest priority, higher than the ordinary NMI and a maskable INTR. The generation of this SMI can invoke various SMI service routines, prepared as a system management program, regardless of a currently running program or the OS environments. This computer system utilizes this SMI to control the CPU sleep in order to always accomplish the same sleep mode function irrespective of the OS environments.

The system controller 12 is a gate array for controlling memories and I/O devices in the system, and has hardware for controlling the generation of the SMI signal and the STPCLK signal to the CPU 11.

The main memory 13 stores an OS, an application program to be executed, and user data prepared by the application program. An SMRAM (System Management RAM) 50 is an overlay which is mapped in the address space in the main memory 13 from the address 30000H to 3FFFFH, and is accessible only when the SMI signal is input to the CPU 11. The address range where the SMRAM is mapped is not fixed, but can be changed to any location in the 4-Gbyte space by a register called SMBASE. The SMBASE register can be accessed only in the SMM. The initial value of the SMBASE register is the address 30000H.

When the CPU 11 enters the SMM, the CPU status, i.e., registers or the like in the CPU 11 at the time an SMI has been generated are saved in a stack form in the SMRAM 50. Stored in this SMRAM 50 is a command for calling the system management program. This command is executed first when the CPU 11 enters the SMM, and the execution of the command gives control to the system management program.

The BIOS ROM 14, which holds the BIOS (Basic I/O System), is constituted of a flash memory so that programs are rewritable. The BIOS is designed to operate in real mode. This BIOS includes an IRT routine which is executed at the system booting, device drivers for controlling various I/O devices and the system management program. The system management program, which runs in SMM, includes an SMI program consisting of a global standby SMI routine and a software SMI routine, and an SMI handler for determining the SMI routine to be executed.

The global standby SMI routine and the software SMI routine each include a sleep control routine for setting the CPU 11 to the sleep mode. The global standby SMI routine further includes an auto power-off routine for powering the system on after the system status is saved.

The SMI handler is a program in the BIOS which is called first by the CPU 11 when an SMI is generated, and the SMI handler checks the cause of the SMI and calls the SMI routine associated with that cause.

The bus converter 15 converts the bus width between the 32-bit data bus of the CPU bus 100 and the 16-bit data bus of the system bus 200.

The interrupt controller 16 receives interrupt request signals IRQ0 to IRQ15 from the keyboard controller 17, the system timer 18 and the other I/O devices 19, and controls the generation of an interrupt signal INTR to the CPU 11 in accordance with the priority of those interrupt request signals. In this case, status information indicating a generated interrupt request signals is held in a register in the interrupt controller 16. The interrupt signal INTR is generated when one of the hardware interrupt request signals (IRQ0–IRQ15) is generated.

The IRQ0 is a timer interrupt request signal which is generated, for example, every 55 ms by the system timer 18. The generation interval of the IRQ0 is programmable and may be set shorter than 55 ms for faster task switching depending on the OS environment. The IRQ1 is a keyboard interrupt signal generated by the keyboard controller 17 at the time of a key input. Another interrupt signal from the keyboard controller 17 is the interrupt signal IRQ12 which is generated at the time a mouse is operated. The IRQ2–IRQ11 and IRQ13–IRQ15 are interrupt request signals from other various I/O devices 19 in the system (such as a floppy disk controller, a hard disk controller, a serial port, and a SCSI port).

A description will now be given of the structure of hardware in the system controller 12, which controls the generation of the SMI and STPCLK.

As illustrated, the system controller 12 has I/O registers 121, a global standby timer 122, a software SMI timer 123, a system event detector 124, a global standby SMI generator 127, OR circuits 128 and 130, a stop clock generator 129 and an NMI generator 131.

The I/O registers 121 are readable and writable by the CPU 11. SMI status information indicating the cause of an SMI is set in the I/O registers 121 by the hardware in the controller 12, and a global standby time-out value, a software SMI warning time-out software SMI warning time-out count value, etc. are also set in those registers 121 by the CPU 11. The global standby time-out value is sent to the global standby timer 122, and the software SMI warning time-out count value is sent to the software SMI timer 123. Further, a stop clock command for causing the stop clock generator 129 to generate the STPCLK is set in the I/O registers 121 by the CPU 11.

The global standby timer 122 is an up-counter which operates in the units of, for example, 4 seconds, and starts the counting operation when the global standby time-out value is set in the registers 121. When the system event detector 124 generates a system event detection signal, the count value of the global standby timer 122 is reset and the counting restarts from the count value "0." When the count value coincides with the global standby time-out value, a global standby time-out signal is generated from the global standby timer 122. This global standby time-out signal indicates that a system event has not occurred during the time specified by the global standby time-out value. This global standby time-out signal causes the global standby SMI generator 125 to generate a global standby SMI.

The software SMI timer 123 is an up-counter which operates in the units of, for example, 1 second, and starts the counting operation when the software SMI warning time-out value is set in the registers 121. When the system event detector 124 generates a system event detection signal, the count value of the software SMI timer 123 is reset and the counting restarts from the count value "0." When the count value coincides with the software SMI warning time-out value, a software SMI warning time-out signal is generated from the software SMI timer 123. This software SMI warning time-out signal causes the software SMI generator 126 to generate a software SMI.

The system event detector 124 monitors the hardware interrupt signals and NMI to detect the occurrence of an system event. When detecting the occurrence of a system event, the system event detector 124 generates the system event detection signal.

The "system event" means hardware interrupt signals excluding the timer interrupt (IRQ0), i.e., IRQ1 to IRQ15 and NMI.

The system event detector 124 does not actually monitor the IRQ1–IRQ15 but monitors the INTR and IRQ0 instead for the purpose of reducing the number of input pins of the system controller 12. In this case, the system event detector 124 determines that any of the IRQ1–IRQ15 has occurred (system event) when the IRQ0 is not in an active state upon the occurrence of the INTR. In this case, even if the IRQ0 is in an active state, it is determined that a system event has occurred when the INTR has been generated twice during one active state period.

When the INTR has been generated twice during the period in which the IRQ0 is kept active (H), as shown in FIG. 3A, the generation of the first INTR is not considered as the occurrence of a system event, but the generation of the second INTR is considered as such. When the IRQ0 returns to an inactive state (L) in a midway, as shown in FIG. 3B, it is not considered as the occurrence of a system event even if the IRQ0 is kept active (H) at the time the INTR occurs twice in row.

As the IRQ0–IRQ15 are edge-trigger signals, only the edge of the transition from the inactive state to the active state is effective and the period during which such a signal is kept at the active state is insignificant.

As shown in FIG. 3C, the IRQ0, once generated, is kept active (H) for a given period of time (about 27 ms). Even after the timer process is terminated, the IRQ0 does not promptly return to the inactive state (L) and remains active (H). During the period where the IRQ0 is kept at the active state (H), therefore, the first INTR generated is originated from the IRQ0 but the second INTR is generated by a cause different from the IRQ0, such as the IRQ1.

From the above, there are two cases where the system event detector 124 detects a system event.

1) When the IRQ0 is not in an active state upon generation of the INTR.

2) Even with the IRQ0 in an active state, when the INTR is generated twice in one active state period of the IRQ0.

When no system event has occurred during the time specified by the global standby time-out value, i.e., when the global standby time-out signal has not been generated during that time, the global standby SMI generator 125 generates a global standby SMI indicating a system idle. The global standby SMI is supplied via the OR circuit 128 to the CPU 11. When the global standby time-out signal is generated, the SMI status information indicating the generation of the global standby SMI is set in the registers 121.

The software SMI generator 126 generates a software SMI in response to the software SMI warning time-out signal from the software SMI timer 123. This software SMI is supplied via the OR circuit 128 to the CPU 11. When the software SMI warning time-out signal is generated, the SMI status information indicating the generation of the software SMI is set in the registers 121.

The SMI generator 127 of other causes generates SMIs due to other causes than the global standby time-out and software SMI warning time-out (an external input SMI, I/O trapping originated SMI, SMI by a local standby time-out and SMI by a suspend resume button signal from the power supply).

The stop clock controller 129 generates a stop clock signal (STPCLK) to set the CPU 11 in the stop grant state, when a stop clock generation command is set in the registers 121. The generation of this STPCLK is stopped when a stop break signal is supplied from the OR circuit 130. The stop break signal is generated to return the CPU 11 to the normal state from the stop grant state. The causes for the stop break signal are all the SMIs and the INTR and NMI, latter two generated by the IRQ0-IRQ15.

The details of the stop clock controller 129 are illustrated in FIG. 17.

In FIG. 17, an I/O decoder 1211 and an AND circuit 1212 are incorporated in the registers 121 shown in FIG. 1. The I/O decoder 1211 decodes an address supplied from the CPU 11 and outputs a coincidence signal to the AND circuit 1212 when detecting a predetermined address. When receiving an I/O read signal IOR#, the AND circuit 1212 outputs a pulse signal to the set terminal (S) of a flip-flop (F/F) 129. Consequently, the 'F/F 129 outputs the stop clock signal (STPCLK) from a bar Q output terminal (Q) to the CPU 11.

When any of the SMI signal, NMI signal and the INTR signal, which are causes of the stop break, is output, the OR circuit 130 supplies a pulse signal to the reset terminal (R) of the F/F 129, thus resetting the F/F 129.

The NMI generator 131 generates the NMI in response to a cause for the NMI, such as an I/O channel check. This NMI is supplied to the CPU 11, the system event detector 124 and the OR circuit 130.

In this system controller 12, the system event detector 124 monitors various hardware interrupt request signals in the system and detects a system idle when all the hardware interrupt request signals except the timer interrupt are not generated for a predetermined period of time. Accordingly, the global standby SMI for setting the CPU 11 in the sleep mode is generated.

When the stop clock command is issued from the CPU 11, the stop clock controller 129 generates the STPCLK to sets the CPU 11 to the stop grant state. When a cause for the stop break such as a hardware interrupt is generated under the above situation, the stop clock controller 129 stops generating the STPCLK and sets the CPU 11 to the normal state to permit the CPU 11 to execute a process associated with the hardware interrupt.

In this system controller 12, a software SMI for the stop break and a software SMI for the resleeping are alternately generated in such a way that the stop grant state and normal state are alternately repeated at a given time interval. This SMI generation is accomplished by setting the time-out time for the stop break in the software SMI timer 123 before the generation of the STPCLK signal and setting the time-out time for the resleep in the software SMI timer 123 when the stop break occurs due to the stop-break software SMI.

In this case, if, before the generation of a software SMI which causes the stop break, another cause for the stop break occurs by a hardware interrupt request signal, such as a keyboard interrupt, the stop break by this hardware interrupt request signal is enabled without waiting for the time-out time. This can ensure a faster service to the keyboard controller 17 and other I/O devices 19 requesting a service.

When the timer interrupt is a cause for the stop break, the resleep process is executed to set the CPU 11 back to the stop grant state.

A description will now be given of the operation procedures of the CPU sleep control using the SMI and STPCLK.

Figure 4:
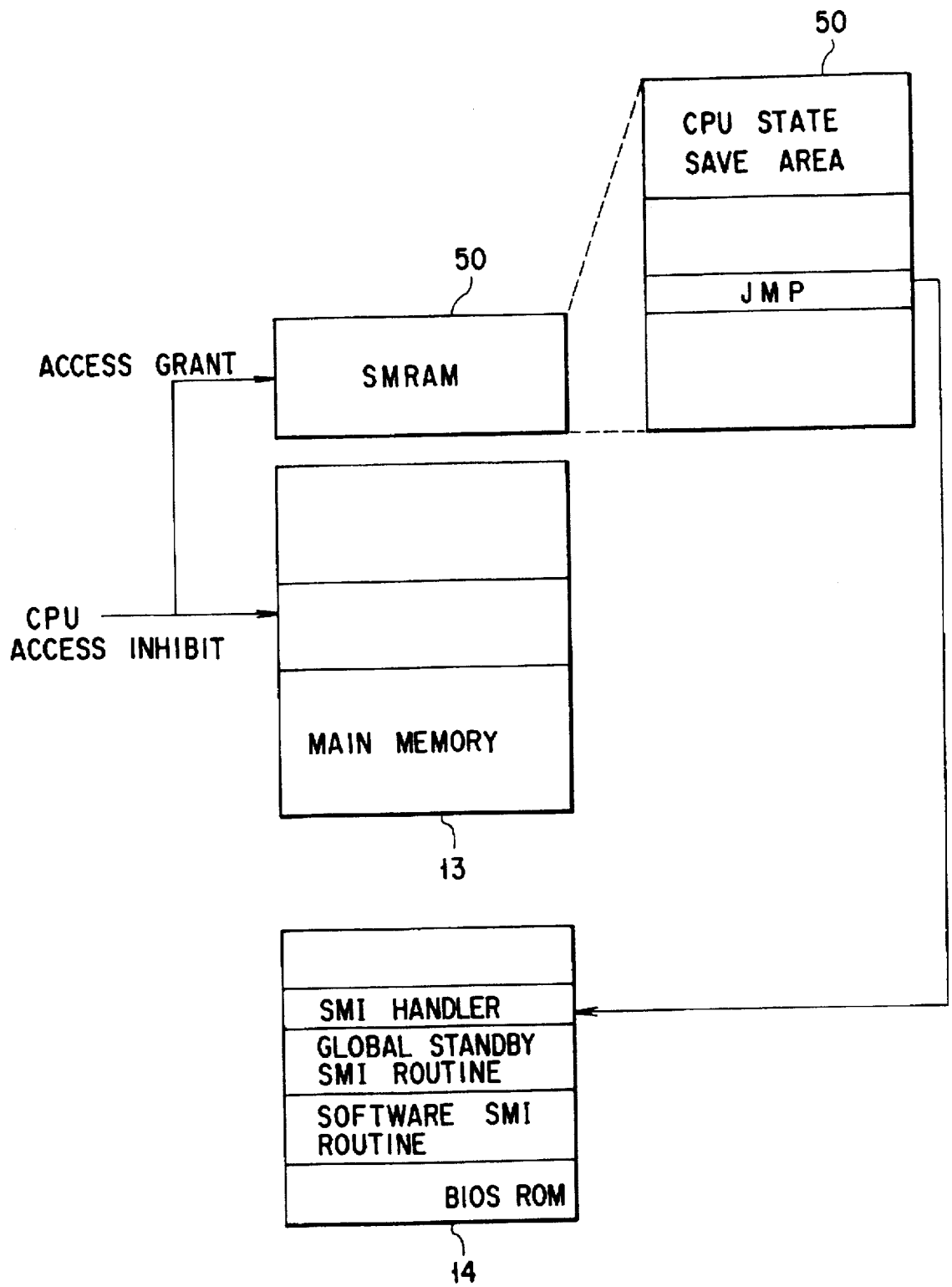
FIG. 4 is a diagram for explaining a memory map when an SMI is issued to the CPU provided in the system of this embodiment.
Figure 5:
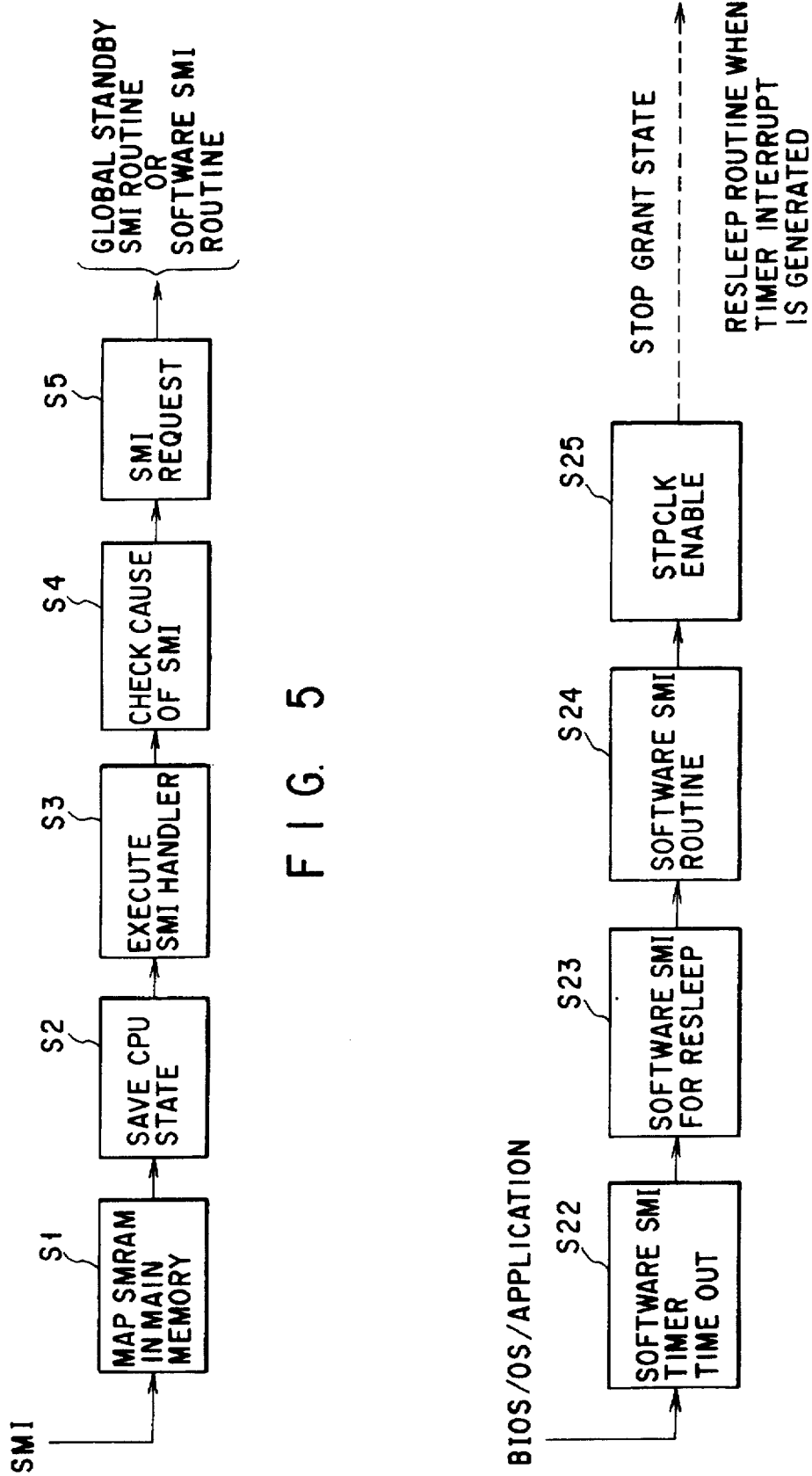
FIG. 5 is a diagram for explaining the operation of the CPU provided in the system of this embodiment when an SMI is issued to the CPU.

Referring to FIGS. 4 and 5, the operation of the CPU 11 when an SMI is issued to the CPU 11 will be discussed below.

When an SMI is input to the CPU 11, the CPU 11 maps the SMRAM 50 in the address space in the main memory 13 from the address 30000H to 3FFFFH first (step S1). The addresses 30000H to 3FFFFH of the main memory 13 therefore become inaccessible, but the SMRAM 50 becomes accessible instead.

The SMRAM 50 is provided with a CPU state save area and an SMI handler work area, and a jump code designating the SI handler designating the SMI handler in the BIOS ROM 14 as an interrupt target is set in this SMRAM 50.

Next, the CPU 11 saves the contents of the various registers in the CPU 11 (CPU status) when an SMI is input are saved in a stack form in the CPU state save area in the SMRAM 50 (step S2). The CPU 11 fetches a code at the start address 38000H in the SMM or the jump code set at the address 38000H in the SMRAM 50, and executes the SMI handler of the BIOS ROM 14 designated by the jump code (step S3). The processes at steps S1 to S3 are executed by a microprogram of the CPU 11.

The SMI handler called by the execution of the jump code checks the cause for an SMI to determine what causes the SMI (step S4). In this process, the SMI status information set in the registers 121 in the system controller 12 is referred. For example, if the global standby time-out has caused the SMI, the SMI handler requests the execution of the BIOS SMI service routine associated with that SMI, i.e., the execution of the global standby SMI routine (step S5). If the software SMI warning time-out has caused the SMI, the SMI handler requests the execution of the software SMI routine (step S5). The global standby SMI routine and the software SMI routine both include the CPU sleep control routine.

It is apparent from the above that the CPU sleep control routine can be invoked, without involving the OS or BIOS, simply by supplying the SMI signal to the CPU 11.

Referring to FIGS. 6 and 7, the CPU sleep control operation in the case where the CPU 11 is kept at the stop grant state during the sleep mode will be discussed below.

At the time of the system boot loading, the detection time for detecting a system idle is set as the global standby time-out value in the global standby timer 122. This global standby time-out value is set to a relatively short time, preferably one of 4 seconds, 8 seconds, ..., one minute (4 seconds in this example) so that the CPU 11 can enter the sleep mode immediately upon occurrence of a system idle. This timer initialization is executed by the IRT routine.

When none of the hardware interrupt request signals except the timer interrupt are generated for 4 seconds after the activation of the system, the global standby timer 122 generates the global standby time-out signal (step S11). In response to this global standby time-out signal, the global standby SMI generator 125 generates the global standby SMI signal (step S12). At this time, the SMI status information indicating the occurrence of an SMI caused by the global standby time-out is set in the registers 121.

The CPU 11 enters the SMM in response to the SMI signal and executes the global standby SMI routine (step S13). The global standby SMI routine resets the global standby time-out value to the time for auto power-off, e.g., 30 minutes (or 1 hour) (step S14), and then sets the stop clock command instructing the generation of the STPCLK in the registers 121.

The stop clock controller 129 generates the STPCLK in response to the stop clock command (step S15). The CPU 11 is set to the sleep mode or the stop grant state in response to the generation of the STPCLK. As a result, the execution of commands by the CPU 11 is inhibited and the execution of the global standby SMI routine is interrupted.

When the cause for the stop break is generated in the sleep mode (step S16), it is sent as the stop break signal to the stop clock controller 129. In response to this stop break signal, the stop clock controller 129 stops the STPCLK (step S17). Consequently, the CPU 11 goes to the normal state from the stop grant state and leaves the sleep mode. Then, the execution of the global standby SMI routine starts from the next command.

The global standby SMI routine first checks the cause of the stop break to find out if the stop break cause is a system event (hardware interrupt request signal other than the timer interrupt) or the timer interrupt (step S18). This check of the stop break cause is accomplished by referring to the interrupt status register or the like in the interrupt controller 16.

When the stop break has been caused by a system event, the global standby SMI routine sets the global standby time-out value back to 4 seconds (step S19) and then executes a resume (RSM) command (step S20). This returns the control to the OS or an application program which has been interrupted by the SMI, so that the CPU 11 returns to the normal operation mode from the sleep mode. Then, a service for the interrupt which caused the system event is executed.

During the SMM, the INTR oriented interrupt (including the IRQ0) is masked by the CLI. So is the NMI.

When the stop break has been caused by the timer interrupt (IRQ0), on the other hand, the global standby SMI routine sets a time T2 in the software SMI timer 123 to generate the resleep software SMI after a given period of time (step S21) and then executes the resume (RSM) command (step S20). This returns the control temporarily to the OS or an application program which has been interrupted by the SMI, and the IRQ0 oriented timer interrupt is processed by the OS or the application program. Immediately after the processing of the timer interrupt, however, the CPU 11 is set back to the sleep mode by the resleep software SMI.

A description will now be given of the procedures of the resleep process when the timer interrupt has occurred to cause the stop break.

When the time T2 set in the software SMI timer 123 at step S21 elapses, the software SMI timer 123 generates the software SMI warning time-out signal (step S22) as shown in FIG. 7. In response to this software SMI warning time-out signal, the software SMI generator 126 generates a software SMI signal for resleep (S23). At this time, the SMI status information indicating the occurrence of the SMI originating from the software SMI warning time-out is set in the registers 121.

The CPU 11 enters the SMM in response to the SMI signal and executes the software SMI routine (step S24). When acknowledging that the SMI is the software SMI for resleep, the software SMI routine sets the stop clock command instructing the generation of the STPCLK in the registers 121. The stop clock controller 129 generates the STPCLK in response to that stop clock command (step S25). In response to the generation of the STPCLK, the CPU 11 is set back to the stop grant state from the sleep mode.

FIG. 8 presents a timing chart during a period from the point where the CPU 11 has entered the sleep mode due to the global standby time-out to the point where the CPU 11 returns to the normal operation mode from the sleep mode due to a system event such as a keyboard interrupt.

In FIG. 8, t1 indicates the generation timing of the global standby time-out which happens when no system event occurs for 4 seconds during the normal operation mode of the CPU 11. At this timing t1, the CPU 11 enters the SMM and control is given to the global standby SMI routine from the program under execution then. The CPU 11 enters the stop grant state at t2 which is the generation timing of the STPCLK. Timing t3 shows the timing at which a system event such as a keyboard interrupt occurs. At this timing t3, the CPU 11 returns to the normal state from the stop grant state. Timing t4 is the timing for executing the RSM command, and the execution of this RSM command gives control back to the interrupted program from the global standby SMI routine. The interrupt process such as the keyboard interrupt is executed by that program.

FIG. 9 presents a timing chart when the resleep process is executed due to the occurrence of the timer-interrupt oriented stop break.

In FIG. 9, t1 indicates the generation timing of the global standby time-out which happens when no system event occurs for 4 seconds during the normal operation mode of the CPU 11. At this timing t1, the CPU 11 enters the SMM and control is given to the global standby SMI routine from the program under execution then. The CPU 11 enters the stop grant state at t2 which is the generation timing of the STPCLK. Timing t3 shows the generation timing of the timer interrupt. At this timing t3, the temporary stop break occurs in the CPU 11 and the CPU 11 returns to the normal state from the stop grant state. t4 is the timing for the preparation to generate the software SMI for resleep after a given period of time. t5 is the timing for executing the RSM command, and the execution of this RSM command gives control back temporarily to the interrupted program from the global standby SMI routine. The timer interrupt process is executed by that program. Timing t6 indicates the generation timing of the software SMI for resleep. At this timing t6, the CPU 11 enters the SMM again and executes the software SMI routine. The CPU 11 enters the stop grant state at t7 which is the generation timing of the STPCLK. t8 shows the timing at which a system event such as the keyboard interrupt occurs. At this timing t8, the CPU 11 returns to the normal state from the stop grant state. The setting for resleep is not conducted this time. t9 is the timing for executing the RSM command. The execution of this RSM command gives control back to the interrupted program from the software SMI routine, and the CPU 11 returns to the normal operation mode from the sleep mode. The keyboard interrupt process is executed in this mode.

In this sleep control system, as described above, when the stop break cause is the occurrence of a system event, the CPU 11 returns from the sleep mode immediately, whereas when the stop break is caused by the timer interrupt, the sleep mode continues by the resleep process.

Besides the aforementioned system event and timer interrupt, an SMI by the global standby time-out for auto power-off may be generated as the stop break cause.

That is, when the sleep mode of the CPU 11 continues for 30 minutes, the SMI by the global standby time-out is generated as the stop break cause.

In this case, after leaving the sleep mode by the processes at steps S19 and S20 in FIG. 5, the CPU 11 executes the global standby SMI routine corresponding to the global standby SMI signal. When confirming that the global standby time-out value set in the registers 121 is 30 minutes, the global standby SMI routine calls the auto power-off routine. The auto power-off routine saves in the main memory 13 the system status necessary to restore the system, upon power on, to the state immediately before the system was powered off, and then powers off nearly all the units in the system except the main memory 13.

As described above, in the sleep control in this computer system, various hardware interrupt request signals IRQ0-IRQ15 and NMI in the system are monitored and a system idle is detected when none of the hardware interrupt request signals except the timer interrupt (IRQ0) are generated for a predetermined period of time, thereby setting the CPU 11 to the sleep mode. Accordingly, the number of triggers to set the CPU 11 to the sleep mode increases and the CPU 11 can enter the sleep mode when an application program waits for the completion of the operation of an I/O device other than the keyboard as well as at the time CPU 11 is idling when the application program stands by for a keyboard input. It is therefore possible to prevent the CPU 11 from being kept in the operational state even when the CPU 11 is idling, thereby sufficiently reducing the power consumption.

The hardware interrupt request signals are used to detect a system idle. The hardware interrupt request signals IRQ0–IRQ15 are physical signals generated from various I/O devices in the system, and the detection of those signals does not involve the BIOS at all. Further, the SMI routine including the sleep sequence can be invoked only by the supply of the SMI signal to the CPU 11, and the activation of this process does not involve the OS and BIOS at all.

It is thus possible to detect a system idle at the hardware level and execute the CPU sleep control, thus always ensuring the same sleep mode function regardless of the OS environments. Even when an application program which directly controls hardware without involving the BIOS is running, it is still possible to detect a system idle and perform the CPU sleep control.

In the sleep mode, the CPU 11 is kept at the stop grant state in which the execution of any command is inhibited so that the consumed power of the CPU 11 can be reduced without stopping the external clock. It is therefore possible to return the CPU 11 from the sleep mode without dynamically switching the external clock, thus ensuring the fast returning of the PLL-incorporated, high-performance CPU 11 from the sleep mode.

A description will now be given of the operation in the case where the stop grant state and normal state are alternately repeated at a given time interval in the sleep mode.

This sleep mode control system slows the operation speed of the CPU 11 in the sleep mode, not to fully stop the CPU 11. The reason for employing this system will be discussed below.

In this system, the CPU 11 is set to the sleep mode in response to a 4-sec global standby time-out and the sleep mode is released by the occurrence of a system event. When the CPU 11 is running a program which performs an operation without using I/O devices, such as a memory benchmark test, therefore, the CPU 11 may be erroneously set to the sleep mode. In this case, if the operation of the CPU 11 is stopped completely, the program which should be executed suddenly stops and no subsequent processing is performed even though the CPU 11 is not waiting for an event. If the user makes a key input or the like to release the sleep mode, the CPU 11 can come out of that state. That is, without any key input, the CPU 11 cannot escape such a state.

To prevent such a situation, it is preferable to operate the CPU 11 at a low speed in the sleep mode, rather than to completely stop the CPU 11.

In this system, the operation speed of the CPU 11 in the sleep mode is slowed by the duty control at the stop grant state and the normal state as will be discussed shortly.

When none of the hardware interrupt request signals except the timer interrupt are generated for 4 seconds after the activation of the system, the global standby timer 122 generates the global standby time-out signal (step S31), as shown in FIG. 10. In response to this global standby time-out signal, the global standby SMI generator 125 generates the global standby SMI signal (step S32). At this time, the SMI status information indicating the occurrence of an SMI caused by the global standby time-out is set in the registers 121.

The CPU 11 enters the SMM in response to the SMI signal and executes the global standby SMI routine (step S33). The global standby SMI routine resets the global standby time-out value to the time for auto power-off, e.g., 30 minutes (step S34), and then sets a time T1 (e.g., 2 ms) in the software SMI timer 123 to generate the software SMI for the stop break after a predetermined period of time (step S35). Then, the global standby SMI routine sets the stop clock command instructing the generation of the STPCLK in the registers 121.

The stop clock controller 129 generates the STPCLK in response to the stop clock command (step S36). The CPU 11 is set to the sleep mode or the stop grant state in response to the generation of the STPCLK. As a result, the execution of commands by the CPU 11 is inhibited and the execution of the global standby SMI routine is interrupted.

When the time T1 elapses after the mode transition of the CPU 11 to the sleep mode, the software SMI timer 123 generates the software SMI warning time-out signal for the stop break (step S37). In response to this software SMI warning time-out signal, the software SMI generator 126 generates the software SMI for the stop break (step S38). This software SMI is sent as the stop break signal to the CPU 11 as well as to the stop clock controller 129.

The stop clock controller 129 stops generating the STPCLK (step S39). As a result, the CPU 11 enters the normal state from the stop grant state and starts executing the global standby SMI routine from the next command.

The global standby SMI routine first sets the time T2 (e.g., 1 ms) in the software SMI timer 123 to generate the software SMI for resleep after a given period of time (step S40), and then executes the resume (RSM) command (step S41). Consequently, the control is returned to the OS or application program which has been interrupted by the SMI.

Thereafter, the CPU 11 enters the SMM to perform the process associated with the software SMI generated at step S38 and executes the software SMI routine (step S42). Since the software SMI generated at step S38 is a dummy SMI to cause the stop break, however, the software SMI routine called by this SMI performs no processing other than the execution of the RSM command and returns the control to the OS or application program which has been interrupted by the dummy SMI (step S43).

When the time T2 elapses after the state transition of the CPU 11 to the normal state, the software SMI timer 123 generates the software SMI warning time-out signal (step S44). In response to this software SMI warning time-out signal, the software SMI generator 126 generates the software SMI for resleep (step S45). At this time, the SMI status information indicating the generation of the SMI due to the software SMI warning time-out is set in the registers 121.

The CPU 11 enters the SMM in response to the SMI signal and executes the software SMI routine (step S46). After confirming that the software SMI is for the stop break, the software SMI routine sets the time T1 in the software SMI timer 123 to generate the software SMI for the stop break again after a given period of time (step S47). Thereafter, the software SMI routine sets the stop clock command instructing the generation of the STPCLK in the registers 121.

The stop clock controller 129 generates the STPCLK in response to the stop clock command (step S48). In response to the generation of the STPCLK, the CPU 11 is set to the sleep mode or the stop grant state. As a result, the execution of commands by the CPU 11 is inhibited and the execution of the software SMI routine is interrupted.

In this manner, the stop grant state and the normal state are alternately repeated in the sleep mode.

When a stop break occurs at, for example, the stop grant state due to a cause other than the software SMI, the following process is carried out.

When a stop break occurs due to a cause other than the software SMI (step S49), it is sent as the stop break signal to the stop clock controller 129. In response to this stop break signal, the stop clock controller 129 stops the STP-CLK (step S50). Consequently, the CPU 11 goes to the normal state from the stop grant state. Then, the execution of the software SMI routine starts from the next command.

The software SMI routine first checks the cause of the stop break to find out if the stop break cause is a system event (hardware interrupt request signal other than the timer interrupt) or the timer interrupt (step S51). This check of the stop break cause is accomplished by referring to the interrupt status register or the like in the interrupt controller 16.

When the stop break has been caused by a system event, the software SMI routine sets the global standby time-out value back to 4 seconds (step S52) and then executes a resume (RSM) command (step S53). This returns the control to the OS or an application program which has been interrupted by the SMI, so that the CPU 11 returns to the normal operation mode from the sleep mode. Then, a service for the interrupt which caused the system event is executed.

When the stop break has been caused by the timer interrupt (IRQ0), on the other hand, the software SMI routine sets the time T2 in the software SMI timer 123 to generate the resleep software SMI after a given period of time (step S54) and then executes the resume (RSM) command (step S53). While the control is temporarily returned to the OS or an application program which has been interrupted by the SMI, the CPU 11 is immediately shifted to the stop grant state by the software SMI for resleep. As a result, the sleep mode continues.

Figure 11:
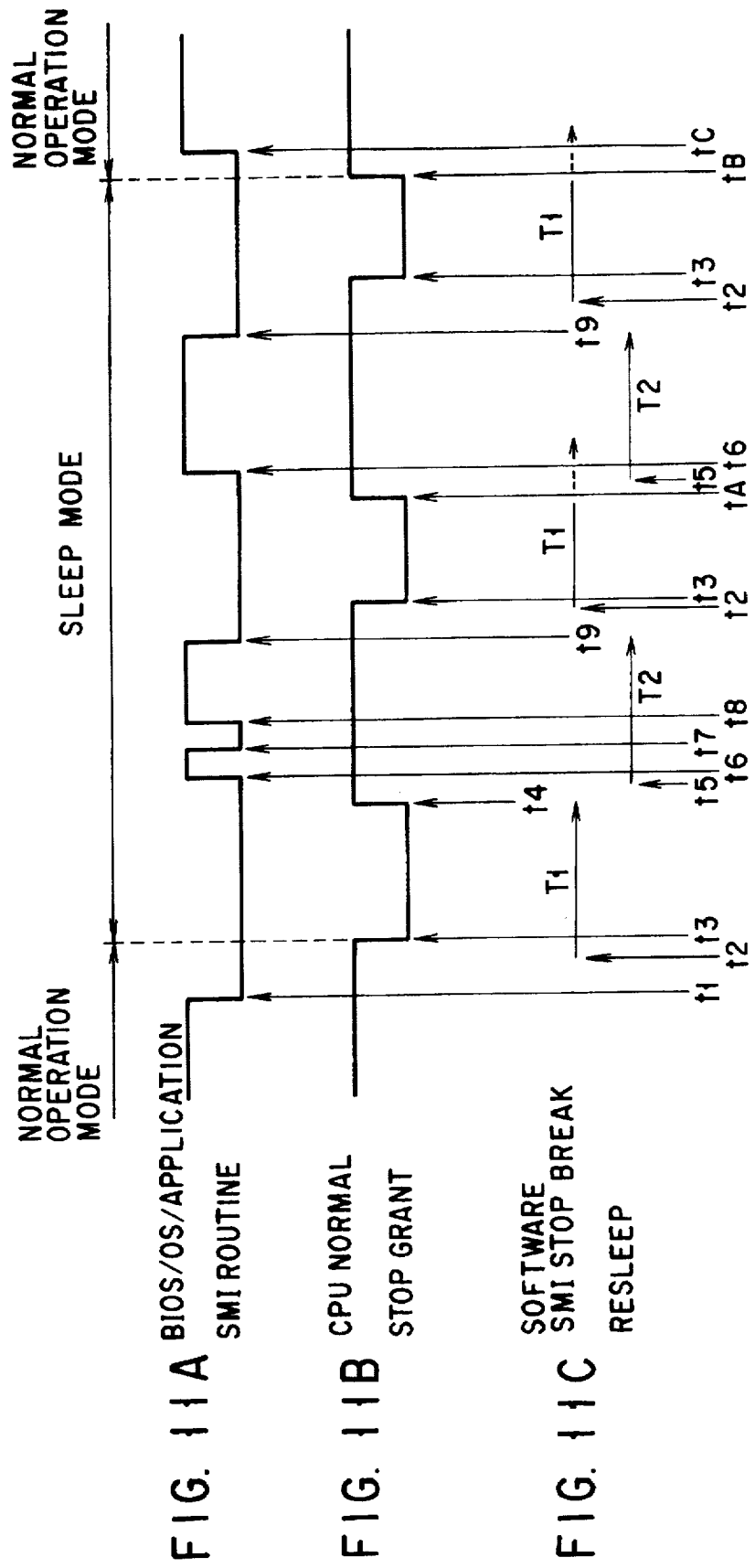
FIGS. 11A to 11C are diagrams for explaining an operation during a period from the point where the CPU has entered the sleep mode to the point where the CPU returns to the normal operation mode in the CPU sleep control operation in FIG. 10.

FIG. 11 presents a timing chart during a period from the point where the CPU 11 has entered the sleep mode in which the stop grant state and the normal state are alternately repeated to the point where the CPU 11 returns to the normal operation mode from the sleep mode due to a system event such as a keyboard interrupt.

In FIG. 11, t1 indicates the generation timing of the global standby time-out which happens when no system event occurs for 4 seconds during the normal operation mode of the CPU 11. At this timing t1, the CPU 11 enters the SMM and control is given to the global standby SMI routine from the program under execution then. t2 indicates the timing for the execution of the preparation process to generate the software SMI for the stop break after a given period of time. The CPU 11 enters the stop grant state at t3 which is the generation timing of the STPCLK. Timing t4 shows the timing at which the software SMI for the stop break is generated. The software SMI generated at timing t4 causes the stop break and the CPU 11 returns to the normal state from the stop grant state. t5 shows the timing for the execution of the preparation process to generate the software SMI for resleep after a given period of time. Timing t6 is the timing for executing the RSM command, and the execution of this RSM command gives control back to the interrupted program from the global standby SMI routine.

t7 is the timing at which the flows proceeds to the SMM process associated with the software SMI (dummy SMI) for stop break generated at timing t4. t8 is the timing for executing the RSM command in the SMM process associated with the dummy SMI, and the execution of this RSM command gives at timing t8, control is returned again to the interrupted program. t9 indicates the generation timing of the software SMI for resleep. At this timing t9, the CPU 11 enters the SMM again and executes the software SMI routine.

tA indicates the timing at which a timer interrupt is generated. At this timing tA, temporary stop break occurs on the CPU 11 and the CPU 11 returns to the normal state from the stop grant state. tB indicates the generation timing for a system event such as a keyboard interrupt. At this timing tB, the CPU 11 returns to the normal state from the stop grant state. tC is the timing for executing the RSM command. The execution of this RSM command gives control back to the interrupted program from the software SMI routine, and allows the CPU 11 to return to the normal operation mode from the sleep mode.

In this sleep control system, as described above, the CPU 11 alternately repeats the stop grant state and the normal state at a given time interval in the sleep mode. Although the execution of any command by the CPU 11 at the stop grant state is inhibited, the execution of commands can restart at the normal state. During the sleep mode or during the period from the point of the detection of the occurrence of a system idle to the point of the detection of the occurrence of a system event, therefore, the execution of a program by the CPU 11 is not stopped completely but the CPU can intermittently run a program. Even if the CPU 11 enters the sleep mode by mistake due to the erroneous detection of a system idle, it is possible to prevent the sudden inhibition of the execution of a program which does not wait for an I/O device, such as a benchmark test. As this system can also slow down the average operation speed of the CPU 11 in the sleep mode, the power consumption of the CPU 11 can be reduced sufficiently on average.

When a stop break by a hardware interrupt request signal such as a keyboard interrupt occurs before the generation of a software SMI as the cause for a stop break, the stop break originating from the hardware interrupt request signal occurs. It is therefore possible to quickly provide a service to the keyboard controller 17 or other I/O devices 19 requesting the service.

The sequences of processes of the global standby SMI routine and the software SMI routine in a specific case will be described with reference to FIGS. 12 through 14.

FIG. 12 presents a flowchart illustrating sequences of processes for the global standby SMI routine and software SMI routine in the case where the stop grant state and normal state are alternately repeated at a given time interval.

When none of the hardware interrupt request signals except the timer interrupt are generated for 4 seconds, the global standby time-out signal is generated and the global standby SMI routine is executed. The global standby SMI routine first resets the global standby time-out value to the time for auto power-off, e.g., 30 minutes (step S61), and then sets the time T1 in the software SMI timer 123 to generate the software SMI for stop break after a predetermined period of time (step S62). Then, the global standby SMI routine instructs the system controller 12 to generate the STPCLK (step S63).

Consequently, the CPU 11 is set to the stop grant state after the generation of the STPCLK until the time T1 elapses from the point of that generation. The global standby SMI routine is interrupted when the execution of step S63 is completed.

When the time T1 elapses after the mode transition of the CPU 11 to the sleep mode, the software SMI signal for stop break is generated. Accordingly, the CPU 11 enters the normal state from the stop grant state and starts executing the global standby SMI routine from the next command.

The global standby SMI routine first sets the time T2 in the software SMI timer 123 to generate the software SMI for resleep after a given period of time (step S64), and then executes the resume (RSM) command (step S65). Consequently, the control is returned to the OS or application program which has been interrupted by the SMI.

Thereafter, the CPU 11 enters the SMM to perform the process associated with the software SMI for stop break and executes the software SMI routine.

When the software SMI routine acknowledges that the software SMI generated in the sleep mode is a dummy SMI, the software SMI routine performs no processing other than the execution of the RSM command and promptly returns the control to the OS or application program which has been interrupted by the dummy SMI (steps S71 and S75).

When the time T2 elapses after the state transition of the CPU 11 to the normal state, the software SMI signal for resleep is generated and the CPU 11 executes the software SMI routine. After confirming that the software SMI is for the stop break (step S71), the software SMI routine sets the time T1 in the software SMI timer 123 to generate the software SMI for stop break again after a given period of time (step S72). Thereafter, the software SMI routine instructs the system controller 12 to generate the STPCLK (step S73).

As a result, the CPU 11 is set to the stop grant state after the generation of the STPCLK until the time T1 elapses from the point of that generation. The software SMI routine is interrupted when the execution of step S73 is completed.

When the time T1 elapses after the mode transition of the CPU 11 to the sleep mode, the software SMI signal for stop break is generated. Accordingly, the CPU 11 enters the normal state from the stop grant state and starts executing the software SMI routine from the next command.

The software SMI routine first sets the time T2 in the software SMI timer 123 to generate the software SMI for resleep after a given period of time (step S74), and then executes the resume (RSM) command (step S75). Consequently, the control is returned to the OS or application program which has been interrupted by the SMI.

Thereafter, the CPU 11 enters the SMM to perform the process associated with the software SMI for stop break and executes the software SMI routine.

When the software SMI routine acknowledges that the software SMI generated in the sleep mode is a dummy SMI, the software SMI routine performs no processing other than the execution of the RSM command and promptly returns the control to the OS or application program which has been interrupted by the dummy SMI (steps S71 and S75).

As the software SMI routine is repeatedly executed in the above manner, the sleep mode continues.

FIG. 13 illustrates the sequence of processes that the software SMI routine executes when a system event occurs before the generation of the software SMI for resleep while the CPU 11 is set at the normal state in the sleep mode.

When a keyboard interrupt is generated before the time T2 passes after the return of the CPU 11 to the normal state, the count value of the software SMI timer 123 is temporarily reset by the system event detection signal. In this case, therefore, the software SMI is generated when the time (T2+α), the sum of the time α from the return of the CPU 11 to the normal state to the generation of a keyboard interrupt and the time T2, elapses.

When the software SMI routine confirms that the software SMI has originated from a system event from the fact that the software SMI had been generated after a time longer than the time T2 passed, the software SMI routine sets the global standby time-out value back to 4 seconds (step S81) without carrying out the setting of the software SMI timer for resleep, and then executes the resume (RSM) command (step S82).

Figure 14:
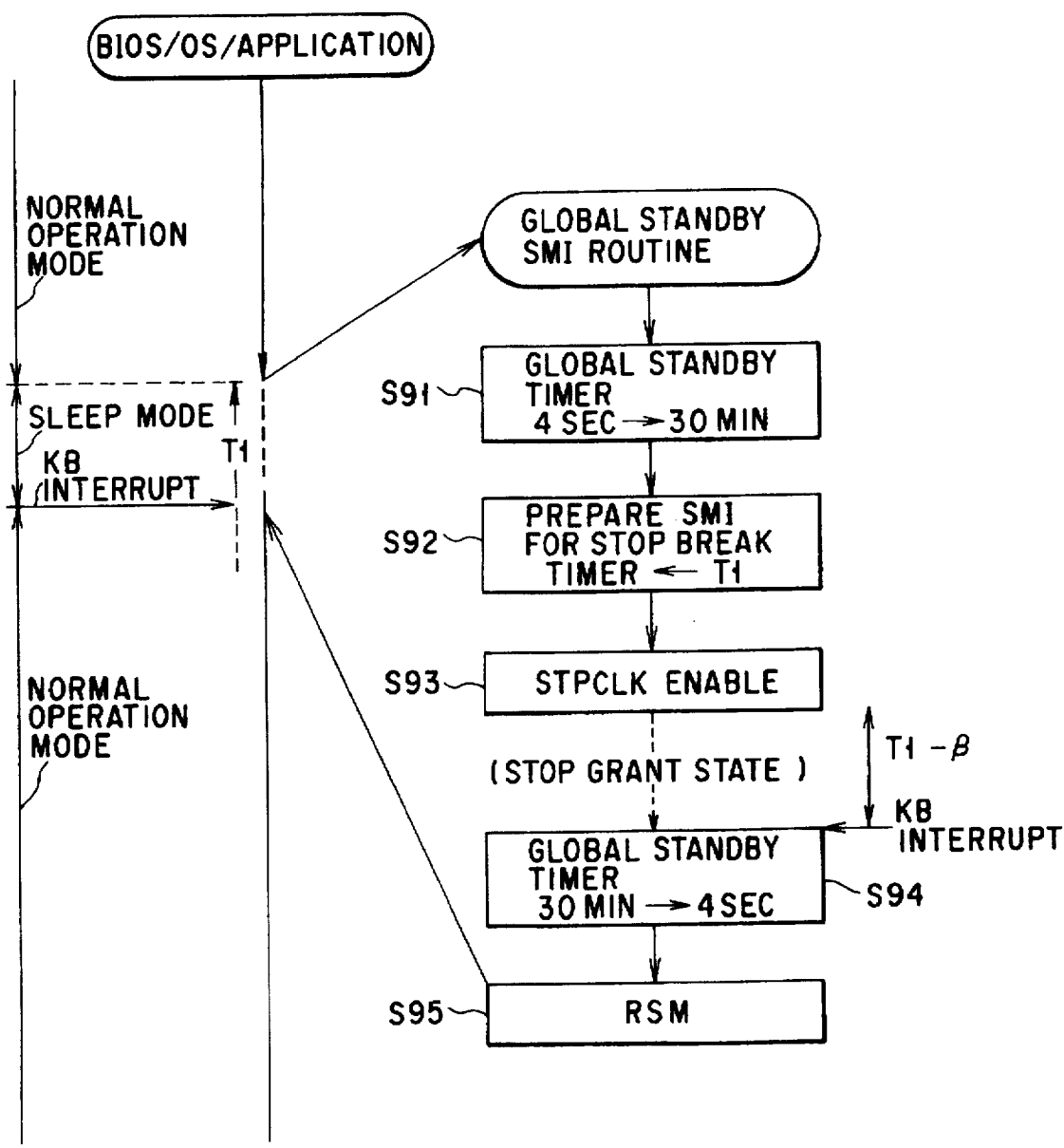
FIG. 14 is a flowchart illustrating a sequence of processes that the global standby SMI routine in FIG. 12 executes when a system event occurs.

FIG. 14 illustrates the sequence of processes that the global standby SMI routine executes when a system event, such as a keyboard interrupt, occurs before the time T1 passes after the state transition of the CPU 11 to the stop grant state due to the global standby time-out.

As mentioned above, when none of the hardware interrupt request signals except the timer interrupt are generated for 4 seconds, the global standby time-out signal is generated and the global standby SMI routine is executed. The global standby SMI routine first resets the global standby time-out value to the time for auto power-off, e.g., 30 minutes (step S91), and then sets the time T1 in the software SMI timer 123 to generate the software SMI for stop break after a predetermined period of time (step S92). Then, the global standby SMI routine instructs the system controller 12 to generate the STPCLK (step S93).

Consequently, the CPU 11 is set to the stop grant state after the generation of the STPCLK until the time T1 elapses from the point of that generation. The global standby SMI routine is interrupted when the execution of step S93 is completed.

When a keyboard interrupt is generated before the time T1 elapses (T1−β in this case) after the mode transition of the CPU 11 to the sleep mode under this situation, the interrupt causes a stop break, shifting the CPU 11 to the normal state from the stop grant state. The execution of the global standby SMI routine then starts from the next command.

When the global standby SMI routine confirms that the stop break has originated from a system event from the fact that the stop break had occurred before the time T1 has passed after the transition to the sleep mode, the global standby SMI routine sets the global standby time-out value back to 4 seconds (step S94), and then executes the resume (RSM) command (step S95).

Referring now to FIG. 15, the actual flowchart for the sleep control routine provided in the global standby SMI routine will be described.

The global standby SMI routine, when its execution is requested, first checks whether the global standby time-out value set in the registers 121 is the value for sleep (4 seconds) or the value for auto off (30 minutes) (step S101). When the set value is for auto off (30 minutes), the global standby SMI routine calls the auto-off routine to power off the system.

When the set value is for sleep (4 seconds), the global standby SMI routine first alters the global standby time-out value and sets the value for auto off (30 minutes) in the global standby timer 122 (step S102). Next, the global standby SMI routine reads the time (t1) specified then by the counter incorporated in the system timer 18, and sets the time T1 in the software SMI timer 123 to generate the software SMI for stop break after a given period of time (step S103). Then, the global standby SMI routine sets the stop clock command instructing the generation of the STPCLK in the registers 121 (step S104).

Then, the global standby SMI routine reads the time (t2) specified then by the built-in counter in the system timer 18, checks if $t2-t1<T1$ is satisfied, and determines from the check result whether the cause for the stop break is other than the software SMI for stop break (step S105).

If the equation, t2−t1<T1, is unsatisfactory, it means that the stop break has not occurred before the passing of the time T1, i.e., that the cause for the stop break is the software SMI for stop break. If the equation, t2−t1<T1, is met, on the other hand, it means that the stop break has occurred within the time T1, i.e., that the cause for the stop break is other than the software SMI for stop break.

When the cause for the stop break is other than the software SMI for stop break, the global standby SMI routine checks if the cause is a timer interrupt (step S106). This checking on the cause for the stop break can be accomplished by, for example, referring to the associated register in the interrupt controller 16.

When the cause for the stop break is not a timer interrupt, the global standby SMI routine determines that a system event has occurred or any of the IRQ1–IRQ15 or the NMI has been generated, sets the global standby time-out value back to 4 seconds (step S108) and then executes the resume (RSM) command (step S109).

When the cause for the stop break is a timer interrupt, on the other hand, the global standby SMI routine reads the time (t1') specified then by the built-in counter in the system timer 18, sets the time in a predetermined register, and sets the time T2 in the software SMI timer 123 to generate the software SMI for resleep after a given period of time (step S107). Then, the global standby SMI routine executes the resume (RSM) command (step S109). At step S107, the SMI routine also performs the setting of a flag indicating the generation of the software SMI (dummy SMI) for stop break in the associated register in the memory 13 or the system controller 12.

Figure 16:
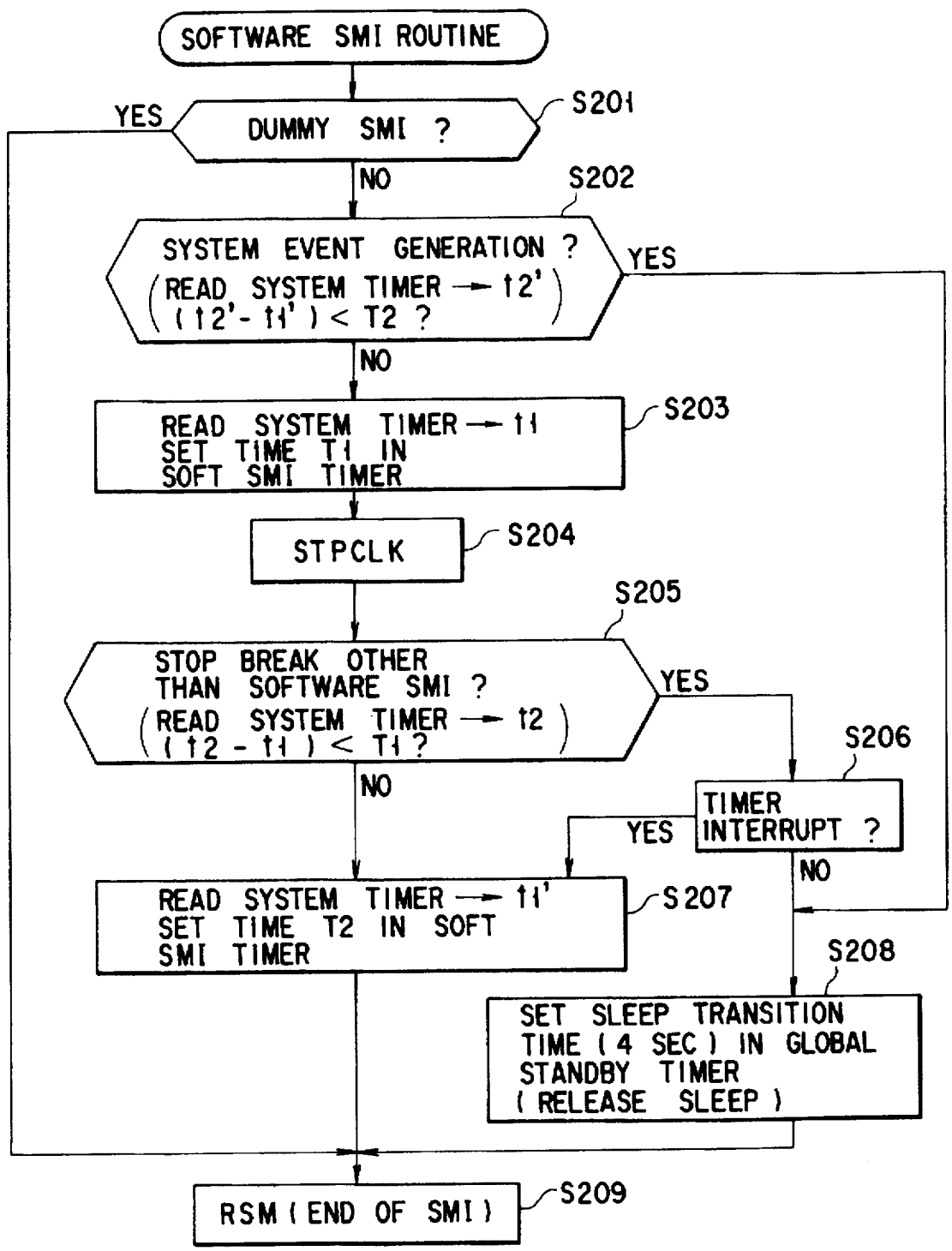
FIG. 16 is a flowchart illustrating the detailed sequence of processes for the software SMI routine needed to accomplish the CPU sleep control operation in FIG. 10.

Referring now to FIG. 16, the actual flowchart for the sleep control routine provided in the software SMI routine will be described.

When the software SMI signal is supplied to the CPU 11, requesting the execution of the software SMI routine, the software SMI routine determines if the software SMI signal is a dummy SMI signal, based on whether the SMI signal has been generated in the SMI routine (step S201). This determination can be accomplished by referring to the associated flag in the associated register in the memory 13 or the system controller 12 at step S201.

Then, the software SMI routine reads the time (t2') specified then by the built-in counter in the system timer 18, checks if $$t2'-t1'<T2$$

is satisfied, and determines from the check result whether the generated SMI signal is a software SMI originating from the occurrence of a system event (step S202).

If the equation, t2'−t1'<T2, is met, it means that the generated SMI signal is originating from the occurrence of a system event. If the equation, t2'−t1'<T2, is not met, on the other hand, it means that the generated SMI signal is the software SMI for resleep.

When the generated SMI signal is originating from the occurrence of a system event, the software SMI routine sets the global standby time-out value back to 4 seconds (step S208) and then executes the resume (RSM) command (step S209).

When the generated SMI signal is originating from the software SMI for resleep, the software SMI routine first reads the time (t1) specified then by the built-in counter in the system timer 18, and sets the time T1 in the software SMI timer 123 to generate the software SMI for stop break after a given period of time (step S203). Then, the software SMI routine sets the stop clock command instructing the generation of the STPCLK in the registers 121 (step S204).

Then, the software SMI routine reads the time (t2) specified then by the built-in counter in the system timer 18, checks if $$t2-t1<T2,$$

is satisfied, and determines from the check result whether the cause for the stop break is other than the software SMI for stop break (step S205).

If the equation, t2−t1<T1, is unsatisfactory, it means that the stop break has not occurred before the passing of the time T1, i.e., that the cause for the stop break is the software SMI for stop break. If the equation, t2−t1<T1, is met, on the other hand, it means that the stop break has occurred within the time T1, i.e., that the cause for the stop break is other than the software SMI for stop break.

When the cause for the stop break is other than the software SMI for stop break, the software SMI routine checks if the cause is a timer interrupt (step S206). This checking on the cause for the stop break can be accomplished by, for example, referring to the associated register in the interrupt controller 16.

When the cause for the stop break is not a timer interrupt, the software SMI routine determines that a system event has occurred or any of the IRQ1–IRQ15 or the NMI has been generated, sets the global standby time-out value back to 4 seconds (step S208) and then executes the resume (RSM) command (step S209).

When the cause for the stop break is a timer interrupt, on the other hand, the software SMI routine reads the time (t1') specified then by the built-in counter in the system timer 18, sets the time in a predetermined register, and sets the time T2 in the software SMI timer 123 to generate the software SMI for resleep after a given period of time (step S207). Then, the software SMI routine executes the resume (RSM) command (step S209). At step S207, the software SMI routine also performs the setting of the aforementioned flag indicating the generation of the dummy SMI.

According to this embodiment, as described above, even if the CPU 11 is erroneously set to the sleep mode during the execution of, for example, a memory benchmark test by repeating the alternate switching between the stop grant state and the normal state in the sleep mode, it is possible to prevent the sudden inhibition of that program, disabling the execution of the subsequent processing.

Although the cause for the generation of a system event or stop break event is checked by measuring the time in the system timer 18 in this embodiment, if an exclusive timer is provided in the system controller 12 or the system controller 12 is designed to be able to hold information indicating the occurrence of a system event in an associated register, the causes for the system event and stop break event can be checked without using the system timer 18.

According to this embodiment, the system management program including the SMI handler, the software SMI routine and the global standby SMI routine is stored in the BIOS ROM 14 and the SMI handler in the BIOS ROM 14 is called by a jump code at the address 38000H in the SMRAM 50. Since it is important in this invention that the system management program is called by the code at the address 38000H which the CPU 11 fetches first, however, it is possible to store the SMI handler in an area in the SMRAM 50 that starts from the address 38000H, so that the software SMI routine and the global standby SMI routine in the BIOS ROM 14 are called by this SMI handler. Further, the entire system management program including the software SMI routine and the global standby SMI routine may of course be stored in the SMRAM 50.

Furthermore, the address 38000H may be changed to another value by using the aforementioned SMBASE register.

A second embodiment of the present invention will now be described. FIG. 18 illustrates a computer system according to the second embodiment.

This system is designed to realize a notebook type or laptop type portable personal computer, and has a CPU 23, a system controller 25, a system memory 27, a BIOS ROM 29, a real time clock (RTC) 31, an interrupt controller (PIC) 33, a keyboard controller (KBC) 35, a display controller 37, etc. all installed on a system board 21 as illustrated in FIG. 18.

Laid out on the system board 21 are a CPU local bus (which may be called a processor bus) 39, a system bus 32 having the ISA/EISA/PCI specifications and a memory address bus 43.

This computer system is further provided with two expansion memory connectors 45 and 47 for connection of expansion memories. FIG. 18 shows expansion memories 49 and 51 respectively connected to the expansion memory connectors 45 and 47.

The expansion memories 49 and 51 are optional memories installable by a user as needed to expand the system memory size, and are DRAM cards or SIMM memory modules, for example. Normally, those expansion memories each consist of one or more DRAM banks.

The CPU 23 is a microprocessor incorporating a large-scale cache memory, for which an Intel486 CPU, for example, is used. The CPU 23 is connected via the CPU local bus 39 to the system controller 25. The CPU local bus 39 consists of signal lines directly connected to the input/output pins of the microprocessor that constitutes the CPU 23. This CPU local bus 39 includes a 32-bit data bus, a 32-bit address bus and various status signal lines.

The system controller 25, which is connected between the CPU local bus 39 and the system bus 41, controls all the memories and I/O devices in the system in response to a request from the CPU 23. This system controller 25 is realized by a single gate-arrayed LSI which incorporates a memory control logic for controlling DRAMs, such as the system memory 27 and expansion memories 49 and 51.

The system memory 27, which serves as the main memory of this system, normally consists of one or more DRAM banks. An operating system, application programs to be executed and various processing data are stored in this system memory 27.

The system memory 27 is installed on the system board 10 via a predetermined connector or directly. The system memory 27 is a 32-bit memory device whose data port is connected to the 32-bit data bus of the CPU local bus 39 and whose address input port is connected to the memory address bus 43. The memory address bus 43 is an address bus exclusive for DRAMs, on which the physical address (row address/column address) of a DRAM is output from the system controller 25.

Likewise, the expansion memories 49 and 51 are both 32-bit memory devices whose data ports are connected via the associated connectors 45 and 47 to the 32-bit data bus of the CPU local bus 39 and whose address input ports are connected to the memory address bus 43.

Two row address strobe signal lines (RAS lines: RAS0 and RAS1) are connected to the system memory 27.

Likewise, separate two row address strobe signal lines (RAS lines: RAS2 and RAS3) are connected to the expansion memory connector 45 and separate two row address strobe signal lines (RAS lines: RAS4 and RAS5) are connected to the expansion memory connector 47.

A column address strobe signal line (CAS line) and other various control signal lines (write enable signal line WE, output enable signal line OE, etc.) are commonly connected to the expansion memories 49 and 51.

All the DRAM banks in the system memory 27 and expansion memories 49 and 51 are allocated in the memory address space for DRAMs in the CPU 11. In this system, those DRAM banks are allocated in such a manner that a DRAM bank with a larger memory size is allocated at a younger address in order to simplify the decoding conditions of the individual RAS lines and to make the best use of the interleave architecture.

In the read/write access control of the system memory 27 and the expansion memories 49 and 51, one of the RAS lines (RAS0 to RAS5) is set active and the DRAM bank connected to the active RAS line is selected as a DRAM bank to be accessed. This control to enable the RAS lines is executed by the memory control logic in the system controller 25.

FIG. 19 illustrates the structure of the memory control logic.

The memory control logic 250 is a hardware logic which supports the DRAM page mode access and page interleave, and has an address converter 251, a RAS decoder 252, a row address/column address multiplexer 253, a CAS generator 254, a timing controller 255 and a page hit determining circuit 256.

The address converter 251 converts a CPU address (A31:02) to a DRAM logical address (MA31:02). This conversion is executed to contiguously allocate a plurality of DRAM memory areas, dispersed in the memory address space of the CPU 23, in the special logical address space for DRAM access. One example of this address conversion is illustrated in FIGS. 20A and 20B.

Figure 20A:
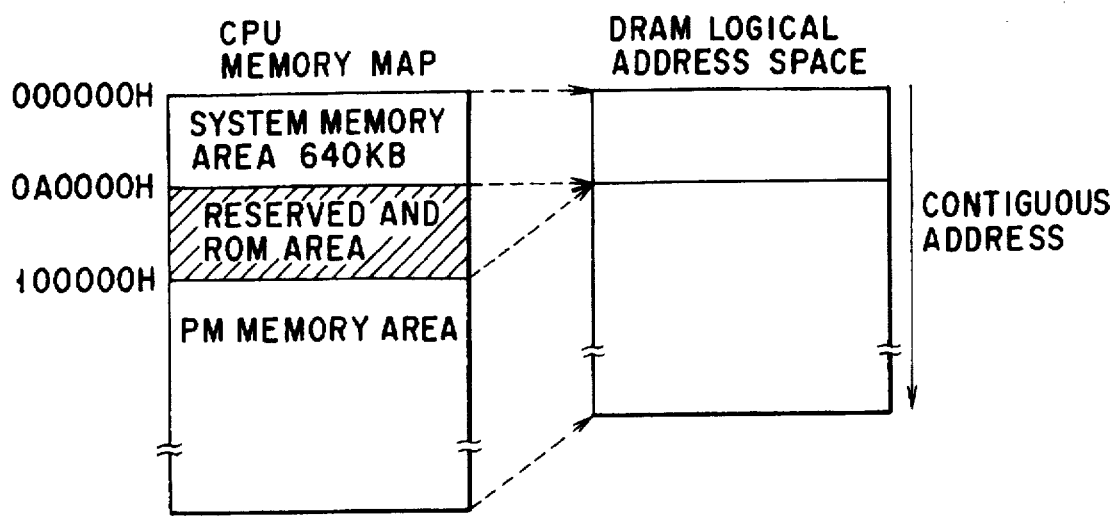
FIGS. 20A and 20B are diagrams illustrating conversion from the CPU's memory address space to the DRAM logical address space which is executed by an address converter included in the memory control logic in FIG. 19.

As shown in FIG. 20A, a reserve area (0A0000H to 0C0000H) for the allocation of the video RAM, BIOS ROM and various option ROMs as well as DRAM areas like the system memory area and PM memory area are secured in the memory address space of the CPU 23. In accordance with such a CPU memory map, the address converter 251 performs address conversion such that the addresses of the DRAM areas immediately preceding and following the reserve area are contiguous.

Figure 20B:
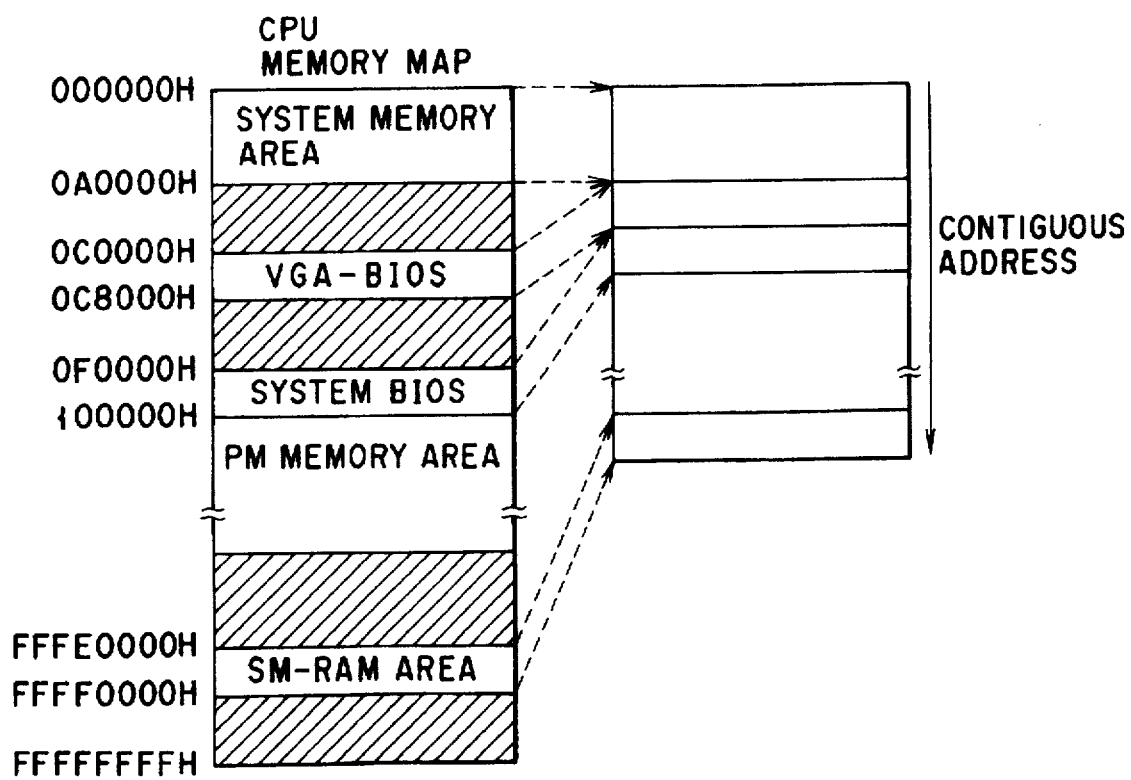

To copy the VGA BIOS and system BIOS, stored in the BIOS ROM, into the DRAM area and use them in such a form, the CPU addresses allocated to the VGA BIOS area and system BIOS area in the reserve area are also converted to DRAM logical addresses, as shown in FIG. 20B. For a CPU having the system management mode (SMM), the CPU address allocated to the SMRAM area which is used only in the SMM is also converted to a DRAM logical address.

This conversion of the CPU address to a DRAM logical address is performed every 16 Kbytes, for example. Therefore, the lower bit portion (MA13:02) of the DRAM logical address is equal to the lower bit portion (A13:02) of the CPU address.

The DRAM logical address (MA31:02) obtained by the address converter 251 is used to address a DRAM bank in the system.

The RAS decoder 252 decodes the DRAM logical address (MA31:02) in accordance with the decoding conditions for the RAS0-RAS5 lines set in its internal register, selects the RAS line among the RAS0-RAS5 lines that has the decoding condition satisfying the DRAM logical address, and sets the selected RAS line active. The timing at which the RAS line is set active is controlled by a timing control signal CONT1 from the timing controller 255.

The decoding operation of the RAS decoder 252 can be carried out only by detecting the coincidence/non-coincidence of the decoding condition of each RAS line with the DRAM logical address. How to determine the decoding conditions of the RAS0-RAS5 lines will be described in detail later with reference to FIGS. 20A and 20B.

The row address/column address multiplexer 253 separates the DRAM logical address (MA31:02) to a row address (RA) and a column address (CA) for addressing the DRAM bank to be accessed. The row address/column address multiplexer 253 has an internal register where control parameters indicating the positions of the start bits of the row addresses of the individual DRAM banks are set previously. The operation to separate the DRAM logical address into the row address (RA) and column address (CA) is performed in accordance with the control parameter associated with the DRAM bank to be accessed.

The row address (RA) and column address (CA) are output on the memory bus 43 in a time-divisional manner. Their output timings are controlled by a timing control signal CONT2 from the timing controller 255.

The CAS generator 254 controls the activation of the CAS line in accordance with a timing control signal CONT3 from the timing controller 255.

The timing controller 255 generates the aforementioned timing control signals CONT1-CONT3 to control the operation of the RAS decoder 252, the row address/column address multiplexer 253 and the CAS generator 254. The operation for generating the timing control signals is controlled by a page hit signal HIT from the page hit determining circuit 256.

The page hit determining circuit 256, which is holding the CPU address at the time of the previous DRAM access as a CPU address for page hit determination, compares this CPU address with the CPU address at the time of the next DRAM access to determine if there is a page hit. The "page hit" means that the next DRAM access accesses the same page in the same DRAM bank as accessed by the previous DRAM access. When the presence of a page hit is determined, this event is reported to the timing controller 255 by means of the page hit signal HIT.

The determination of a page hit is performed based on the value of the CPU address, not the DRAM logical address. It is therefore possible to execute the address conversion and the determination of a page hit in parallel. The reason why the CPU address can be used for determining a page hit is that the unit (16 Kbytes) of the address conversion from the CPU address to a DRAM logical address is set greater than the page size of a DRAM bank (about 4 Kbytes at a maximum).

A sequence of the upper bits than the column address in the CPU address (A31:02) is used in determining a page hit. The number of bits of the column address or the page size differs every DRAM bank to be accessed. A control parameter for specifying the bit to be used in the page hit determination for each RAS line is set previously in an internal register of the page hit determining circuit 256, and the determination of a page hit is performed in accordance with the control parameter associated with the DRAM bank to be accessed.

The DRAM control timings by this memory control logic 250 are classified into the cycle timings associated with the following three states.

(1) Page hit
This means that the next DRAM access accesses the same page in the same DRAM bank as accessed by the previous DRAM access. In this case, the access control of the DRAM bank is performed in a page mode. That is, only the column address and the timing for enabling the CAS line are controlled and no switching of the RAS lines by the RAS decoder 252 is performed. Even when the previous memory cycle is completed, the RAS line is kept at the active state.

(2) Bank miss
This means that the next DRAM access accesses a DRAM bank different from the one accessed by the previous DRAM access. In this case, the RAS decoder 252 should switch the RAS lines and the DRAM bank is accessed in the normal DRAM access cycle. Further, the CPU address for page hit determination held in the page hit determining circuit 256 is updated.

(3) Page miss
This means that the next DRAM access accesses a different page in the same DRAM bank as accessed by the previous DRAM access. In this case, the RAS decoder 252 sets the same RAS line as selected in the previous DRAM access to the active state again, and the DRAM bank is accessed in the normal DRAM access cycle. Further, the CPU address for page hit determination held in the page hit determining circuit 256 is renewed.

The decoding conditions of the individual RAS lines set in the RAS decoder 252 will be discussed with reference to FIGS. 21 through 23.

Figure 21:
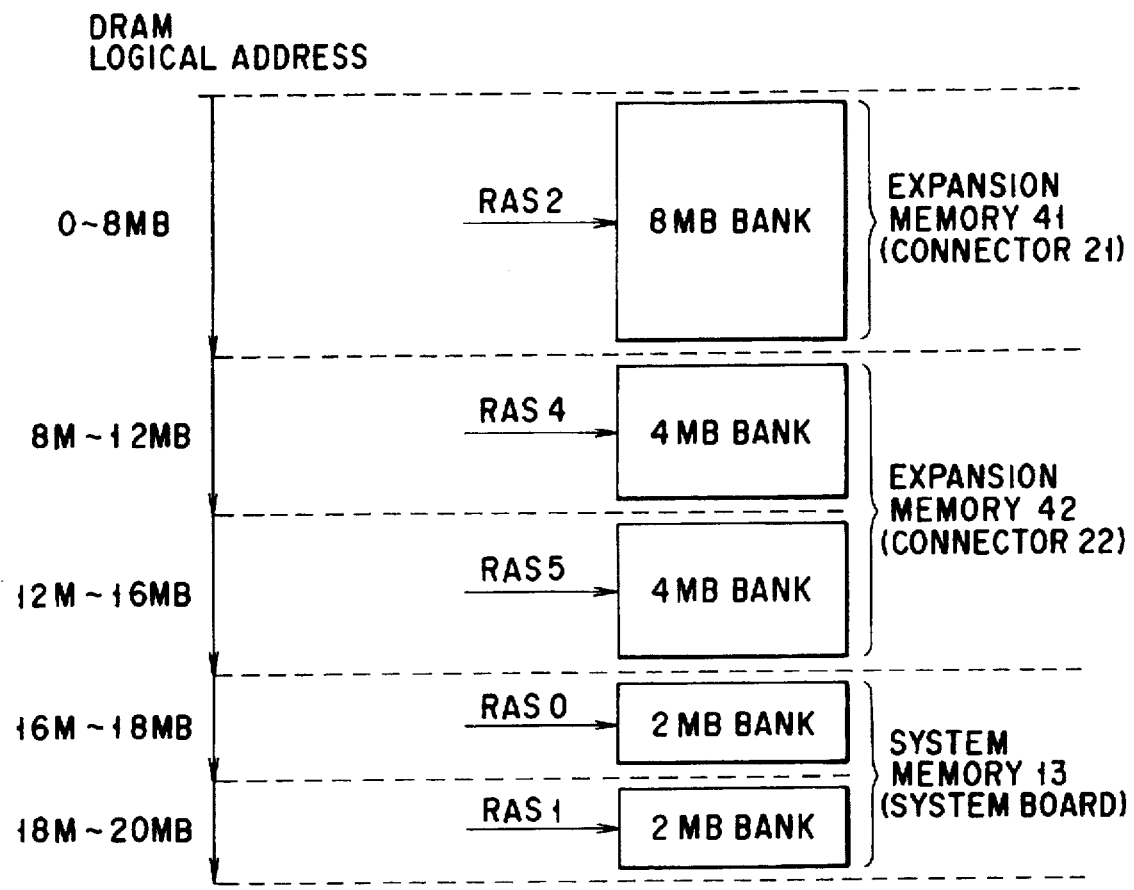
FIG. 21 is a diagram showing a DRAM memory map showing that a plurality of DRAM banks provided in the system of the second embodiment are reallocated in the DRAM logical address space in the memory-size order.

FIG. 21 shows one example of a DRAM memory map in the system. This DRAM memory map is associated with the case where two 2-Mbyte DRAM banks are installed as the system memory 27 on the system board 21, the expansion memory 49 for the expansion memory connector 45 consists of a single 8-Mbyte DRAM bank and the expansion memory 51 for the expansion memory connector 47 consists of two 4-Mbyte DRAM banks, as illustrated in FIG. 18.

In this case, those DRAM banks are allocated in the DRAM logical address space of a total of 20 Mbytes in the descending memory-size order, i.e., the 8-Mbyte DRAM bank, two 4-Mbyte DRAM banks and two 2-Mbyte DRAM banks as shown in FIG. 21.

In this memory allocation, an address range of 0 to 8 Mbytes is allocated to the RAS2 line associated with the 8-Mbyte DRAM bank. An address range of 8 to 12 Mbytes is allocated to the RAS4 line associated with the first 4-Mbyte DRAM bank, and an address range of 12 to 16 Mbytes is allocated to the RAS5 line associated with the next 4-Mbyte DRAM bank. Further, an address range of 16 to 18 Mbytes is allocated to the RAS0 line associated with the first 2-Mbyte DRAM bank, and an address range of 18 to 20 Mbytes is allocated to the RAS1 line associated with the next 2-Mbyte DRAM bank. As the RAS3 line is not used, no address range is allocated to this RAS3 line.

The decoding conditions for the RAS0-RAS5 lines are determined as illustrated in FIG. 22.

As the decoding condition for each of the RAS0-RAS5 lines, a sequence of bits commonly present only in all the DRAM logical address values (MA31:02) belonging to the address range allocated to each RAS line is used.

More specifically, the decoding condition for the RAS2 line is the upper 9 bits (MA31-23) ="0000 0000 0" of the DRAM logical address value (MA31:02). The lower 21 bits of the DRAM logical address value (MA31:02) is used as the row address and column address of the 8-Mbyte DRAM bank connected to the RAS2 line.

The decoding condition for the RAS4 line is the upper 10 bits (MA31-22) ="0000 0000 10" of the DRAM logical address value (MA31:02). The lower 20 bits of the DRAM logical address value (MA31:02) is used as the row address and column address of the 4-Mbyte DRAM bank connected to the RAS4 line.

The decoding condition for the RAS5 line is the upper 10 bits (MA31–22) ="0000 0000 11" of the DRAM logical address value (MA31:02). The lower 20 bits of the DRAM logical address value (MA31:02) is used as the row address and column address of the 4-Mbyte DRAM bank connected to the RAS5 line.

The decoding condition for the RAS0 line is the upper 11 bits (MA31–21) ="0000 0001 000" of the DRAM logical address value (MA31:02). The lower 19 bits of the DRAM logical address value (MA31:02) is used as the row address and column address of the 2-Mbyte DRAM bank connected to the RAS0 line.

The decoding condition for the RAS1 line is the upper 11 bits (MA31–21) ="0000 0001 001" of the DRAM logical address value (MA31:02). The lower 19 bits of the DRAM logical address value (MA31:02) is used as the row address and column address of the 2-Mbyte DRAM bank connected to the RAS1 line.

As apparent from the above, a common sequence of bits belonging to the address range associated with each RAS line is used as the decoding condition for each of the RAS0–RAS5 lines. This approach allows the RAS decoder 252 to simply detect the coincidence/non-coincidence of the DRAM logical address value and the decoding condition for each RAS line, thus considerably simplifying the hardware structure as compared with the prior art.

A description will now be given of the decoding conditions for the individual RAS lines in the case where the page interleave architecture is employed.

In executing the page interleave, five DRAM banks mapped as shown in FIG. 21 are classified into page-interleavable bank groups. Each bank group includes a combination of banks whose memory address ranges are adjacent to each other and whose total memory sizes coincide with each other. This grouping is conducted in the order from a bank having a smaller-valued DRAM logical address.

In the example in FIG. 21, as the two 4-Mbyte DRAM banks allocated to the address ranges subsequent to the address range (0 to 8 Mbytes) of the 8-Mbyte DRAM bank for the RAS2 have a total memory size of 8 Mbytes, three banks associated with the RAS2, RAS4 and RAS5 constitute one page interleave group.

Further, as the 2-Mbyte DRAM banks for the RAS1 is allocated to the address range subsequent to the address range (16 to 8 Mbytes) of the 2-Mbyte DRAM bank for the RAS0, two banks associated with the RAS0 and RAS1 constitute another page interleave group.

In this case, the decoding conditions for the individual RAS lines are changed to what is shown in FIG. 23 from the one shown in FIG. 22.

As the decoding condition for each of the RAS2, RAS4 and RAS5 in a group 1, a common sequence of bits present in all the DRAM logical address values (MA31:02) belonging to the address range of a total of 16 Mbytes (0 to 16 Mbytes) allocated to the group 1 and a sequence of bits between the column address (address in a page) and the row address (page address) of the DRAM bank associated with each of the RAS2, RAS4 and RAS5 are used.

More specifically, the upper 8 bits (MA31–24) ="0000 0000" of the DRAM logical address value (MA31:02) are commonly present in the 16-Mbyte address range allocated to the RAS2, RAS4 and RAS5, and the sequence of those 8 bits is not present in a group 2, as shown in FIG. 23.

Therefore, (MA31–24) ="0000 0000" is used as the common decoding condition for the RAS2, RAS4 and With regard to the RAS2, the start position of the row address in the DRAM logical address is shifted one bit leftward and one bit (MA12) ="0" between the row address and the column address of the 8-Mbyte DRAM bank associated with the RAS2 is added as the decoding condition.

As regards the RAS4 and RAS5, the start position of the row address in the DRAM logical address is shifted leftward by two bits and the values of two bits (MA13, 12) between the row address and the column address of the associated 4-Mbyte DRAM bank are added as the decoding condition. The reason for using two bits is that the memory size for each of the RAS4 and RAS5 is a half the memory size for the RAS2.

More specifically, two bits (MA13, 12) ="01" between the row address and the column address of the 4-Mbyte DRAM bank associated with the RAS4 are added as the decoding condition for the RAS4, while two bits (MA13, 12) ="11" between the row address and the column address of the 4-Mbyte DRAM bank associated with the RAS5 are added as the decoding condition for the When the decoding conditions for the RAS2, RAS4 and RAS5 are determined in the above manner, even pages RAS5. (0, 2, 4, 6, . . . ) in the address range of 0 to 16 Mbytes are allocated to the 8-Mbyte DRAM bank for the RAS2, parts of odd pages (1, 5, 9, . . . ) in the address range of 0 to 16 Mbytes are allocated to the 4-Mbyte DRAM bank for the RAS4, and the remaining odd pages (3, 7, 11, . . . ) in the address range of 0 to 16 Mbytes are allocated to the 4-Mbyte DRAM bank for the RAS5.

When a continuous access within the range of 0 to 16 Mbytes is performed, three DRAM banks are alternately accessed page by page in the order of RAS2, RAS4, RAS2, RAS5, RAS2, and so forth.

The following are the decoding conditions for the RAS0 and RAS1 in the group 2.

A common sequence of bits present in all the DRAM logical address values (MA31:02) belonging to the address range of a total of 4 Mbytes (16 to 20 Mbytes) allocated to the group 2 and a sequence of bits between the column address and the row address of the DRAM bank associated with the RAS0 and a sequence of bits between the column address and the row address of the DRAM bank associated with the RAS1 are used as the decoding conditions for the RAS0 and RAS1.

The upper 10 bits (MA31–22) ="0000 0001 00" of the DRAM logical address value (MA31:02) are commonly present in the 4-Mbyte address range allocated to the RAS0 and RAS1, and this bit sequence is not present in the group 1. Therefore, (MA31–22) ="0000 0001 00" is used as the common decoding condition for the RAS0 and RAS1.

With regard to the RAS0, the start position of the row address in the DRAM logical address is shifted one bit leftward and one bit (MA11) ="0" between the row address and the column address of the 2-Mbyte DRAM bank associated with the RAS0 is added as the decoding condition.

With regard to the RAS1, likewise, the start position of the row address in the DRAM logical address is shifted one bit leftward and one bit (MA11) ="1" between the row address and the column address of the associated 2-Mbyte DRAM bank is added as the decoding condition.

When the decoding conditions for the RAS0 and RAS1 are determined in the above manner, even pages (0, 2, 4, 6, . . . ) in the 4-Mbyte address range of 16 to 20 Mbytes are allocated to the 2-Mbyte DRAM bank for the RAS0, and odd pages (1, 3, 5, 7, . . . ) in this address range are allocated to the 2-Mbyte DRAM bank for the RAS1. When a continuous access within the range of 16 to 20 Mbytes is performed, two DRAM banks are alternately accessed page by page in the order of RAS0, RAS1, RAS0, RAS1 and so forth.

As apparent from the above, the page interleave can be accomplished simply by determining the decoding condition for each RAS based on a common sequence of bits present in the address range of the interleave group and a predetermined bit sequence between the row address and column address and setting it in the RAS decoder 252.

The initialization of the memory control logic 250, such as setting of the decoding conditions in the RAS decoder 252, is performed by the IRT routine in the BIOS ROM 29.

Figure 24:
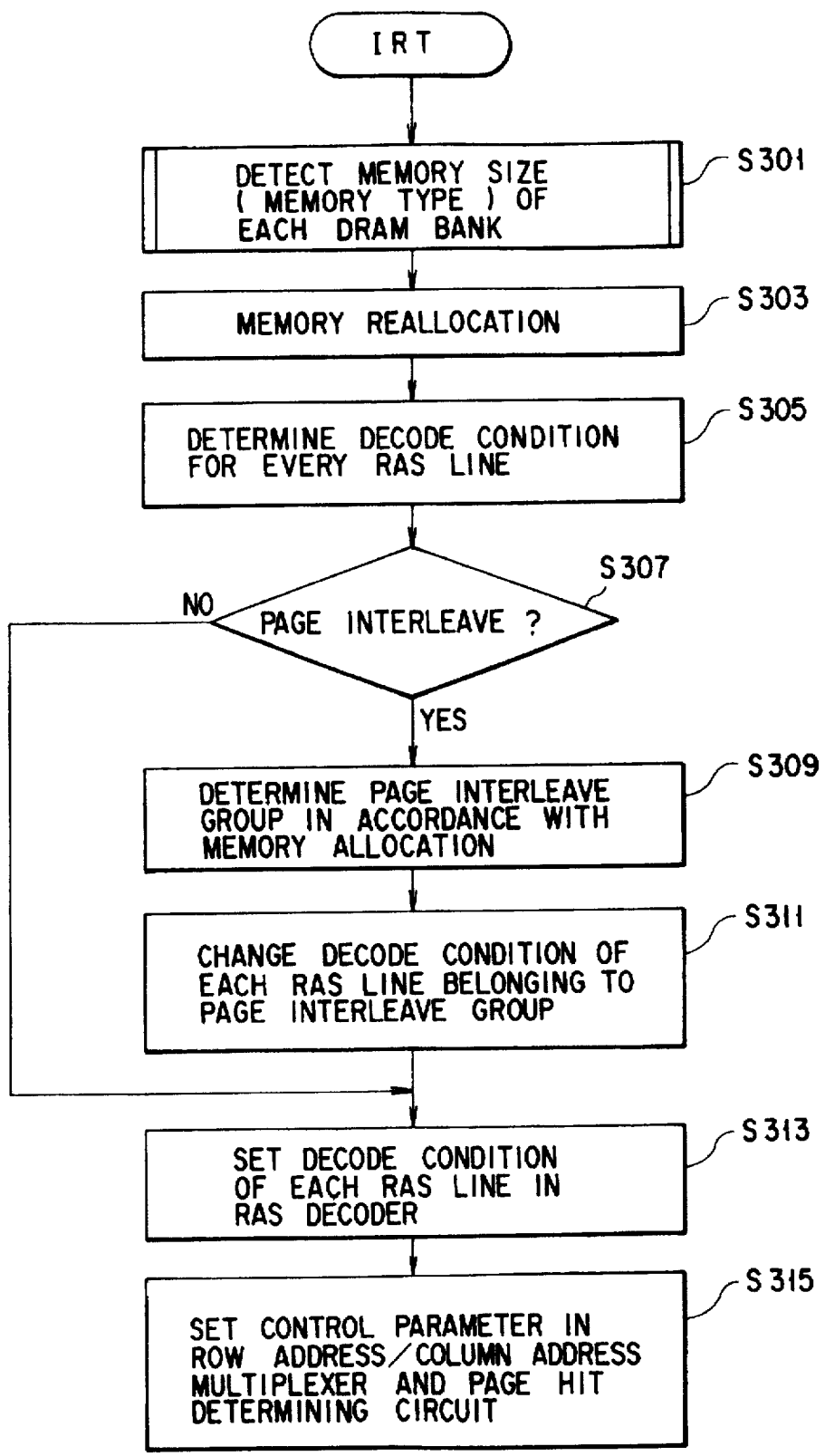

FIG. 24 illustrates a sequence of processes for initializing the memory control logic 250, which are executed by the IRT routine.

When the system is powered on, the IRT routine first checks the memory type of each DRAM bank (the bit lengths of the column address and row address), and detects the memory size according to the memory bank type (step S301). The bit lengths of the column address and row address can be detected by executing a write.read.compare test on a specific memory address in the DRAM bank to be tested.

The details of the operation for detecting the memory size carried out at this step S301 will be discussed later with reference to FIG. 25.

Next, the IRT routine performs memory reallocation of DRAM banks in the system (step S303). In this memory reallocation, the DRAM banks are allocated in the ascending memory-size order so that a DRAM bank with a larger memory size is allocated at a smaller-valued address in the memory address space, and the address range to be allocated to each DRAM bank is determined in accordance with this allocation, as already explained with reference to FIG. 21.

Next, the IRT routine detects a common sequence of bits present only in the values of the DRAM logical addresses belonging to the address range allocated to each DRAM bank and determines this common bit sequence as the decoding condition for the associated RAS line (step S305), as already explained with reference to FIG. 22.

If no page interleave architecture is used, the IRT routine directly sets the decoding conditions for the individual RAS lines determined at step S305 in the internal register of the RAS decoder 122 (step S313). Then, the IRT routine sets a control parameter specifying the start position of the row address for each RAS line in the internal register of the row address/column address multiplexer 253, and sets a control parameter specifying the start position of the CPU address for each RAS line, which is used for the determination of a page hit, in the internal register of the page hit determining circuit 256 (step S315). The values of those control parameters are determined in accordance with the memory bank type detected at step S301.

When the page interleave architecture is used, on the other hand, the IRT routine determines a page-interleavable group in accordance with the DRAM map of the DRAM banks allocated in the memory-size order at step S303 (step S309). Then, the IRT routine alters the decoding condition for each RAS based on the common sequence of bits present in the address range of the interleave group and a predetermined bit sequence between the row address and column address (step S311).

Then, the IRT routine directly sets the decoding conditions for the individual RAS lines determined at step S311 in the internal register of the RAS decoder 122 (step S313).

Then, the IRT routine sets a control parameter specifying the start position of the row address for each RAS line in the internal register of the row address/column address multiplexer 253, and sets a control parameter specifying the start position of the CPU address for each RAS line, which is used for the determination of a page hit, in the internal register of the page hit determining circuit 256 (step S315). The start position of the row address is determined based on the memory bank type detected at step S301 and the number of bits between the row address and column address used as the decoding condition for page interleave. The position of the CPU address used for the determination of a page hit is determined in accordance with the memory bank type detected at step S301.

The principle of the process for detecting the memory size of a DRAM bank will be described with reference to FIGS. 25 through 29.

To begin with, the type of DRAM banks whose accesses can be controlled by a single RAS line will be described referring to FIG. 25. As illustrated, the DRAM banks are classified into four banks: type 1 to type 4.

The DRAM bank of the type 1 has a memory size of 2 Mbytes. The DRAM bank of the type 1 includes four 4-Mbit DRAM chips each having a structure of 512K (1K rows ×512 columns)×8 bits, with the row address having a bit length of 10 bits and the column address having a bit length of 9 bits.

The DRAM bank of the type 2 has a memory size of 4 Mbytes. The DRAM bank of the type 2 includes eight 4-Mbit DRAM chips each having a structure of 1M (1K rows ×1K columns)×4 bits, with the row address having a bit length of 10 bits and the column address having a bit length of 10 bits.

The DRAM bank of the type 3 has a memory size of 8 Mbytes. The DRAM bank of the type 3 includes four 16-Mbit DRAM chips each having a structure of 2M (2K rows ×1K columns)×8 bits, with the row address having a bit length of 11 bits and the column address having a bit length of 10 bits.

The DRAM bank of the type 4 has a memory size of 16 Mbytes. The DRAM bank of the type 4 includes eight 16-Mbit DRAM chips each having a structure of 4M (2K rows ×2K columns)×4 bits, with the row address having a bit length of 11 bits and the column address having a bit length of 11 bits.

Figure 28:
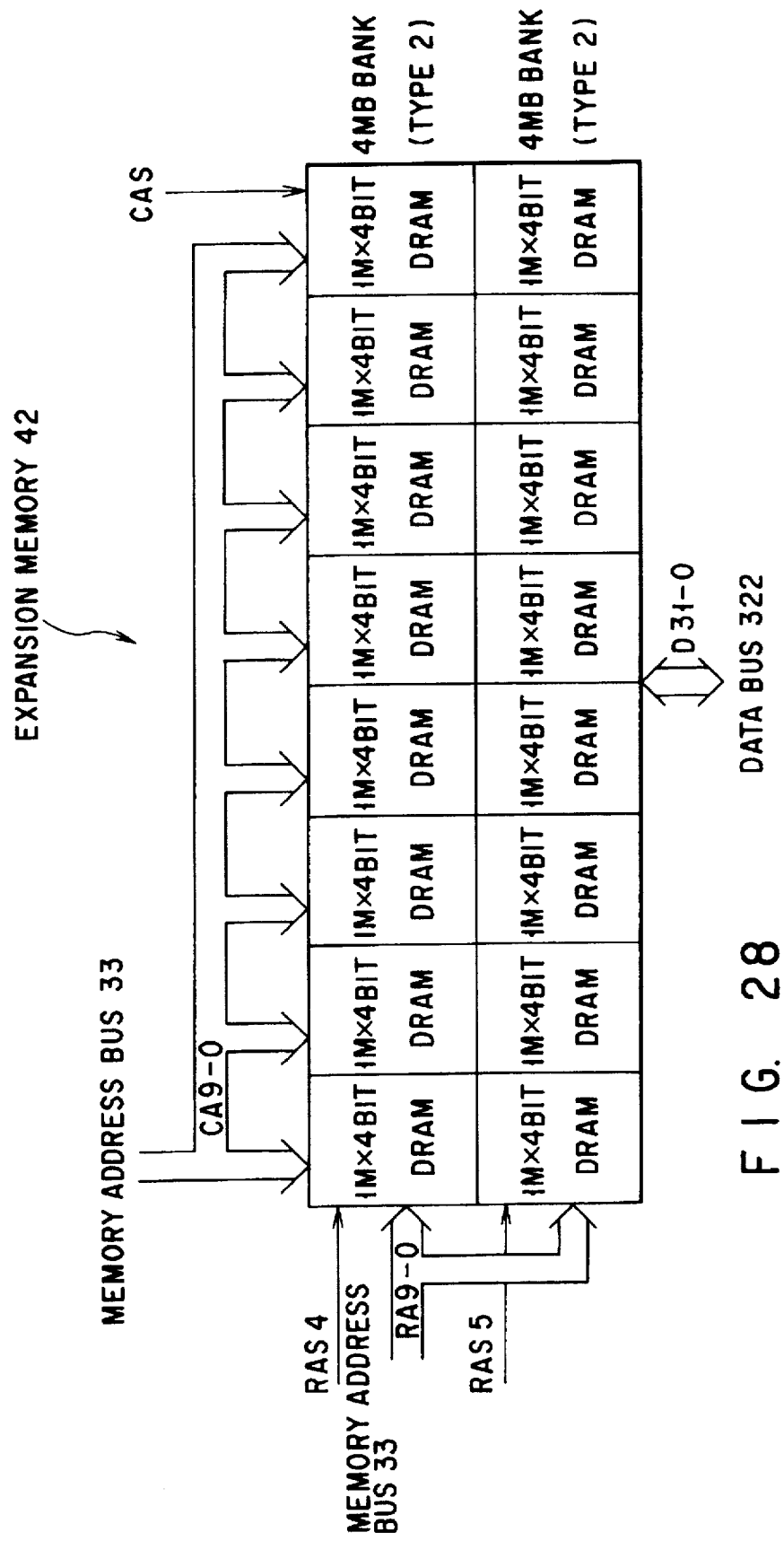
FIG. 28 is a diagram showing one example of the memory structure of an expansion memory which is installed in an expansion memory slot provided in the system of the second embodiment.

FIGS. 26, 27 and 28 respectively illustrate the memory structures of the system memory 27, the expansion memory 49 and the expansion memory 51 in FIG. 18.

If the system memory 27 consists of two 2-Mbyte DRAM banks of the type 1, the four DRAM chips of one of the 2-Mbyte DRAM bank are commonly connected to the RAS0 line and the CAS line, and the four DRAM chips of the other 2-Mbyte DRAM bank are commonly connected to the RAS1 line and the CAS line, as shown in FIG. 26. All the chips in those two 2-Mbyte DRAM banks are connected in parallel to both the memory address bus 43 and a data bus 412.

Which one of the two 2-Mbyte DRAM banks is to be addressed depends on whether RAS0 or RAS1 is enabled.

When the RAS0 line is enabled, the lower 10 bits of the address value output then on the memory address bus 43 is fetched as the row address into the four chips connected to the RAS0 line. Then, the four chips connected to the RAS0 line fetch the lower 9 bits of the address value output on the memory address bus 43 as the column address when the CAS line is enabled. The same addresses in the four chips connected to the RAS0 line are simultaneously addressed by those 10-bit row address and 9-bit column address, and a read/write access to the DRAM bank associated with the RAS0 line is performed by eight bits per chip, a total of 32 bits.

When the RAS1 line is enabled, the lower 10 bits of the address value output then on the memory address bus 43 is fetched as the row address into the four chips connected to the RAS1 line. Then, the four chips connected to the RAS1 line fetch the lower 9 bits of the address value output on the memory address bus 43 as the column address when the CAS line is enabled. The same memory locations in the four chips connected to the RAS1 line are simultaneously addressed by those 10-bit row address and 9-bit column address, and a read/write access to the DRAM bank associated with the RAS1 line is performed by eight bits per chip, a total of 32 bits.

If the expansion memory 49 consists of a single 8-Mbyte DRAM bank of the type 3, the four DRAM chips of the 8-Mbyte DRAM bank are commonly connected to the RAS2 line and the CAS line, as shown in FIG. 27. All the chips in the 8-Mbyte DRAM bank are connected in parallel to both the memory address bus 43 and the data bus 412.

When the RAS2 line is enabled, the lower 11 bits of the address value output then on the memory address bus 43 is fetched as the row address into the four chips connected to the RAS2 line. Then, the four chips connected to the RAS2 line fetch the lower 10 bits of the address value output on the memory address bus 43 as the column address when the CAS line is enabled. The associated memory locations in the four chips connected to the RAS2 line are simultaneously addressed by those 11-bit row address and 10-bit column address, and a read/write access to the DRAM bank associated with the RAS2 line is performed by eight bits per chip, a total of 32 bits.

If the expansion memory 51 consists of two 4-Mbyte DRAM banks of the type 2, the eight DRAM chips of one of the 4-Mbyte DRAM banks are commonly connected to the RAS4 line and the CAS line and the eight DRAM chips of the other 4-Mbyte DRAM bank are commonly connected to the RAS5 line and the CAS line, as shown in FIG. 28. All the chips in the 8-Mbyte DRAM bank are connected in parallel to both the memory address bus 43 and the data bus 412.

Which one of the two 4-Mbyte DRAM banks is to be addressed depends on whether RAS4 or RAS5 is enabled.

When the RAS4 line is enabled, the lower 10 bits of the address value output then on the memory address bus 43 is fetched as the row address into the eight chips connected to the RAS4 line. Then, the eight chips connected to the RAS4 line fetch the lower 10 bits of the address value output on the memory address bus 43 as the column address when the CAS line is enabled. The same memory locations in the eight chips connected to the RAS4 line are simultaneously addressed by those 10-bit row address and 10-bit column address, and a read/write access to the DRAM bank associated with the RAS4 line is performed by four bits per chip, a total of 32 bits.

When the RAS5 line is enabled, the lower 10 bits of the address value output then on the memory address bus 43 is fetched as the row address into the eight chips connected to the RAS5 line. Then, the eight chips connected to the RAS5 line fetch the lower 10 bits of the address value output on the memory address bus 43 as the column address when the CAS line is enabled. The same memory locations in the eight chips connected to the RAS5 line are simultaneously addressed by those 10-bit row address and 10-bit column address, and a read/write access to the DRAM bank associated with the RAS5 line is performed by four bits per chip, a total of 32 bits.

It is apparent from the above that the relationship between the number of bits used as the row address and the number of bits used as the column address differs for each type of the DRAM banks. The memory size of the DRAM bank connected to each RAS line is detected by using the difference between the number of bits used as the row address and the number of bits used as the column address.

Figure 29:
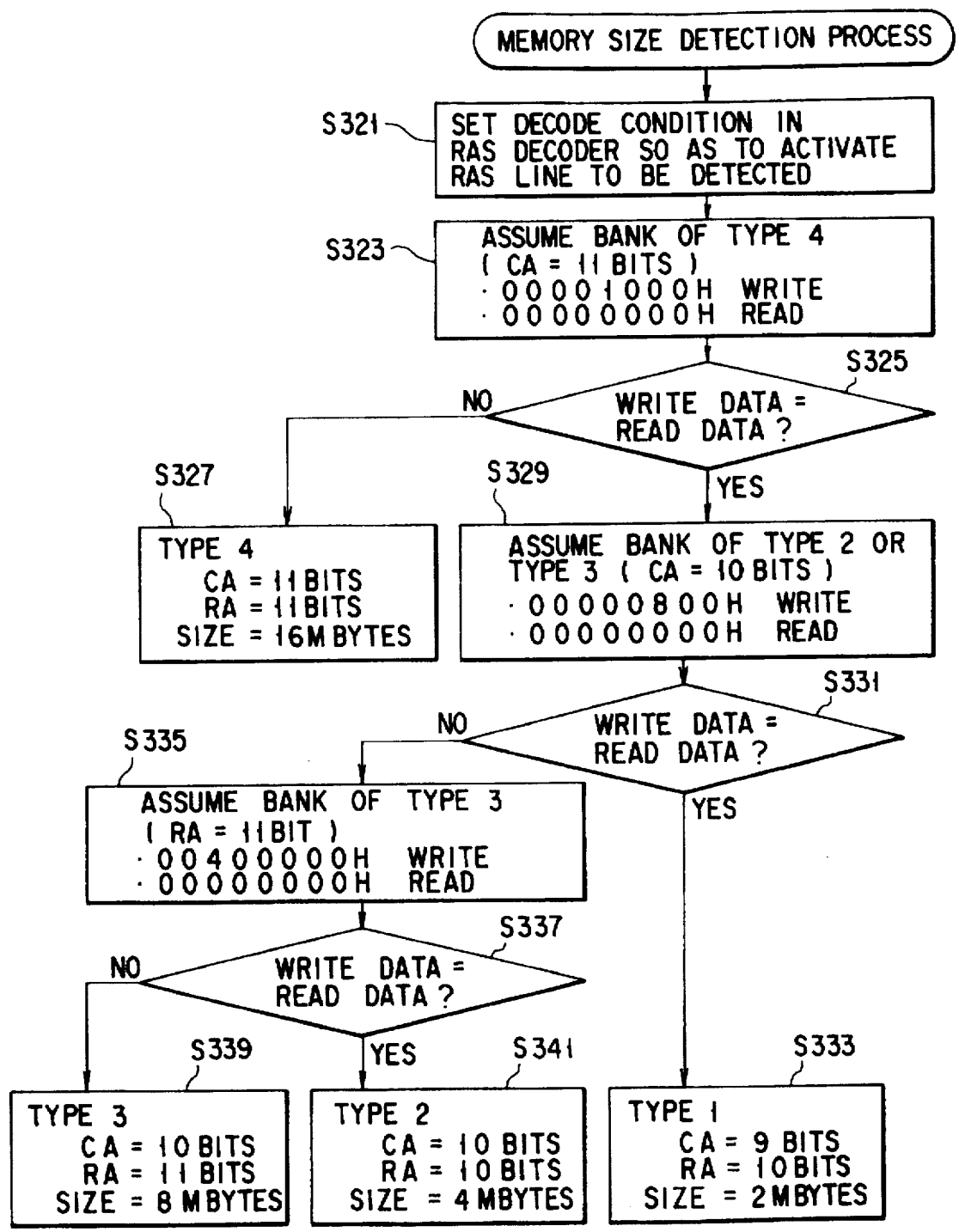
FIG. 29 is a flowchart illustrating a sequence of processes for detecting the memory sizes of individual DRAM banks, which is executed in the initialization process of the memory control logic in FIG. 24.

The detection of the memory size of a DRAM bank executed at step S301 in the IRT routine will be described with reference to the flowchart in FIG. 29.

The IRT routine detects the memory sizes of the DRAM banks connected to the RAS lines in the order of RAS0, RAS1, RAS2 and so forth. First, the IRT routine sets a predetermined decoding condition in the RAS decoder so as to permit the enabling of the RAS line to be checked (step S321). In this case, a common sequence of bits in the memory address values used in several memory accesses that are carried out to detect the memory size is used as the decoding condition for the RAS line to be checked. With regard to all other RAS lines than the RAS line to be checked, a predetermined sequence of bits different from the common bit sequence for the RAS line to be checked is set as the decoding condition for each such RAS line so that those RAS lines are not enabled in the several memory accesses that are carried out to detect the memory size.

Next, assuming that among the DRAM banks of the type 1 to the type 4, the DRAM bank of the type 4 having the largest number of bits in the column address (column address CA=11 bits and row address RA=11 bits) is connected to the RAS line to be checked, the IRT routine performs a write.read.compare test on this DRAM bank (step S323). In this case, the control parameter associated with the DRAM bank of the type 4 is set in the row address/column address multiplexer 253. In the write.read.compare test, a write access to the write address 00001000H (H indicating hexadecimal notation) and a read access to the read address 00000000H are executed, and it is checked if the write data then coincides with the read data then (step S325).

If the DRAM bank actually connected to the RAS line to be checked is a DRAM bank of the type 4 as assumed, data can be written properly at the address 00001000H, so that the value of the write data does not match with the value of the read data. If the DRAM bank actually connected to the RAS line to be checked is a DRAM bank of the type 1, type 2 or type 3 whose number of bits in the column address is equal to or smaller than 10 bits, the value of the write data coincides with the value of the read data. The reason for making the above decisions will be given below.

Since the setting for the DRAM bank of the type 4 is made at step S323, the 11-bit row address RA (MA23, . . . , MA13) output at the time of a write access to the address 00001000H is "00000000000" and the 11-bit column address CA (MA12, . . . , MA02) is "10000000000." For the DRAM bank whose number of bits in the column address is equal to or less than 10 bits, the value of the most significant bit MA12 in the 11-bit column address CA is disregarded. If a DRAM bank of the type 1, type 2 or type 3 is connected to the RAS line to be checked, therefore, the write access to the write address 00001000H causes data to be written at the address designated by the column address CA=0000000000 in the head row, i.e., at the address 00000000H. As a result, the read data read in the read access to the read address 00000000H coincides with the write data.

When the non-coincidence of the write data with the read data is detected at step S325, the DRAM bank connected to the RAS line to be checked is determined as a DRAM bank of the type 4 (CA=11 bits, RA=11 bits and memory size =16 Mbytes) as assumed (step S327). When the coincidence of the write data with the read data is detected, on the other hand, the DRAM bank connected to the RAS line to be checked is determined as a DRAM bank of one of the other types (type 1, type 2 or type 3) whose number of bits in the column address is equal to or less than 10 bits. In this case, the sequence of processes starting at step S329 as will be discussed shortly is executed.

This time, the IRT routine assumes that the memory structure of the type 3 (or type 2) (column address CA=10 bits and row address RA=11 bits) having the second largest number of bits in the column address to the type 4 is connected to the RAS line to be checked, and then performs the write.read.compare test on this DRAM bank (step S329). In the write.read.compare test, a write access to the write address 00000800H and a read access to the read address 00000000H are executed, and it is checked if the write data then coincides with the read data then (step S331).

If the DRAM bank actually connected to the RAS line to be checked is a DRAM bank of the type 1 whose number of bits in the column address is equal to or less than 9 bits, the most significant bit "1" in the column address is neglected as in the above case and data is written at the address 00000000H of the DRAM bank of the type 1. Consequently, the value of the write data coincides with the value of the read data. When the coincidence of the write data with the read data is detected, therefore, it is determined that the DRAM bank of the type 1 (CA=9 bits, RA=10 bits and memory size =2 Mbytes) is keyboard the RAS line to be checked (step S333).

If the DRAM bank actually connected to the RAS line to be checked is a DRAM bank of the type 2 or type 3 whose number of bits in the column address is equal to or smaller than 10 bits as assumed, data can properly be written at the address 00010000H, so that the value of the write data does not coincide with the value of the read data. When the non-coincidence of the write data with the read data is detected, therefore, the sequence of processes starting at step S335 as will be discussed shortly is executed to detect which type of a DRAM bank, type 2 or type 3, is connected to the RAS line to be checked.

The IRT routine now assumes that the memory structure of the type 3 (column address CA=10 bits and row address RA=11 bits) having a greater number of bits in the row address than that of the type 2 is connected to the RAS line to be checked, and then performs the write.read.compare test on this DRAM bank (step S335).

In this write.read.compare test, a write access to the write address 00400000H and a read access to the read address 00000000H are executed, and it is checked if the write data then coincides with the read data then (step S337).

If the DRAM bank actually connected to the RAS line to be checked is a DRAM bank of the type 3 as assumed, data can be written properly at the address 00400000H, so that the value of the write data does not coincide with the value of the read data. If the DRAM bank actually connected to the RAS line to be checked is a DRAM bank of the type 2 whose row address has 10 bits, the value of the write data coincides with the value of the read data. The reason for making such decisions will be given below.

Since the setting for the DRAM bank of the type 3 is made at step S335, the 11-bit row address RA (MA22, . . . , MA12) output at the time of a write access to the address 00400000H is "10000000000" and the 10-bit column address CA (MA11, . . . , MA02) is "0000000000." For the DRAM bank whose row address consists of 10 bits, the value of the most significant bit MA22 in the 11-bit row address RA is disregarded. If a DRAM bank of the type 2 is connected to the RAS line to be checked, therefore, the write access to the write address 00400000H causes data to be written at the address designated by the column address CA ="0000000000" in the head row, i.e., at the address 00000000H. Accordingly, the read data read in the read access to the read address 00000000H coincides with the write data.

When the non-coincidence of the write data with the read data is detected at step S337, the DRAM bank connected to the RAS line to be checked is determined as a DRAM bank of the type 3 (CA=10 bits, RA=11 bits and memory size =8 Mbytes) as assumed (step S339). When the coincidence of the write data with the read data is detected, on the other hand, the DRAM bank connected to the RAS line to be checked is determined as a DRAM bank of the type 2 whose row address consists of 10 bits (CA=10 bits, RA=10 bits and memory size =4 Mbytes) (step S341).

A description will now be given of the specific circuit structures of the RAS decoder 252, row address/column address multiplexer 253 and page hit determining circuit 256, which have already been discussed with reference to FIG. 19.

FIG. 30 shows the specific structure of the RAS decoder 252. The RAS decoder 252 includes six RAS decode circuits 53, 55, 57, 59, 61 and 63 respectively associated with the RAS0 line to RAS5 line, as illustrated. Each of the RAS decode circuits 53–63 checks the coincidence/non-coincidence of the DRAM logical address (MA31:02) with the associated decoding condition and enables the associated RAS line at a predetermined timing when there is a coincidence. In this case, it is actually unnecessary to see all the bit values of the 30-bit DRAM logical address (MA31:02), and only 9 bits, namely MA26, MA25, MA24, MA23, MA22, MA21, MA13, MA12 and MA11, are used in address decoding from several conditions, such as the types of the supported DRAM banks and the maximum DRAM logical address space.

As the RAS decode circuits 53–63 have the same circuit structure, the circuit structure of the RAS decode circuit 53 will be discussed below as a typical model.

The RAS decode circuit 53 comprises a RAS set register 65, a RAS mask register 67, nine coincidence/non-coincidence detectors 71 to 79, nine mask circuits 81 to 89 and an AND circuit 91.

The RAS set register 65 is an I/O register which is readable and writable by the CPU 23, and a sequence of bits indicating the decoding condition for the RAS0 line is set in this register 65. For example, if the decoding condition for the RAS0 line is determined as shown in FIG. 22, "00100X XX1" is set in the RAS set register 65 as the decoding condition for the RAS0 line. Here, "X" means that a non-fixed bit value (Don't Care) which does not depend on the decoding condition.

The RAS mask register 62 is an I/O register which is readable and writable by the CPU 23; set in this register 62 is mask data ("0"= mask and "1"= unmask) specifying whether the result of the decision on the coincidence/non-coincidence of the decoding condition for the RAS0 line with the DRAM logical address is to be masked. The term "mask" means that regardless of the result of the decision on one associated bit in the sequence of bits for the decoding condition, the result of the decision on that bit is always set as matched. If "00100X XX1" is set as the decoding condition in the RAS set register 65 as mentioned above, mask data "111110 001" is set in the RAS mask register 67.

Accordingly, the bits marked "X: in the decoding condition "000100X XX1 " can be eliminated from the decoding condition.

Each of the coincidence/non-coincidence detectors 71–79 detects the coincidence/non-coincidence of the associated bits of the DRAM logical address and the decoding condition. Each of the coincidence/non-coincidence detectors 71–79 can be realized by an exclusive OR gate. The nine mask circuits 81–89 mask the detection outputs of the associated coincidence/non-coincidence detectors 71–79.

The RAS decoder 252 can be realized only by a logic which executes the coincidence/non-coincidence of data corresponding to the data size of 9 bits per RAS line.

The specific circuit structure of the row address/column address multiplexer 253 will be described with reference to FIG. 31.

The row address/column address multiplexer 253 comprises a register file 201, a pattern decoder 202, a row address selector 203, row address start switch circuits 204 to 207, and a row address/column address selector 208.

The register file 201 is a group of I/O registers readable and writable by the CPU 11, and six control parameters corresponding to the RAS0 to RAS5 are set in this register file 201. Each control parameter specifies the start position of the row address of a DRAM bank connected to the associated RAS line, i.e., specifies which bit in the DRAM logical address is to be the least significant bit (LSB) of the row address.

There are four available bits, MA11, MA12, MA13 and MA14 in the DRAM logical address, which indicate the start position of the row address in view of the types of supportable DRAM banks and the page interleave conditions. Each control parameter is 4-bit data designating one of four types of row address start positions. The control parameter "0001" designates MA11, "0010" designates MA12, "0011" designates MA13 and "0100" designates MA14.

One of the six control parameters set in the register file 2 is read into the pattern decoder 202. Which control parameter to read out is determined by the decoding result from the RAS decoder 252. For example, when the RAS0 line is enabled by the RAS decoder 252, the control parameter corresponding to the RAS0 line is read from the register file 201.

The pattern decoder 202 decodes the control parameter read from the register file 201, and causes the selector 203 to generate a select signal to select one of four types of row addresses in accordance with the decoding result.

The row address start position switch circuit 204 fetches a row address of a total of 11 bits (MA21, . . . , MA11) having MA11 as the row address start position (LSB) from the DRAM logical address (MA31:02). Likewise, the row address start position switch circuit 205 fetches a total of 11 bits (MA22, . . . , MA12) having MA12 as LSB as a row address, the row address start position switch circuit 206 fetches a total of 11 bits (MA23, . . . , MA13) having MA13 as LSB as a row address, and the row address start position switch circuit 207 fetches a total of 11 bits (MA24, . . . , MA14) having MA14 as LSB as a row address.

Those row address start position switch circuits 204 to 207 are each constituted of a barrel shifter, for example.

The row address selector 203 selectively outputs one of four types of row addresses output from the switch circuits 204–207 in accordance with the select signal from the pattern decoder 202. The row address selected by the row address selector 203 is supplied to the row address/column address 208. This row address/column address selector 208 is also supplied with the column address. The lower 11 bits (MA12, . . . , MA02) of the DRAM logical address are always used as the column address.

The row address/column address selector 208 selectively outputs the row address and column address on the memory address bus 43 at the timing specified by the control signal from the timing controller 125 in FIG. 19.

In the row address/column address multiplexer 253, the row address extraction by each of the row address start position switch circuits 204–207 is executed in parallel to the decoding operation of the RAS decoder 252. When the decoding result of the RAS decoder 252 is settled, one control parameter corresponding to the RAS line to be enabled which is specified by the settled decoding result is read out from the register file 201, and is supplied to the pattern decoder 202. The decoding operation of the pattern decoder 202 and the row address selection by the row address selector 203 are executed in accordance with the control parameter, thus settling the row address to be used in a DRAM access.

Although the foregoing description has been given of the case where all the 11 bits of the row address (RA10:0) are switched by the row address start position switch circuits 204–207 and the row address selector 203 in accordance with the RAS line to be enabled, it is actually unnecessary to switch all the bits of the row address.

In other words, even when the row address start position is any of MA11, MA12, MA13 and MA14, six bits MA14–MA19 are commonly used so that those bits can be eliminated from what should be switched. FIG. 22 shows one example of the correlation between the CPU address and the row address in this case.

In FIG. 22, only the lower 3 bits (RA2–RA0) and upper 2 bits (RA10 and RA9) of the row address are to be switched. Since 6 bits, MA14–MA19, of the CPU address can be sent directly to the row address/column address selector 208 as the middle 6 bits (RA8–RA3) of the row address in this way, each of the row address start position switch circuits 204–207 and the row address selector 203 can be accomplished by the hardware structure of five bits to be switched.

As apparent from the above, the circuit structure of the row address/column address multiplexer 253 in FIG. 21 can considerably reduce the number of necessary circuits. During the period from the establishment of the decoding result from the RAS decoder 252 to the establishment of the row address to be used in a DRAM access, the operations of three circuit blocks (the operation to select and read a control parameter to be used from the register file 201, the decoding operation by the pattern decoder 202, and the row address selection by the row address selector 203) should be performed in order. This causes a relatively large delay in the row address/column address multiplexer 253.

FIG. 33 illustrates the second example of the circuit structure of the row address/column address multiplexer 253. The following improvement is made on the structure in FIG. 33 is designed to reduce a delay in the multiplexer 253.

In the row address/column address multiplexer in FIG. 33, six pattern decoders 202-1 to 202-6 and six row address selectors 203-1 to 203-6 are provided in association with the RAS0 line to RAS5 line instead of the pattern decoder 202 and the row address selector 203 in FIG. 31. The pattern decoders 202-1 to 202-6 control the row address selecting operations of the row address selectors 203-1 to 203-6 in accordance with a RAS0 control parameter to a RAS5 control parameter in the register file 201.

Provided at the subsequent stage of the row address selectors 203-1 to 203-6 is a row address selector 209 which selects one of six types of row addresses (a RAS0 row address to a RAS5 row address) obtained by the row address selectors 203-1 to 203-6 in accordance with the decoding result from the RAS decoder 252.

With this circuit structure, the row address extraction by each of the row address start position switch circuits 204–207 and the row address selection by the pattern decoders 202-1 to 202-6 and the row address selectors 203-1 to 203-6 are executed in parallel to the decoding operation of the RAS decoder 252. Accordingly, the six types of row addresses (the RAS0 row address to the RAS5 row address) associated with the RAS0–RAS5 lines can be produced without waiting for the establishment of the decoding result from the RAS decoder 252.

When the decoding result from the RAS decoder 252 is settled, the row address associated with the RAS line to be enabled which is designated by the settled decoding result is selected by the row address selector 209.

The address selection by the address selector 209 at the last stage becomes only the circuit operation required during the period from the establishment of the decoding result from the RAS decoder 252 to the establishment of the row address to be used in a DRAM access, thus considerably reducing the internal delay.

The structure in FIG. 33, like the one in FIG. 31, does not require the switching of all the bits in the row address.

FIG. 34 shows the specific structure of the page hit determining circuit 256 in FIG. 19.

As illustrated, this page hit determining circuit 256 includes a register file 301, a CPU address register 302 for page hit determination, a coincidence determining circuit 303, a mask circuit 304 and a coincidence determination mask position register 305.

The register file 301 is an I/0 register which is readable and writable by the CPU 11; mask data ("0"= mask and "1"= unmask) specifying whether or not to mask the coincidence condition to the CPU address to be used in determining a page hit is set as a control parameter associated with each of the RAS0–RAS5 lines in this register file 301.

The target in the page hit determination is the CPU address (A31:02) excluding the address in a page, i.e., the row address (page address) and the address for RAS decoding, excluding the portion corresponding to the column address. Since the portion corresponding to the column address is not involved in the page hit determination, the determination results on the bits used as the column address should be masked with the mask data. The term "mask" means that the result of the decision on each concerning bit is always set as coincidence.

Actually, mask data corresponding to each RAS line consists of 3-bit data indicating whether or not to mask A12, A11 and A10, not all the bits of the column address. This is because that the coincidence determining circuit 303 is designed to exclude the lower bits than A10 always used as the column address regardless of the type of DRAM banks and to use only the upper bits equal to and above A10 and that the three bits, A12, A11 and A10, may and may not be used as a part of the column address depending on the type of DRAM banks.

When a DRAM bank of the type 1 (number of bits in the column address =9 bits) is connected to the RAS0 line, for example, only A10 among the three bits, A12, A11 and A10, is used as a part of the column address. At this time, mask data "110" corresponding to the RAS0 line is set in the register file 301.

One of the six pieces of mask data set in the register file 301 is read out from the register file 301 and is set in the coincidence determination mask position register 305. Which mask data to read is determined by the decoding result from the RAS decoder 252. When the RAS0 line is enabled by the RAS decoder 202, for example, the mask data associated with the RAS0 line is read from the register file 301.

Held as the CPU address for page hit determination in the CPU address register 302 for page hit determination are 17 bits, A26 to A11, in the CPU address (A31:02) in the previous memory access. The contents of this CPU address register 302 are updated in accordance with the CPU address (A31:02) used in a memory access when no page hit, a bank miss or a page miss occurs. That is, when a bank miss or a page miss occurs, a register update signal is generated from the timing controller 255. In response to this register update signal, the CPU address (A26–A11) then output on the CPU address bus is latched in the page hit determination CPU address register 302. As a result, the contents of the CPU address register 302 are updated to the CPU address in the memory cycle in which the bank miss or page miss has occurred.

The coincidence determining circuit 303 detects, bit by bit, the coincidence/non-coincidence of the CPU address (A26–A11) in the present memory access with the CPU address (A26–A11) held in the page hit determination CPU address register 302, and outputs 17-bit data indicating the detection results for A26–A11.

The mask circuit 304 masks the detection results for A12, A11 and A10 among the detections results for A26–A11 with the mask data in the coincidence determination mask position register 305, and generates a page hit signal HIT when the detection results after the masking all indicate the coincidence.

Mask data associated with the RAS line to be enabled is set in the coincidence determination mask position register 305. The contents of this coincidence determination mask position register 305 are updated in accordance with the mask data associated with the RAS line to be enabled by the RAS decoder 252 when no page hit, a bank miss or a page miss occurs. That is, when a bank miss or a page miss occurs, a register update signal is generated from the timing controller 255. In response to this register update signal, the mask data in the register file 301 selected then by the RAS decoder 252 is latched in the coincidence determination mask position register 305. As a result, the contents of the coincidence determination mask position register 305 are updated to the mask data associated with the RAS line which is enabled in the memory cycle in which the bank miss or page miss has occurred.

In this computer system, as describe above, the memory sizes of a plurality of DRAM banks are detected by the read.write.compare test, and the order of the allocation of the DRAM banks in the memory address space is determined by the memory sizes, not by the physical installing positions of the DRAM banks. Regardless of the order of the types of expansion memories and the installing order thereof, therefore, the expansion memories can be reallocated automatically at the optimal memory positions, and the DRAM banks in the system are always allocated in the DRAM logical address space in such a way that a DRAM bank with a larger memory size is allocated at a smaller-valued address in the space.

With this memory arrangement, the address decoder 252 simply needs to detect the coincidence/non-coincidence of the value of the memory address from the CPU with the decoding conditions. This can significantly simplify the hardware structure of the address decoder 252 as compared with the conventional one, thus reducing a delay in the address decoder and improving the memory access speed. With this structure, if the decoding conditions for two different RAS lines are set to the same value, the two RAS lines can be enabled simultaneously, so that access data length may be switched to a double length.

If a part of the address in a page is used as a decoding condition, word interleave can be realized.

A third embodiment of the present invention will now be described with reference to FIGS. 35 through 44. FIG. 35 illustrates a computer system according to the third embodiment.

This system is designed to realize a notebook type or laptop type portable personal computer, and has a CPU 141, a system controller 143, a main system memory 145, a BIOS ROM 147, a real time clock (RTC) 149, an interrupt controller (PIC) 151, a keyboard controller (KBC) 153, a display controller 155, etc. all installed on a system board as illustrated in FIG. 35.

Laid out on the system board are a CPU local bus (which may be called a processor bus) 157, a system bus 159 conforming to the ISA specifications (hereinafter called "ISA bus") and a memory address bus 160.

The CPU 141 is a microprocessor incorporating a large-scale cache memory, for which an Intel486 CPU, for example, is used. The CPU 141 is connected via the CPU local bus 157 to the system controller 143. The CPU local bus 157 consists of signal lines directly connected to the input/output pins of the microprocessor that constitutes the CPU 141.

This CPU local bus 157 includes a 32-bit data bus, a 32-bit address bus and various status signal lines including W/R# and MIO# signal lines. The W/R# line indicates that the current bus cycle is a write access cycle when it is at an "H" level and indicates that the current bus cycle is a read access cycle when it is at an "L" level. The MIO# line indicates that the current bus cycle is a memory access cycle when it is at an "H" level and indicates that the current bus cycle is an I/O access cycle when it is at an "L" level.

The system controller 143, which is connected between the CPU local bus 157 and the ISA bus 159, controls all the memories and I/O devices in the system in response to a request from the CPU 141. This system controller 143 is realized by a single gate-arrayed LSI which incorporates a memory control logic for controlling all the memories and I/O devices in the system.

Stored in the main system memory 145 are an operating system, application programs to be executed and various processing data. This main system memory 145 consists of a plurality of DRAM banks installed on the system board. Each DRAM bank has a plurality of DRAM chips.

The main system memory 145 is a 32-bit memory device whose data port is connected to the 32-bit data bus of the CPU local bus 157 and whose address input port is connected to the memory address bus 160. The memory address bus 160 is an address bus exclusive for DRAMs, on which the physical address (row address RA/column address CA) of a DRAM is output from the system controller 143. Also connected to the main system memory 145 are row address strobe signal lines RAS0 to RAS5, a column address strobe signal line CAS, a write enable signal line WE, an output enable signal line OE and a chip select signal line CS. In this case, RAS0-RAS5 are respectively connected to a plurality of DRAM banks constituting the main system memory 145, and CAS, WE, OE and CS are commonly connected to all the DRAM banks.

In this system, a part of the memory space in the main system memory 145 is used as a copy area 1451 where the contents of the BIOS ROM 147 are copied. The read/write access to this copy area 1451, like that to the other memory areas in the main system memory 145, is controlled by the memory address and various control signals (RAS, CAS, WE, OE, CS, etc.) from the system controller 143. In this case, the copy area 1451 may be write-protected to inhibit the write access to this copy area 1451 under the control of the system controller 143.

The BIOS ROM 147 is an 8-bit or 16-bit device connected to the ISA bus 159 conforming to the ISA specifications. Stored in the BIOS ROM 147 are the system BIOS and VGA BIOS including various BIOS routines. The system BIOS includes an IRT routine which is executed when the system is powered on, and BIOS drivers for various hardware controls. The IRT routine includes a ROM-to-RAM copy routine for copying the contents of the BIOS ROM 147 to the copy area 1451 in the main system memory 145, a test and initialization routine for various kinds of hardware and a boot routine.

Each of the real time clock (RTC) 149, the interrupt controller (PIC) 151 and the keyboard controller (KBC) 153 is an 8-bit or 16-bit I/O device.

The display controller 155, which conforms to the VGA specifications, performs the display control of an LCD panel mounted on the computer body, and the display control of a CRT display connected as an option. Display data is stored in a video memory (VRAM) 1551 whose read/write control is executed by the display controller 155.

The structure of a memory control subsystem provided in the system controller 143 will be described below.

As illustrated, the memory control subsystem comprises a CPU controller 1431, an access controller 1432, a DRAM mapper 1433, a DRAM controller 1434 and an ISA controller 1435.

When this system supports a 32-bit PCI bus and a 32-bit VL bus, a PCI controller 1436 and a VL bus controller 1437 are provided in addition to the DRAM controller 1 434 and the ISA controller 1435 to control the 32-bit PCI bus and a 32-bit VL bus, as illustrated. In this case, the display controller 155 may be separated from the CPU local bus 157 and may be connected, instead, on the 34-bit VL bus PCI bus.

The CPU controller 1431 executes the bus cycle control of the CPU 141 and the decoding of the CPU address in cooperation of the access controller 1432. An attribute register file 161 provided in the CPU controller 1431 is used in the CPU address decoding.

The attribute register file 161 serves to define the memory address map of the computer system, and consists of a plurality of attribute registers associated with a plurality of memory address areas which constitute the memory address space of the CPU 141.

Each attribute register is an I/O control register which is readable and writable by the CPU 141 and where attribute information (ATTRIBUTE) for designating the type of a memory device (DRAM, a memory on the ISA bus, a memory on the PCI bus, a memory on the VL bus) to be allocated in the associated memory address area is previously set. The attribute information includes read attribute information for a memory read cycle and write attribute information for a memory write cycle, so that the type of the memory device to be allocated in each memory address area can be designed separately between the memory read cycle and the memory write cycle.

When the bus cycle for a memory access is executed by the CPU 141, the attribute information in the memory address area associated with the value of the CPU address (A31:02) is read from the attribute register file 161 and is sent to the access controller 1432.

The access controller 1432 determines the type of the memory device to be accessed, in accordance with the attribute information read from the attribute register file 161, and instructs one memory controller corresponding to the type of that memory device, namely, the DRAM controller 1434, the ISA controller 1435, the PCI controller 1436 or the VL bus controller 1437, to execute the memory cycle. In this case, the type of the memory device to be accessed is determined in accordance with the read attribute information in the attribute information read from the attribute register file 161 when the bus cycle of the CPU 141 is the memory read cycle and is determined in accordance with the write attribute information when the bus cycle of the CPU 141 is the memory write cycle. Whether the bus cycle of the CPU 141 is the memory read cycle or the memory write cycle can be detected by the logic level of the W/R# line.

The DRAM mapper 1433 converts the CPU address (A31:02) to a DRAM logical address (MA31:02). This conversion is executed to allocate a plurality of DRAM memory areas, dispersed in the contiguous logical memory address space of the CPU 141 exclusive for DRAM access. One example of this address conversion will be described with reference to FIG. 36.

Figures 36A, 36B:
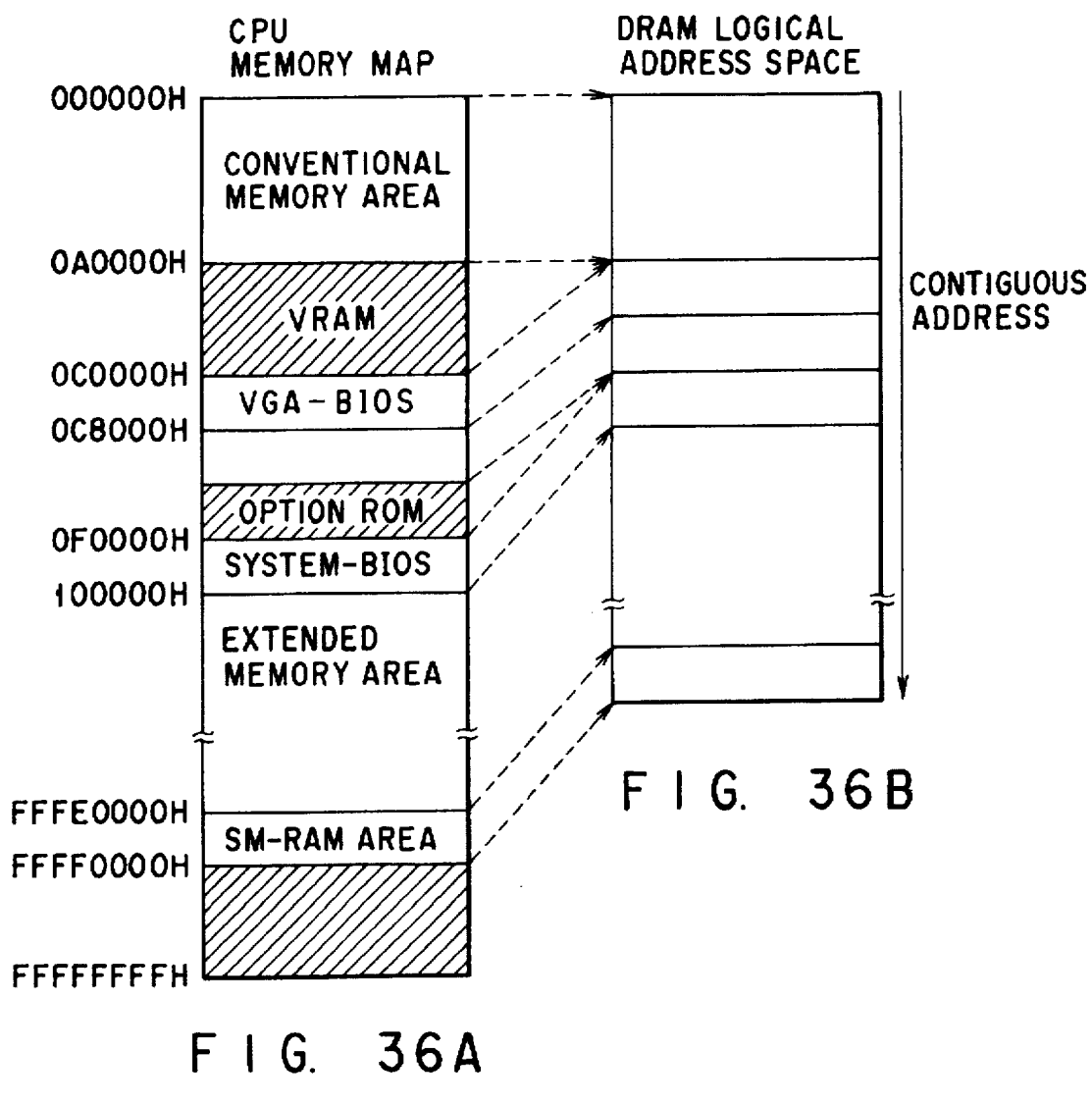
FIGS. 36A and 36B are diagrams illustrating conversion from the CPU's memory address space to the DRAM logical address space which is executed by a DRAM mapper provided in the system in FIG. 35.

FIG. 36A shows a memory address map used in this system, and FIG. 36B shows the DRAM logical address space corresponding to the memory address map in FIG. 36A.

As shown in FIG. 36A, in addition to the conventional memory area and an DRAM address area such as an expansion memory area where DRAMs are allocated, address areas for the allocation of other memory devices than a DRAM (VRAM, BIOS ROM, option ROM, SMRAM, etc.) is secured in the memory address space which is addressable by the CPU 141. In this system, the VGA BIOS and system BIOS in the BIOS ROM 147 are copied on a DRAM and are used in this form, and the SM-RAM is realized on a DRAM. Therefore, the CPU address (A31:02) belonging to all the memory address areas excluding the VRAM and option ROM is actually converted to a DRAM logical address (MA31:02). This address conversion causes the addresses of the DRAM address areas immediately preceding and following the address areas for the VRAM and option ROM become contiguous in the DRAM logical address space.

This conversion of the CPU address to a DRAM logical address is executed in the units of 16 Kbytes. The lower bit portion (MA13:02) of the DRAM logical address is therefore equal to the lower bit portion (A13:02) of the CPU address even after the address conversion.

The DRAM logical address (MA31:02) obtained by the DRAM mapper 1433 is sent to the DRAM controller 1434.

When the bus cycle of the CPU 141 is indicated as the DRAM cycle by the access controller 1432, the DRAM controller 1434 executes the access cycle of the main system memory 145 or a DRAM using the access control signals (RAS, CAS, WE, OE and CS) and the DRAM physical address (row address RA and column address CA). The row address RA and the column address CA are obtained by separating the DRAM logical address (MA31:02).

When the bus cycle of the CPU 141 is indicated as the access cycle for the memory on the ISA bus by the access controller 1432, the ISA controller 1435 generates a chip select signal to the BIOS ROM 147 on the ISA bus and controls the access to the BIOS ROM 147 at the timing corresponding to the bus cycle of the ISA bus.

When the bus cycle of the CPU 141 is indicated as the access cycle for the memory on the PCI bus by the access controller 1432, the PCI controller 1436 generates a chip select signal to a predetermined memory on the PCI bus and controls the access to that memory at the timing corresponding to the bus cycle of the PCI bus.

When the bus cycle of the CPU 141 is indicated as the access cycle for the memory on the VL bus by the access controller 1432, the VL bus controller 1437 generates a chip select signal to a predetermined memory on the VL bus and controls the access to that memory at the timing corresponding to the bus cycle of the VL bus.

The attribute information that is managed by the attribute register file 161 will specifically be described below.

First, the relation between the memory address space of the CPU 141 and the attribute information which is managed area by area by the attribute register file 161 will be discussed with reference to FIG. 37.

Figure 37:
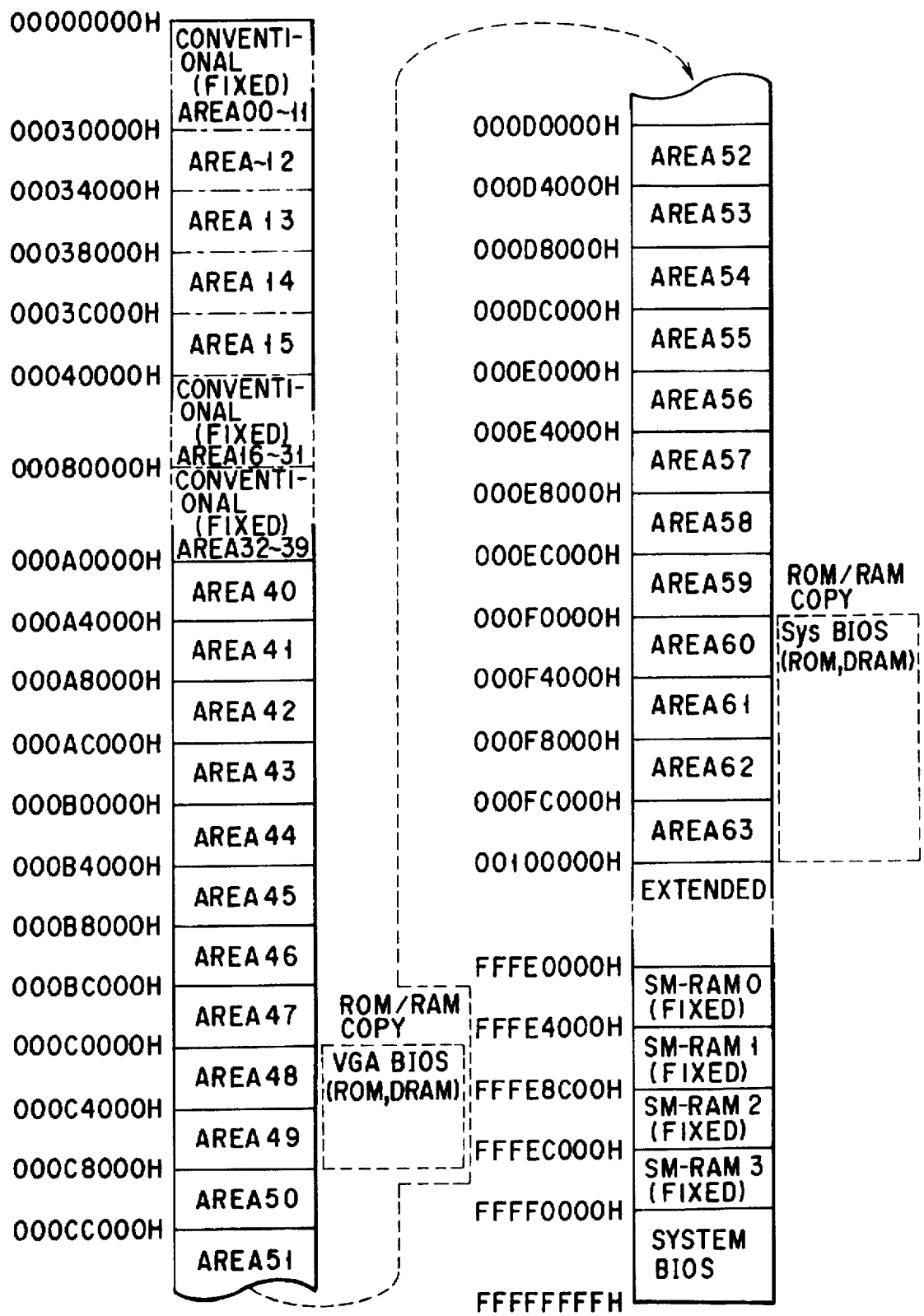
FIG. 37 is a diagram showing the relation between attribute information, which is managed by an attribute register file provided in the system in FIG. 35, and the CPU's memory address space.

The size of one address area which is managed by the attribute register file 161 is 16 Kbytes as mentioned above, and the CPU memory address space 00000000H to 0000FFFFH is defined as AREA00 to AREA63 in order from 000000H, as shown in FIG. 37.

The 8-bit attribute information as shown in FIG. 38 is set in the attribute registers associated with the AREA40 to AREA63, among the AREA00 to AREA63, where plural types of memory devices including a DRAM may be allocated.

As shown in FIG. 38, among the 8-bit attribute information, bit 7 and bit 6 are used as read attribute information (READ ATTRIBUTE), bit 5 and bit 4 are used as write attribute information (WRITE ATTRIBUTE), bit 3 is used as DRAM write protect information (WP), and bit 2 and bit 1 are used as caching information (CASH).

The read attribute information (READ ATTRIBUTE) indicates the type of a memory device targeted for a read access, and the combination of bit 7 and bit 6 can designate one of the DRAM, the memory on the VL bus, the memory on the PCI bus and the memory on the ISA bus, as shown in FIG. 39.

The write attribute information (WRITE ATTRIBUTE) indicates the type of a memory device targeted for a write access, and the combination of bit 5 and bit 4 can designate one of the DRAM, the memory on the VL bus, the memory on the PCI bus and the memory on the ISA bus, as shown in FIG. 40.

The DRAM write protect information (WP) indicates whether or not to set write protection on the DRAM according to the content of bit 3 as shown in FIG. 41 when the DRAM is designated as the memory device targeted for a write access by the write attribute information.

The caching information (CASH) serves to control the validity/invalidity of the caching operation on a DRAM when the DRAM is designated by both the read attribute information and the write attribute information. As shown in FIG. 42, the combination of bit 2 and bit 1 can designate one of the writeback cache enable, the writethrough cache enable and the cache disable. For example, the setting for the cache disable is set in the DRAM area where the VGA BIOS or system BIOS has been copied.

A description will now be given of the decoding of the CPU address which is executed using the attribute information in the attribute register file 161 with reference to the flowchart in FIG. 43.

The following description will be given on the case where the CPU address belongs to 000A0000H to 00100000H or on the decoding process with respect to the AREA40 to AREA63.

First, the access controller 1432 determines whether the current CPU bus cycle is the memory read cycle or the memory write cycle (step S401). When the current CPU bus cycle is the memory read cycle, the access controller 1432 refers to bit 7 and bit 6 (read attribute information) of the attribute register designated by the CPU address (A31-14) (step S403). When bit 7="H" and bit 6="H," the access controller 1432 informs the DRAM controller 1434 of the DRAM cycle and causes the DRAM controller 1434 to execute the DRAM read cycle (step S405).

In the other cases than bit 7="H" and bit 6="H," the access controller 1432 instructs one of the ISA controller 1435, PCI controller 1436 and VL bus controller 1437 to execute the memory read cycle in accordance with the combination of bit 7 and bit 6 (step S407).

When the current CPU bus cycle is the memory write cycle, the access controller 1432 refers to bit 5 and bit 4 (write attribute information) of the attribute register designated by the CPU address (A31-14) (step S409). When bit 5="H" and bit 4="H," the access controller 1432 refers to bit 3 (DRAM write protect information WP) of the attribute register to check if the associated DRAM area is a write protect area (step S411). When it is not the write protect area, the access controller 1432 informs the DRAM controller 1434 of the DRAM cycle and causes the DRAM controller 1434 to execute the DRAM write cycle (step S413). When the associated DRAM area is the write protect area, on the other hand, the access controller 1432 informs the DRAM controller 1434 of the DRAM cycle and the write protect and causes the DRAM controller 1434 to execute the DRAM write cycle while inhibiting the output of the WE signal (step S415).

In the other cases than bit 5="H" and bit 4="H," the access controller 1432 instructs one of the ISA controller 1435, PCI controller 1436 and VL bus controller 1437 to execute the memory write cycle in accordance with the combination of bit 5 and bit 4 (step S417).

In this system, as described above, the memory address space of the CPU 141 is separated to a plurality of memory address areas AREA00 to AREA63 and is managed in this form, and the CPU address is decoded using the attribute information indicating the type of the memory device to be allocated in each memory address area. Therefore, the memory address map of the entire system can easily be determined only by the contents of the attribute information in the attribute register file 161, without individually setting the decoding conditions in a plurality of address decoders which is required in the prior art. Since access to only one memory device is permitted by single attribute information, the memory device to be allocated in each memory address area can be defined specifically. It is therefore possible to surely prevent two different memory devices from being erroneously allocated in the same memory address space.

As the read attribute information and write attribute information are defined for each memory address area, it is possible to define the memory address map for the read cycle and the memory address map for the write cycle separately.

Figure 44:
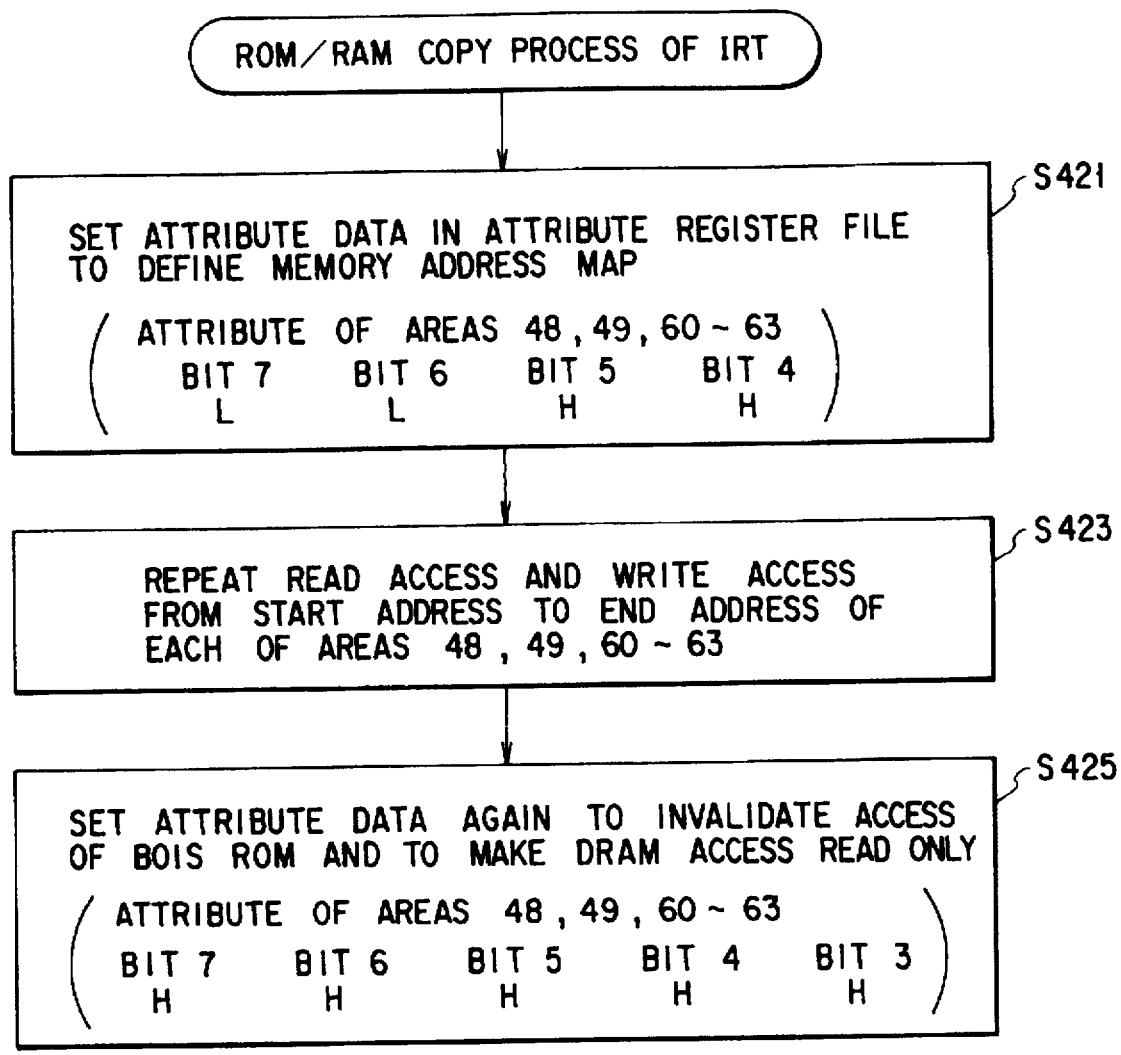
FIG. 44 is a flowchart illustrating a sequence of processes for ROM-to-RAM copying in the system of the second embodiment.

The ROM-to-RAM copying process to accomplish the "fast ROM" function will be described with reference to the flowchart in FIG. 44.

When the system is powered on, the CPU 141 executes the IRT routine in the BIOS ROM 147. The IRT routine first sets attribute information in each attribute register in the attribute register file 161, and defines the memory address map of this system (step S421). In this case, read attribute information (bit 7="L" and bit 6="L") for designating the BIOS ROM on the ISA bus and write attribute information (bit 5="H" and bit 4="H") for designating a DRAM are respectively set in the AREA48 and AREA49 corresponding to the memory address 000C0000H to 000C7FFFH allocated to the VGA BIOS in the BIOS ROM 147. Likewise, read attribute information (bit 7="L" and bit 6="L") for designating the BIOS ROM on the ISA bus and write attribute information (bit 5="H" and bit 4="H") for designating a DRAM are also respectively set in the AREA60 to AREA63 corresponding to the memory address 000F0000H to 000FFFFFH allocated to the system BIOS in the BIOS ROM 147.

Accordingly, the BIOS ROM and DRAM are allocated respectively in the address space for the VGA BIOS and the address area for the system BIOS as indicated by the broken lines in FIGS. 36A and 36B.

Next, the IRT routine executes a read access for reading data from the head address to the end address in each of the AREA48, AREA49 and AREA60 to AREA63 and a write access for writing the data, read by the read access, at the same addresses in order to copy the contents of the BIOS ROM to the DRAM (step S423).

To copy the contents of the BIOS ROM in the AREA48 to the DRAM in the AREA48, for example, the CPU 141 executes the following commands.

| MOV | AX, | C000h | ... setting the upper address |
| MOV | ES, | AX | |
| MOV | DS, | AX | |
| MOV | SI, | 0 | ... setting the lower address |
| MOV | CX, | 1000H | ... number of transfers |
| CLD | | | ... address increment |
| MOV | CX, | 1000H | ... command to send double word |
| REP | | MOVSD | ... command to send double word |

Thee above commands may be described as follows.

| | MOV | AX, | C000h | ... setting the upper address |
| | MOV | DS, | AX | |
| | MOV | CX, | 4000H | ... number of transfers |
| | MOV | BX, | 0 | ... setting the lower address |
| L1: | MOV | AL, | [BX] | ... transfer command (read) |
| | MOV | [BX], | AL | ... transfer command (write) |
| | INC | BX | | ... address increment |
| | LOOP | L1 | | |

Next, the IRT routine sets the attribute information for the AREAs 48, 49 and 60–63 again to invalidate access to the BIOS ROM and sets the DRAM access through the AREAs 48, 49 and 60–63 to read only (step S425).

In this case, the read attribute information (bit 7="H" and bit 6="H") designating the DRAM, the write attribute information (bit 5="H" and bit 4="H") designating the DRAM, and the DRAM write protect information (bit 3="H") indicating the write protect are set in the AREAs 48, 49 and 60–63.

Thereafter, when the operating system is executed, an application program or the like can access a DRAM having a 32-bit data length which is accessible faster than the BIOS ROM 14 having an 8-bit or 16-bit data length instead of this BIOS ROM 14, thus ensuring faster access to the VGA BIOS and system BIOS.

What is claimed is:

1. A computer system comprising:
   a plurality of memory banks to which a plurality of access control signals are respectively assigned and which are independently accessible;
   an address decoder for detecting coincidence or non-coincidence of a plurality of decoding conditions, corresponding to said plurality of access control signals and set in said address decoder, with a memory address from a CPU, and enabling an access control signal line corresponding to a coincident decoding condition to thereby select a memory bank;

means for detecting memory sizes of said plurality of memory banks;

memory reallocation means for reallocating said plurality of memory banks in a memory address space of said CPU in a memory-size order in such a way that a memory bank with a larger memory size is allocated in smaller addresses in the memory address space and determining memory address ranges to be respectively allocated to said plurality of memory banks in accordance with the reallocated memory arrangement; and means for detecting a sequence of bits commonly present only in binary data indicating all memory address values belonging to a memory address range corresponding to each of said memory banks, and setting said sequence of bits in said address decoder as a decoding condition of each of said access control signal lines.

2. The computer system according to claim 1, wherein said address decoder includes:

registers in which plural sequences of bits indicating a plurality of decoding conditions respectively corresponding to said plurality of access control signal lines are set; and a plurality of decoding circuits provided in association with said plurality of access control signal lines, each decoding circuit detecting coincidence or non-coincidence of a sequence of bits indicating a decoding condition of an associated access control signal line with a memory address from said CPU and enabling said access control signal line when there is a coincidence.

3. The computer system according to claim 1, further comprising:

means for determining a combination of two or more memory banks interleavable page by page in accordance with a memory arrangement of said plurality of memory banks; and means for changing decoding conditions of access control signal lines corresponding to memory banks belonging to said combination in such a way that those memory banks are alternately accessed page by page, in accordance with a sequence of bits commonly present in an entire address range for said memory banks and a predetermined sequence of bits between an address of each memory bank in a page and a page designating address.

4. The computer system according to claim 1, wherein each of said memory banks is a DRAM bank constituted of a plurality of DRAM chips; and each of said access control signal lines is a row address strobe signal line commonly connected to said DRAM chips of said DRAM bank.

5. The computer system according to claim 4, wherein said memory size detecting means includes means for detecting at least one of a column address size and a row address size of each DRAM bank and determining a memory size of each DRAM bank based on said detected address size.

6. The computer system according to claim 4, further comprising address output means for separating a memory address from said CPU into a row address and a column address corresponding to a DRAM bank to be accessed, said address output means including:

registers in which a plurality of parameter values for designating an extraction start position for extracting said row address from said memory address for each of said access control signal line; and means for selecting one parameter value from said registers in accordance with a row address strobe signal line enabled by said address decoder and extracting said row address from said memory address in accordance with said selected parameter value.

7. The computer system according to claim 4, further comprising address output means for separating a memory address from said CPU into a row address and a column address corresponding to a DRAM bank to be accessed, said address output means including:

registers in which a plurality of parameter values for designating an extraction start position for extracting said row address from said memory address for each of said access control signal line;

a plurality of row address extraction means for respectively extracting row addresses from said memory address in accordance with said plurality of parameter values set in said registers; and means, connected at a subsequent stage of said plurality of row address extraction means, for selecting one of outputs of said plurality of row address extraction means in accordance with a row address strobe signal line enabled by said address decoder.

8. The computer system according to claim 4, wherein a reserve area is secured in said memory address spaces for allocation of other memories than said plurality of DRAM banks;

address conversion means, further provided at a preceding stage of said address decoder, for converting a memory address from said CPU to a DRAM logical address exclusive for DRAM banks in accordance with a memory map of said CPU in such a manner that memory addresses allocated to DRAM banks allocated immediately preceding and following said reserve area are consecutive between those DRAM banks; and said address decoder detects coincidence or non-coincidence of said DRAM logical address converted by said address conversion means with each of said decoding conditions.

9. The computer system according to claim 4, further comprising page hit determining means for holding a memory address from said CPU at a time of a previous memory access, compares said held memory address with a memory address from said CPU at a time of a next memory access, and determines presence or absence of a page hit in accordance with a result of that comparison.

10. A computer system comprising:

an internal memory installed on a system board and constituted of one or more DRAM banks respectively connected to a plurality of first row address strobe signal lines;

an expansion memory detachably installed to an expansion memory connector and constituted of one or more DRAM banks respectively connected to a plurality of second row address strobe signal lines different from those of said internal memory;

an address decoder for detecting coincidence or non-coincidence of a plurality of decoding conditions, corresponding to said plurality of first and second row address strobe signal lines and set in said address decoder, with a memory address from a CPU, and enabling a row address strobe signal line corresponding to a coincident decoding condition to thereby select one DRAM bank included in said internal memory and expansion memory; and initializing means for initializing said address decoder in response to activation of said computer system, said initializing means including, means for detecting memory sizes of said DRAM banks included in said internal memory and expansion memory, memory reallocation means for reallocating said plurality of DRAM banks in memory address spaces of said CPU in a memory-size order in such a way that a DRAM bank with a larger memory size is allocated in a smaller memory address space and determining memory address ranges to be respectively allocated to said plurality of DRAM banks in accordance with the reallocated memory arrangement, and means for detecting a sequence of bits commonly present only in binary data indicating all memory address values belonging to a memory address range corresponding to each of said DRAM banks, and setting said sequence of bits in said address decoder as a decoding condition of each of said row address strobe signal lines.

11. A computer system comprising:

a CPU;

plural types of memory devices;

a plurality of memory controllers, respectively coupled to said plural types of memory devices, for controlling access to said memory devices;

a register file including a plurality of I/O control registers provided in association with a plurality of memory address areas constituting memory address space addressable by said CPU, each register being set with attribute information designating a type of a memory device to be allocated in an associated memory address area, wherein said attribute information is either read attribute information designating a type of a memory device whose read access is to be permitted or write attribute information designating a type of a memory device whose write access is to be permitted; and decoding means, coupled to said register file, for determining a memory device targeted for a read access or a write access in accordance with the read or write attribute information of a memory address area corresponding to a value of a memory address from said CPU and instructing one of said memory controllers which is associated with said memory device targeted for a read access or a write access to execute a memory access, when said CPU executes a memory read cycle or a memory write cycle.

12. The computer system according to claim 11, wherein said plural types of memory devices include a RAM device connected to a first bus, and a ROM device connected to a second bus narrower than said first bus.

13. The computer system according to claim 12, wherein said plurality of memory controllers includes a first memory controller for controlling access to said RAM device and a second memory controller for controlling access to said ROM device.

14. The computer system according to claim 12, wherein said RAM device is a 32-bit device and said ROM device is an 8-bit or 16-bit device.

15. A computer system comprising:

a CPU;

a RAM device and a ROM device;

first and second memory controllers, respectively coupled to said RAM device and ROM device, for controlling access to said RAM device and ROM device;

a register file including a plurality of I/O control registers provided in association with a plurality of memory address areas constituting memory address space addressable by said CPU, each register being set with attribute information including read attribute information designating a type of a memory device among said RAM device and ROM device which is to be allocated in a memory address area associated with that register and whose read access is to be permitted and write attribute information designating a type of a memory device among said RAM device and ROM device which is to be allocated in a memory address area associated with that register and whose write access is to be permitted; and decoding means, coupled to said register file, for instructing one of said first and second memory controllers in accordance with said attribute information of a memory address area corresponding to a value of a memory address from said CPU when said CPU executes a bus cycle for a memory access, said decoding means including, means for determining a memory device targeted for a read access in accordance with said read attribute information of a memory address area corresponding to a value of a memory address from said CPU and instructing one of said memory controllers which is associated with said memory device targeted for a read access to execute a memory access, when said bus cycle is a memory read cycle, and means for determining a memory device targeted for a write access in accordance with said write attribute information of a memory address area corresponding to a value of a memory address from said CPU and instructing one of said memory controllers which is associated with said memory device targeted for a write access to execute a memory access, when said bus cycle is a memory write cycle.

16. The computer system according to claim 15, further comprising:

means for, in response to activation of said computer system, setting attribute information including read attribute information designating said ROM device and write attribute information designating said RAM device in one of said I/O control register of said register file which is associated with memory address space where said ROM device is to be allocated, thereby allocating said ROM device and RAM device in same memory address space;

means for sequentially reading from a head address to an end address in said memory address space where said ROM device and RAM device are allocated, and sequentially writing read data at same addresses, thereby copying contents of said ROM device into said RAM device; and attribute information changing means for changing read attribute information designating said ROM device to a value designating said RAM device to nullify access to said ROM device.

17. The computer system according to claim 15, wherein said attribute information includes write protect information designating whether or not to inhibit writing to said RAM device when said write attribute information designates said RAM device as a memory device whose write access is to be permitted; and said decoding means further includes means for causing said first memory controller to inhibit a write access to said RAM device when said attribute information includes write protect information designating inhibition of writing to said RAM device.

18. The computer system according to claim 17, further comprising:

means for, in response to activation of said computer system, setting attribute information including read attribute information designating said ROM device and write attribute information designating said RAM device in one of said I/O control register of said register file which is associated with memory address space where said ROM device is to be allocated, thereby allocating said ROM device and RAM device in same memory address space;

means for sequentially reading from a head address to an end address in said memory address space where said ROM device and RAM device are allocated, and sequentially writing read data at same addresses, thereby copying contents of said ROM device into said RAM device;

attribute information changing means for changing read attribute information designating said ROM device to a value designating said RAM device to nullify access to said ROM device; and means for setting write protect information designating inhibition of writing to said RAM device in said I/O control registers in order to change access permission to said RAM device only to a read access.

19. The computer system according to claim 17, wherein said ROM device is a system ROM having stored a BIOS routine for controlling hardware of said computer system.

20. The computer system according to claim 15, wherein said RAM device is connected to a first bus, and said ROM device is connected to a second bus narrower than said first bus.

21. The computer system according to claim 17, wherein said first memory controller controls access to said RAM device at a timing corresponding to a bus cycle of said first bus and said second memory controller controls access to said ROM device at a timing corresponding to a bus cycle of said second bus.

* * * * *